(12) United States Patent
Matsuda et al.

(10) Patent No.: US 12,185,384 B2
(45) Date of Patent: Dec. 31, 2024

(54) COMMUNICATION DEVICE, BASE STATION DEVICE, AND COMMUNICATION METHOD

(71) Applicant: SONY GROUP CORPORATION, Tokyo (JP)

(72) Inventors: Hiroki Matsuda, Tokyo (JP); Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 554 days.

(21) Appl. No.: 17/428,008

(22) PCT Filed: Dec. 18, 2019

(86) PCT No.: PCT/JP2019/049712
§ 371 (c)(1),
(2) Date: Aug. 3, 2021

(87) PCT Pub. No.: WO2020/166200
PCT Pub. Date: Aug. 20, 2020

(65) Prior Publication Data
US 2022/0124829 A1    Apr. 21, 2022

(30) Foreign Application Priority Data

Feb. 13, 2019 (JP) .................. 2019-023861

(51) Int. Cl.
*H04W 74/0833* (2024.01)
*H04W 72/0446* (2023.01)
(Continued)

(52) U.S. Cl.
CPC ... *H04W 74/0841* (2013.01); *H04W 72/0446* (2013.01); *H04W 72/53* (2023.01); *H04W 74/006* (2013.01); *H04W 74/0866* (2013.01)

(58) Field of Classification Search
CPC .................................................. H04L 5/0048
See application file for complete search history.

(56) References Cited

U.S. PATENT DOCUMENTS

| 11,089,597 | B2 | 8/2021 | Matsumura et al. |
| 2019/0223225 | A1 | 7/2019 | Lee et al. |
| (Continued) | | | |

FOREIGN PATENT DOCUMENTS

| CN | 103858503 A | 6/2014 |
| JP | 2013-118646 A | 6/2013 |
| (Continued) | | |

OTHER PUBLICATIONS

Partial Supplementary European Search Report of EP Application No. 19915468.3, issued on Mar. 21, 2022, 12 pages.

"Considerations on Procedures of NOMA Schemes", CAICT, 3GPP TSG RAN WG1 Meeting #95, Spokane, US, R1-1813500, Nov. 12-16, 2018, 4 pages.

"Discussion on Procedures Related to Non-Orthogonal Multiple Access", InterDigital Inc., 3GPP TSG RAN WG1 Meeting #95, Spokane, US, R1-1813213, Nov. 12-16, 2018, 5 pages.
(Continued)

*Primary Examiner* — Eric Myers
(74) *Attorney, Agent, or Firm* — CHIP LAW GROUP

(57) ABSTRACT

A communication device includes an acquisition unit that acquires information regarding signal processing of predetermined data transmission, and a switching unit that switches a transmission means of a reference signal related to the predetermined data transmission on the basis of the information regarding the signal processing of the predetermined data transmission.

20 Claims, 31 Drawing Sheets

(51) Int. Cl.
*H04W 72/53* (2023.01)
*H04W 74/00* (2009.01)
*H04W 74/08* (2024.01)

(56) References Cited

U.S. PATENT DOCUMENTS

2020/0008204 A1  1/2020  Matsumura et al.
2021/0152409 A1* 5/2021  Pan .................. H04W 74/08

FOREIGN PATENT DOCUMENTS

| JP | 2019-004325 | A1 | 1/2019 |
| WO | 2018/038410 | A1 | 3/2018 |
| WO | 2018/155605 | A1 | 8/2018 |
| WO | 2018/230300 | A1 | 12/2018 |

OTHER PUBLICATIONS

International Search Report and Written Opinion of PCT Application No. PCT/JP2019/049712, issued on Jan. 28, 2020, 12 pages of ISRWO.
"Procedures related to NOMA", ZTE, Sanechips, 3GPP TSG RAN WG1 Meeting #95, Spokane, US, R1-1812174, Nov. 12-16, 2018, 7 pages.
"Procedures to be considered for NOMA operation", Nokia, Shanghai Bell, 3GPP TSG RAN WG1 Meeting #95, Spokane, US, Nov. 12-16, 2018, R1-1813158, 6 pages.
"NOMA related procedures", NTT Docomo, Inc., 3GPP TSG RAN WG1 Meeting #95, Spokane, US, Nov. 12-16, 2018, R1-1813307, 6 pages.

* cited by examiner

FIG.9

| | SUBCARRIER INTERVAL | MAXIMUM BANDWIDTH | CP LENGTH TYPE | NUMBER OF SYMBOLS | SUBFRAME LENGTH | RADIO FRAME LENGTH | NUMBER OF SUBCARRIERS |
|---|---|---|---|---|---|---|---|
| PARAMETER SET 0 | 15kHz | 20MHz | TYPE 1 | 14 | 1ms | 10ms | 12 |
| PARAMETER SET 1 | 7.5kHz | 1.4MHz | TYPE 1 | 70 | 10ms | 10ms | 24 |
| PARAMETER SET 2 | 30kHz | 80MHz | TYPE 1 | 7 | 0.25ms | 10ms | 6 |
| PARAMETER SET 3 | 15kHz | 20MHz | TYPE 2 | 12 | 1ms | 10ms | 12 |
| ... | ... | ... | ... | ... | ... | ... | ... |

FIG.11
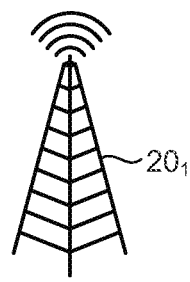
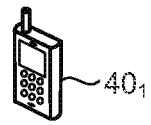
MA signature #0
MA signature #1

FIG.26

| $\tilde{p}$ | CDM group | Δ | Wf(k') | | Wt(l') | |
|---|---|---|---|---|---|---|
| | | | k'=0 | k'=1 | l'=0 | l'=1 |
| 0 | 0 | 0 | +1 | +1 | +1 | +1 |
| 1 | 0 | 0 | +1 | -1 | +1 | +1 |
| 2 | 1 | 2 | +1 | +1 | +1 | +1 |
| 3 | 1 | 2 | +1 | -1 | +1 | +1 |
| 4 | 2 | 4 | +1 | +1 | +1 | +1 |
| 5 | 2 | 4 | +1 | -1 | +1 | +1 |
| 6 | 0 | 0 | +1 | +1 | +1 | -1 |
| 7 | 0 | 0 | +1 | -1 | +1 | -1 |
| 8 | 1 | 2 | +1 | +1 | +1 | -1 |
| 9 | 1 | 2 | +1 | -1 | +1 | -1 |
| 10 | 2 | 4 | +1 | +1 | +1 | -1 |
| 11 | 2 | 4 | +1 | -1 | +1 | -1 |

COMMUNICATION DEVICE, BASE STATION DEVICE, AND COMMUNICATION METHOD

CROSS REFERENCE TO RELATED APPLICATIONS

This application is a U.S. National Phase of International Patent Application No. PCT/JP2019/049712 filed on Dec. 18, 2019, which claims priority benefit of Japanese Patent Application No. JP 2019-023861 filed in the Japan Patent Office on Feb. 13, 2019. Each of the above-referenced applications is hereby incorporated herein by reference in its entirety.

FIELD

The present disclosure relates to a communication device, a base station device, a communication method, and a communication program.

BACKGROUND

Due to the spread of technologies such as Orthogonal Frequency Division Multiplexing (OFDM), radio waves can be used efficiently. However, in recent years, more efficient use of radio waves has been required. For example, in next-generation radio access technology (RAT) such as New Radio (NR), contention-based data transmission such as Configured Grant transmission and Non-orthogonal Multiple Access (NOMA) transmission is examined for more efficient use of radio waves.

CITATION LIST

Non Patent Literature
  Non Patent Literature 1: "NOMA related procedures", 3GPP RAN1 R1-1813307, NTT DOCOMO Inc., November 2018

SUMMARY

Technical Problem

When the contention-based data transmission is frequently used, more data transmissions may be multiplexed in the same frequency band than ever before. However, in such a communication environment, the communication quality of each data transmission is constantly lowered in exchange for the fact that many data transmissions can be multiplexed, or the number of multiplexable data transmissions is not large enough to meet the demand although the communication quality of each data transmission is excellent. Thus, there is a risk that data transmission itself cannot be performed in the first place, or high communication performance is not realized.

Therefore, the present disclosure proposes a communication device, a base station device, a communication method, and a communication program capable of realizing high communication performance even in a communication environment in which many data transmissions may be multiplexed.

Solution to Problem

To solve the above problem, a communication device includes: an acquisition unit that acquires information regarding signal processing of predetermined data transmission; and a switching unit that switches a transmission means of a reference signal related to the predetermined data transmission on the basis of the information regarding the signal processing of the predetermined data transmission.

BRIEF DESCRIPTION OF DRAWINGS

FIG. 9 is a diagram illustrating an example of a parameter set related to a transmission signal in an NR cell.

FIG. 11 is a diagram for explaining data transmission/reception using NOMA.

FIG. 26 is a diagram illustrating parameters in PUSCH DM-RS configuration type 2.

DESCRIPTION OF EMBODIMENTS

Figure 1:
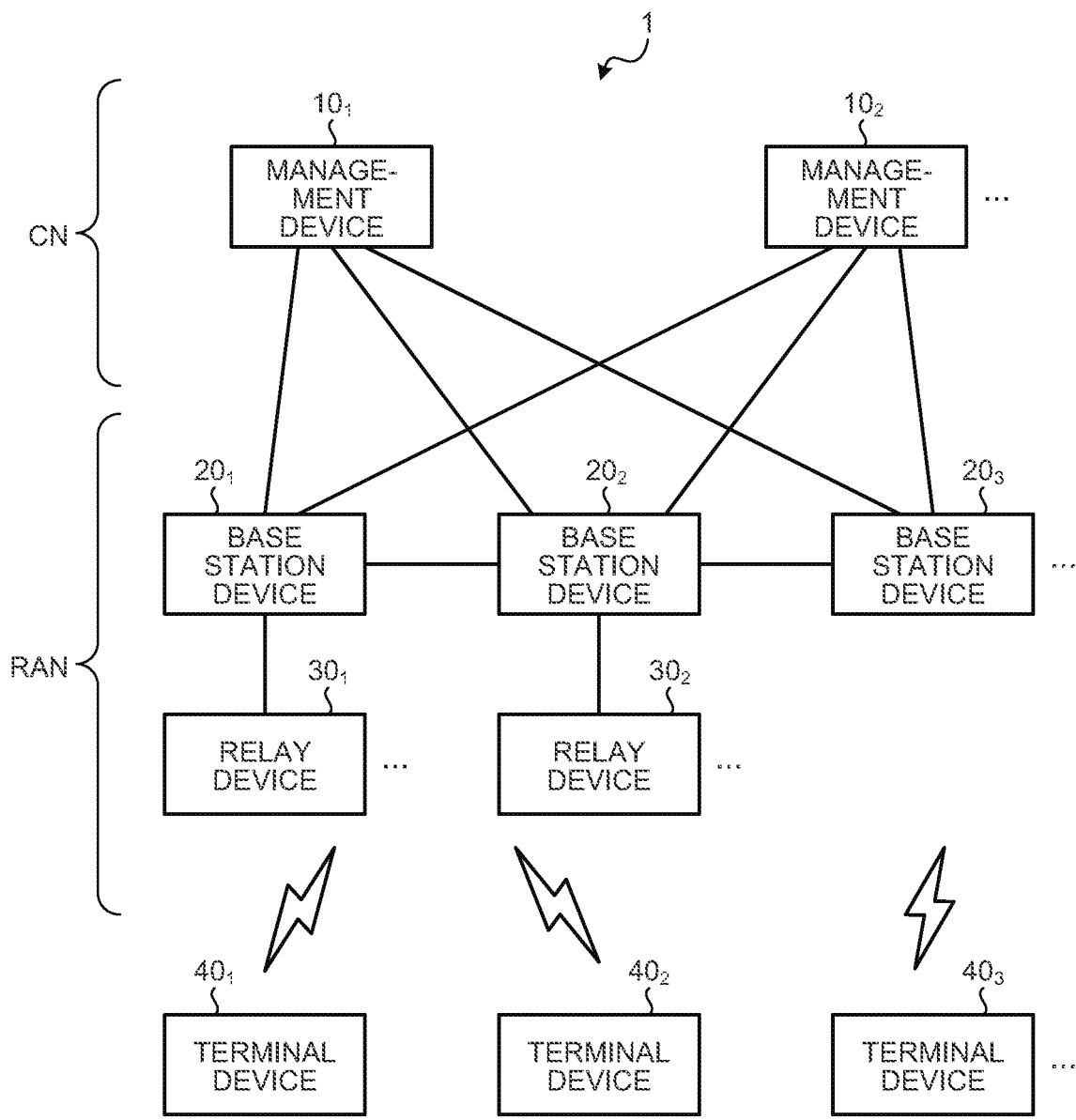
FIG. 1 is a diagram illustrating a configuration example of a communication system according to an embodiment of the present disclosure.

Hereinafter, embodiments of the present disclosure will be described in detail on the basis of the drawings. Incidentally, in each of the following embodiments, the same reference signs are given to the same portions, and duplicate description will be omitted.

Further, in this specification and the drawings, a plurality of components having substantially the same functional configuration may be distinguished by adding different numbers after the same reference numerals. For example, a plurality of configurations having substantially the same functional configuration are distinguished to terminal devices $40_1$, $40_2$, and $40_3$ as necessary. However, in a case where it is not necessary to distinguish each of the plurality of components having substantially the same functional configuration, only the same reference numerals are given. For example, in a case where it is not necessary to distinguish the terminal devices $40_1$, $40_2$ and $40_3$, it is simply referred to as a terminal device 40.

The present disclosure will be described according to the order of items described below.

1. Introduction
2. Configuration of communication system
2-1. Overall configuration of communication system
2-2. Configuration of management device
2.3. Configuration of base station device
2-4. Configuration of relay device
2.5. Configuration of terminal device
2-6. Radio frame configuration
3. As for NOMA
3-1. Data transmission/reception using NOMA
4. Basic operation of communication system
4-1. Initial connection processing
4-2. Random access procedure
4-3. Transmission/reception processing (Grant Based)
4-4. Transmission/reception processing (Configured Grant)
4-5. Transmission/reception processing (downlink)
5. Dynamic switching processing of transmission means of reference signal
5-1. Parameters of transmission signal processing
5-2. Example of contention-based transmission
5-3. Signal processing unit for contention-based transmission
5-4. Reference signal for switching transmission means
5-5. Details of switching transmission means of reference signal
5-6. Switching trigger
5-7. Sequence example (uplink)
5-8. Sequence example (downlink)
5-9. Sequence example (sidelink)
6. Modification
6-1. Modification related to transmission/reception processing
6-2. Another modification
7. Conclusion

1. INTRODUCTION

Radio Access Technology (RAT) such as Long Term Evolution (LTE) and New Radio (NR) is examined in 3rd Generation Partnership Project (3GPP). LTE and NR are a type of cellular communication technology and enable mobile communication of terminal devices by arranging a plurality of areas covered by base stations in a cell shape.

Incidentally, in the following description, "LTE" shall include LTE-Advanced (LTE-A), LTE-Advanced Pro (LTE-A Pro), and Evolved Universal Terrestrial Radio Access (EUTRA). Further, NR necessarily includes New Radio Access Technology (NRAT) and Further EUTRA (FEUTRA). Incidentally, a single base station may manage a plurality of cells. In the following description, the cell corresponding to LTE is called an LTE cell, and the cell corresponding to NR is called an NR cell.

NR is a radio access technology (RAT) of the next generation (5th generation) of LTE. NR is a radio access technology that can support various use cases including Enhanced Mobile Broadband (eMBB), Massive Machine Type Communications (mMTC) and Ultra-Reliable and Low Latency Communications (URLLC). NR is examined for a technical framework that addresses usage scenarios, requirements, and deployment scenarios in those use cases.

In NR, realization of communication having higher frequency utilization efficiency than LTE is required to cope with various use cases. For example, in NR, contention-based data transmission such as Configured Grant transmission and Non-orthogonal Multiple Access (NOMA) transmission is examined.

Herein, the contention-based data transmission is, for example, a data transmission which contends with or may contend with other data transmissions. For example, non-orthogonal multiple access (NOMA) data transmission is contention-based data transmission since the transmission contends with other data transmission superimposed on the non-orthogonal axis on the orthogonal axis.

When the contention-based data transmission is frequently used, more data transmissions may be multiplexed in the same frequency band than ever before.

However, in such a communication environment, the communication quality of each data transmission may be constantly deteriorated in exchange for the fact that many data transmissions can be multiplexed. For example, in cellular communication such as NR, a reference signal such as a Demodulation Reference Signal (DM-RS) is transmitted from each terminal to a base station or from the base station to each terminal. In order to be able to multiplex many terminals (or layers), it is necessary to be able to multiplex many reference signals so that many terminals (or layers) can use the reference signals. However, when the signal amount (for example, the length of the sequence per reference signal) of each reference signal is reduced so that many reference signals can be multiplexed, the accuracy of channel estimation or the like deteriorates. As a result, communication quality deteriorates.

On the other hand, when the communication quality is maintained high, there is a possibility that the number of multiplexable data transmissions cannot be increased. For example, when the conventional signal quality is maintained without reducing the signal amount of the reference signal, the number of multiplexable terminals (or the number of layers) becomes the same as the conventional number. Thus, there is a possibility that the communication device cannot transmit data even though the data is desired to be transmitted. As a result, the communication device may cause communication errors and communication delays.

In this regard, in this embodiment, even in a communication environment where many data transmissions may be multiplexed, many terminals (or layers) can be multiplexed while preventing constant deterioration of signal quality.

For example, the communication device (for example, a terminal device) of this embodiment acquires information regarding signal processing of "predetermined data transmission (for example, data transmission to be executed next)", and a transmission means of the reference signal according to the "predetermined data transmission" is switched on the basis of the acquired information. That is, the communication device of this embodiment dynamically switches the transmission means of the reference signal in accordance with the data transmission.

For example, the communication device can execute contention-based data transmission, and the "information regarding signal processing of predetermined data transmission" includes information (hereinafter referred to as predetermined information) that enables specifying whether or not the predetermined data transmission is contention-based data transmission. In this case, the communication device switches the transmission means of the reference signal related to the predetermined data transmission on the basis of the predetermined information.

More specifically, in a case where a predetermined data transmission is contention-based data transmission, that is, a case where there is a high possibility that more data transmission is multiplexed on the same orthogonal resource compared to conventional data transmission (for example, non-contention-based data transmission), the communication device switches the transmission means of the reference signal to a second transmission means which can multiplex more reference signals compared to a conventional transmission means (for example, a first transmission means). On the other hand, in a case where the predetermined data transmission is the conventional non-contention-based data transmission, the communication device transmits the reference signal by the conventional transmission means (for example, the first transmission means).

Accordingly, in a case where there is a high possibility that many transmission signals are multiplexed, many reference signals can be multiplexed, so that many data transmissions can be multiplexed on the same orthogonal resource. As a result, the occurrence of communication errors and communication delays due to the shortage of the multiplexable number is reduced. Further, in a case where the data transmission is the conventional non-contention-based data transmission, the conventional transmission means is used, and thus the signal quality is not constantly significantly deteriorated.

As a result, even in a communication environment (for example, an environment where communication using NR is possible) where many data transmissions may be multiplexed, the communication device can realize high communication performance (for example, low delay, high quality, and low occurrence rate of communication errors).

Hereinbefore, the outline of this embodiment has been described above, but a communication system 1 of this embodiment will be described in detail below.

2. CONFIGURATION OF COMMUNICATION SYSTEM

The communication system 1 includes a base station device and is capable of radio connection with a terminal device. The communication device included in the communication system 1 is capable of contention-based communication (for example, contention-based data transmission).

For example, the communication device (for example, the base station device and the terminal device) included in the communication system 1 is capable of radio communication using Non-orthogonal Multiple Access (NOMA). Herein, NOMA is multiple access using non-orthogonal resources. NOMA will be described later.

The communication device (for example, the terminal device) included in the communication system 1 of this embodiment is capable of Configured Grant transmission. Herein, Configured Grant transmission means that a communication device (for example, the terminal device) does not receive a dynamic resource allocation (Grant) from another communication device (for example, the base station device), and the communication device performs transmission using appropriate resources from available frequency and time resources on which an instruction is given in advance by another communication device. Configured Grant transmission will be described later.

Hereinafter, the configuration of the communication system 1 will be specifically described.

<2-1. Overall Configuration of Communication System>

FIG. 1 is a diagram illustrating a configuration example of the communication system 1 according to an embodiment of the present disclosure. The communication system 1 is a radio communication system which provides a radio access network to the terminal device. For example, the communication system 1 is a cellular communication system using radio access technology such as LTE and NR.

As illustrated in FIG. 1, the communication system 1 includes a management device 10, a base station device 20, a relay device 30, and a terminal device 40. The communication system 1 provides a user with a radio network capable of mobile communication by operating radio communication devices configuring the communication system 1 in cooperation with each other. The radio network of this embodiment is configured by a radio access network RAN and a core network CN. Incidentally, the radio communication device is a device having a radio communication function and correspond to the base station device 20, the relay device 30, and the terminal device 40 in the example of FIG. 1.

The communication system 1 may include a plurality of management devices 10, a plurality of base station devices 20, a plurality of relay devices 30, and a plurality of terminal devices 40. In the example of FIG. 1, the communication system 1 includes management devices 101, 102, and so on as the management device 10. Further, the communication system 1 includes base station devices 201, 202, 203, and so on as the base station device 20, and relay devices 301, 302, and so on as the relay device 30. Further, the communication system 1 includes terminal devices 40$_1$, 40$_2$, 40$_3$, and so on as the terminal device 40.

Incidentally, the device in the drawing may be considered as a device in a logical sense. That is, a part of the devices in the same drawing may be realized by a virtual machine (VM), a container, a docker, and the like, which may be implemented on physically the same hardware.

Incidentally, the base station of LTE may be referred to as Evolved Node B (eNodeB) or eNB. Further, the base station of NR may be referred to as gNodeB or gNB. Further, in LTE and NR, a terminal device (also referred to as a mobile station, a mobile station device, or a terminal) may be referred to as User Equipment (UE). Incidentally, the terminal device is a kind of communication device and is also referred to as a mobile station, a mobile station device, or a terminal.

In this embodiment, the concept of the communication device includes not only a portable mobile device (terminal device) such as a portable terminal, but also a device installed on a structure or a mobile body. The structure or the mobile body itself may be regarded as the communication device. Further, the concept of the communication device includes not only a terminal device but also a base station device and a relay device. The communication device is a type of a processing device and an information processing device. Further, the communication device can be referred to as a transmission device or a reception device.

[Management Device]

The management device 10 is a device which manages a radio network. For example, the management device 10 is a device which manages the communication of the base station device 20. For example, the management device 10 is a device which functions as a Mobility Management Entity (MME) or an Access and Mobility Management Function (AMF).

The management device 10 configures a core network CN together with a gateway device and the like. The core network CN is, for example, a network owned by a predetermined entity such as a mobile network operator. For example, the core network CN is an Evolved Packet Core (EPC) or a 5G Core network (5GC). Incidentally, a predetermined entity may be the same as the entity which uses, operates, and/or manages the base station device 20, or may be different.

Incidentally, the management device 10 may have a gateway function. For example, if the core network is an EPC, the management device 10 may have a function as an S-GW or a P-GW. Further, if the core network is a 5GC, the management device 10 may have a function as a User Plane Function (UPF). Incidentally, the management device 10 does not necessarily have to be a device which configures the core network CN. For example, it is assumed that the core network CN is a core network of Wideband Code Division Multiple Access (W-CDMA) or Code Division Multiple Access 2000 (cdma2000). At this time, the management device 10 may be a device which functions as a Radio Network Controller (RNC).

The management device 10 is connected to each of the plurality of base station devices 20 and manages the communication of the base station devices 20. For example, the management device 10 grasps and manages the base station device (or cell) to which the terminal device 40 is connected, the communication area of the base station device (or cell) where the terminal device 40 exists, and the like for each terminal device 40. The cell may be a Primary Cell (pCell) or a Secondary Cell (sCell). The cells may have different radio resources (for example, frequency channels and component carriers) which can be used by the terminal device 40. Further, one base station device may provide a plurality of cells.

[Base Station Device]

The base station device 20 is a radio communication device which wirelessly communicates with the terminal device 40. The base station device 20 is a type of communication device. The base station device 20 is, for example, a device corresponding to a radio base station (Node B, eNB, gNB, and the like) or a radio access point. The base station device 20 may be a radio relay station. The base station device 20 may be an optical extension device called a Remote Radio Head (RRH).

Incidentally, the radio access technology used by the base station device 20 may be a cellular communication technology or may be a radio LAN technology. Of course, the radio access technology used by the base station device 20 is not limited to these and may be another radio access technology. Further, the radio communication used by the base station device 20 may be radio communication using radio waves, or radio communication (optical wireless) using infrared rays or visible light.

The base station device 20 can perform NOMA communication with the terminal device 40. Herein, the NOMA communication refers to communication (transmission, reception, or both) using non-orthogonal resources. The non-orthogonal resources will be described later. Incidentally, the base station device 20 may be configured to be capable of NOMA communication with another base station device 20 and the relay device 30.

Incidentally, the base station device 20 may be capable of communicating with each other via a base station device-core network interface (for example, S1 Interface). This interface may be wired or wireless. Further, the base station device may be capable of communicating with each other via an interface (for example, an X2 Interface, and an S1 Interface) between the base station devices. This interface may be wired or wireless.

The base station device 20 can be used, operated, and/or managed by various entities. For example, it may be assumed that the entities include mobile network operators (MNO), mobile virtual network operators (MVNO), mobile virtual network enablers (MVNE), and neutral hosts network (NHN) operators, enterprises, educational institutions (such as school corporations and local government education committees), real estate (such as buildings and condominiums) managers, individuals, and the like.

Of course, the entity of use, operation, and/or management of the base station device 20 is not limited to these. The base station device 20 may be installed and/or operated by one operator or may be installed and/or operated by an individual. Of course, the installation/operation entity of the base station device 20 is not limited to these. For example, the base station device 20 may be jointly installed and operated by a plurality of operators or a plurality of individuals. Further, the base station device 20 may be a shared facility used by a plurality of operators or a plurality of individuals. In this case, the installation and/or operation of the facility may be carried out by a third party different from the user.

Incidentally, the concept of the base station device (also referred to as a base station) includes not only a donor base station but also a relay base station (also referred to as a relay station or a relay station device). Further, the concept of the base station includes not only a structure having a function of the base station but also a device installed in the structure.

The structure is, for example, a building such as a high-rise building, a house, a steel tower, a station facility, an airport facility, a port facility, or a stadium. Incidentally, the concept of the structure includes not only buildings but also non-building structures such as tunnels, bridges, dams, walls, and iron pillars, and facilities such as cranes, gates, and windmills. Further, the concept of the structure includes not only structures on land (on the ground in a narrow sense) or underground, but also structures on the water such as piers and mega floats and underwater structures such as ocean observation facilities. The base station device can be referred to as a processing device or an information processing device.

The base station device 20 may be a donor station or a relay station. Further, the base station device 20 may be a fixed station or a mobile station. The mobile station is a radio communication device (for example, the base station device) configured to be movable. At this time, the base station device 20 may be a device installed on a mobile body or may be a mobile body itself. For example, a relay station device having mobility can be regarded as the base station device 20 as the mobile station. Further, a device, such as a vehicle, a drone, and a smartphone, which originally has mobility and is mounted with the functions (at least a part of the functions of the base station device) of the base station device is also included in the base station device 20 as the mobile station.

Herein, the mobile body may be a mobile terminal such as a smartphone or a mobile phone. Further, the mobile body may be a mobile body (for example, a vehicle such as a car, a bicycle, a bus, a truck, a motorcycle, a train, and a linear motor car) which moves on land (on the ground in a narrow sense) or may be a mobile body (for example, a subway) which moves underground (for example, in a tunnel).

The mobile body may be a mobile body (for example, a ship such as a passenger ship, a cargo ship, or a hovercraft) which moves on the water or may be a mobile body (for example, a submersible ship such as a submersible, a submarine, and an unmanned submarine) which moves underwater.

The mobile body may be a mobile body (for example, an aircraft such as an airplane, an airship, and a drone) which moves in the atmosphere or may be a mobile body (for example, an artificial object such as an artificial satellite, a spacecraft, a space station, and a probe) which moves outside the atmosphere. The mobile body which moves outside the atmosphere can be referred to as a space mobile body.

The base station device 20 may be a ground base station device (ground station device) installed on the ground. For example, the base station device 20 may be a base station device arranged in a structure on the ground or may be a base station device installed in a mobile body moving on the ground. More specifically, the base station device 20 may be an antenna installed in a structure such as a building and a signal processing device connected to the antenna. Of course, the base station device 20 may be a structure or a mobile body itself. "On the ground" is not only on land (on the ground in a narrow sense) but also on the ground in a broad sense including underground, water, and underwater. Incidentally, the base station device 20 is not limited to the ground base station device. The base station device 20 may be a non-ground base station device (non-ground station device) capable of floating in the air or space. For example, the base station device 20 may be an aircraft station device or a satellite station device.

The aircraft station device is a radio communication device, such as an aircraft, which can float in the atmosphere. The aircraft station device may be a device mounted on an aircraft or the like or may be an aircraft itself. Incidentally, the concept of the aircraft includes not only a heavy aircraft such as an airplane and a glider but also a light aircraft such as a balloon and an airship. Further, the concept of the aircraft includes not only the heavy aircraft and the light aircraft but also a rotorcraft such as a helicopter and an autogyro. Incidentally, the aircraft station device (or the aircraft on which the aircraft station device is mounted) may be an unmanned aerial vehicle such as a drone.

Incidentally, the concept of the unmanned aerial vehicle also includes an unmanned aircraft systems (UAS) and a tethered UAS. Further, the concept of the unmanned aerial vehicle includes a lighter than air UAS (LTA) and a heavier than air UAS (HTA). In addition, the concept of the unmanned aerial vehicle also includes high altitude UAS platforms (HAP).

The satellite station device is a radio communication device which can float outside the atmosphere. The satellite station device may be a device mounted on a space mobile body such as an artificial satellite or may be a space mobile body itself. The satellite which serves as a satellite station device may be any satellite of a low earth orbiting (LEO) satellite, a medium earth orbiting (MEO) satellite, a geostationary earth orbiting (GEO) satellite, and a highly elliptical orbiting (HEO) satellite. Of course, the satellite station device may be a device mounted on a low earth orbiting satellite, a medium earth orbiting satellite, a geostationary earth orbiting satellite, or a highly elliptical orbiting satellite.

The size of the coverage of the base station device 20 may be as large as a macro cell or as small as a picocell. Of course, the size of the coverage of the base station device 20 may be as extremely small as a femtocell. Further, the base station device 20 may have a beamforming capability. In this case, the base station device 20 may form a cell or a service area for each beam.

In the example of FIG. 1, the base station device 201 is connected to the relay device 301, and the base station device 202 is connected to the relay device 302. The base station device 201 can indirectly wirelessly communicate with the terminal device 40 via the relay device 301. Similarly, the base station device 202 can indirectly wirelessly communicate with the terminal device 40 via the relay device 302.

[Relay Device]

The relay device 30 is a device which serves as the relay station for the base station. The relay device 30 is a type of the base station device. The relay device can be referred to as a relay base station device (or a relay base station). The relay device 30 can perform NOMA communication with the terminal device 40. The relay device 30 relays communication between the base station device 20 and the terminal device 40. Incidentally, the relay device 30 may be configured to enable NOMA communication with another relay device 30 and the base station device 20. The relay device 30 may be a ground station device or a non-ground station device. The relay device 30 configures a radio access network RAN together with the base station device 20.

[Terminal Device]

The terminal device 40 is a radio communication device which wirelessly communicates with the base station device 20 or the relay device 30. The terminal device 40 is, for example, a mobile phone, a smart device (a smartphone or a tablet), a Personal Digital Assistant (PDA), or a personal computer. Further, the terminal device 40 may be a Machine to Machine (M2M) device or an Internet of Things (IoT) device.

The terminal device 40 may be capable of sidelink communication with another terminal device 40. The terminal device 40 may be capable of using an automatic retransmission technology such as HARQ when performing the sidelink communication. The terminal device 40 is capable of NOMA communication with the base station device 20 and the relay device 30. Incidentally, the terminal device 40 may also be capable of NOMA communication in communication (sidelink) with another terminal device 40. Incidentally, the radio communication (including the sidelink communication) used by the terminal device 40 may be radio communication using radio waves or may be radio communication (optical radio) using infrared rays or visible light.

The terminal device 40 may be a mobile device. Herein, the mobile device is a mobile radio communication device. At this time, the terminal device 40 may be a radio communication device installed on a mobile body or may be a mobile body itself. For example, the terminal device 40 may be a vehicle, such as a car, a bus, a truck, or a motorcycle, which moves on the road or a radio communication device mounted on the vehicle. Incidentally, the mobile body may be a mobile terminal or may be a mobile body which moves on land (on the ground in a narrow sense), underground, on the water, and underwater. Further, the mobile body may be a mobile body, such as a drone or a helicopter, which moves in the atmosphere or may be a mobile body, such as an artificial satellite, which moves outside the atmosphere.

The terminal device 40 may connect a plurality of base station devices or a plurality of cells at the same time to perform communication. For example, in a case where one base station device supports a communication area via a plurality of cells (for example, pCell and sCell), with carrier aggregation (CA) technology, dual connectivity (DC) technology, or multi-connectivity (MC) technology, the plurality of cells are bundled so that communication can be performed between the base station device 20 and the terminal device 40. Alternatively, with the coordinated multi-point transmission and reception (CoMP) technology, the terminal device 40 and the plurality of base station devices 20 can communicate through the cells of the different base station devices 20.

Incidentally, the terminal device 40 does not necessarily have to be a device directly used by a person. The terminal device 40 may be a sensor installed in a machine or the like in a factory as in a so-called Machine Type Communication (MTC). Further, the terminal device 40 may be a Machine to Machine (M2M) device or an Internet of Things (IoT) device. Further, the terminal device 40 may be a device equipped with a relay communication function as represented by Device to Device (D2D) and Vehicle to everything (V2X). Further, the terminal device 40 may be a device called Client Premises Equipment (CPE) used in a wireless backhaul or the like.

Hereinafter, the configuration of each device configuring the communication system 1 according to the embodiment will be specifically described. Incidentally, the configuration of each device to be illustrated below is merely an example. The configuration of each device may differ from the configuration below.

<2-2. Configuration of Management Device>

Figure 2:
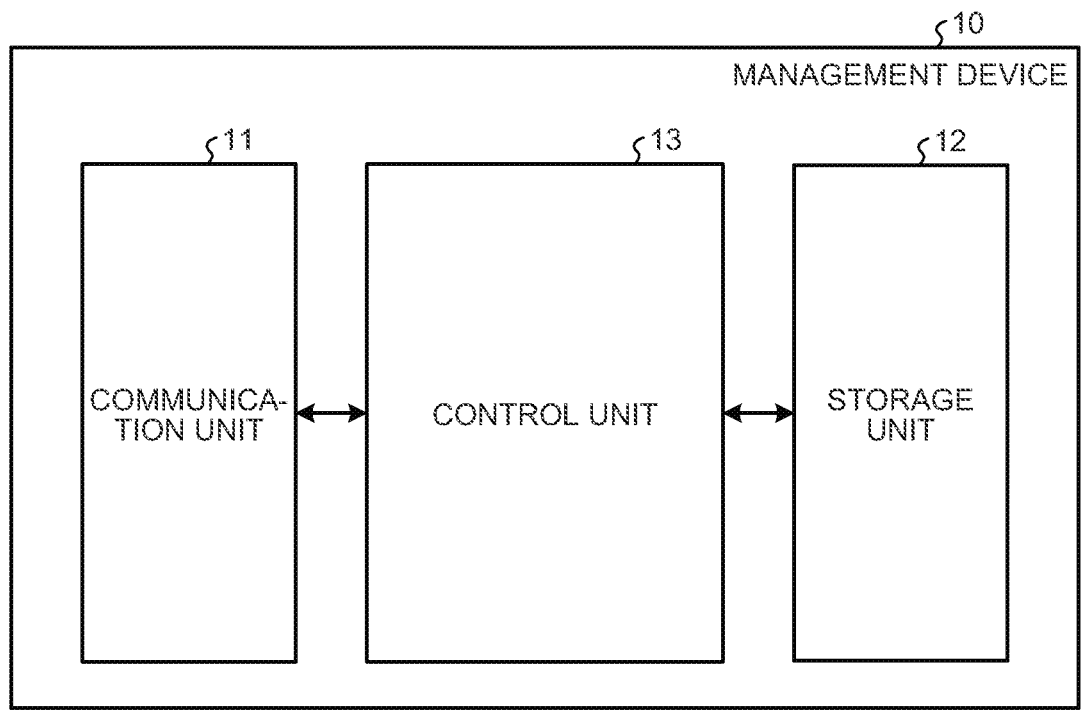
FIG. 2 is a diagram illustrating a configuration example of a management device according to the embodiment of the present disclosure.

FIG. 2 is a diagram illustrating a configuration example of the management device 10 according to the embodiment of the present disclosure. The management device 10 is a device which manages a radio network. The management device 10 includes a communication unit 11, a storage unit 12, and a control unit 13. Incidentally, the configuration illustrated in FIG. 2 is a functional configuration, and the hardware configuration may be different therefrom. Further, the functions of the management device 10 may be distributed and implemented in a plurality of physically separated configurations. For example, the management device 10 may be configured by a plurality of server devices.

The communication unit 11 is a communication interface for communication with other devices. The communication unit 11 may be a network interface or a device connection interface. For example, the communication unit 11 may be a Local Area Network (LAN) interface such as a Network Interface Card (NIC) or may be a USB interface configured by a Universal Serial Bus (USB) host controller, a USB port, and the like. Further, the communication unit 11 may be a wired interface or a wireless interface. The communication unit 11 functions as a communication means of the management device 10. The communication unit 11 communicates with the base station device 20 according to the control of the control unit 13.

The storage unit 12 is a storage device, such as a Dynamic Random Access Memory (DRAM), a Static Random Access Memory (SRAM), a flash memory, and a hard disk, which can read and write data. The storage unit 12 functions as a storage means of the management device 10. The storage unit 12 stores, for example, the connected state of the terminal device 40. For example, the storage unit 12 stores the state of the Radio Resource Control (RRC) of the terminal device 40 or the state of the EPS Connection Management (ECM). The storage unit 12 may function as a home memory which stores the position information of the terminal device 40.

The control unit 13 is a controller which controls each unit of the management device 10. For example, the control unit 13 is realized by a processor such as a Central Processing Unit (CPU) or a Micro Processing Unit (MPU). For example, the control unit 13 is realized when the processor executes various programs stored in the storage device inside the management device 10 by using Random Access Memory (RAM) or the like as a work area. Incidentally, the control unit 13 may be realized by an integrated circuit such as an Application Specific Integrated Circuit (ASIC) and a Field Programmable Gate Array (FPGA). Any one of the CPU, MPU, ASIC, and FPGA can be regarded as a controller.

<2-3. Configuration of Base Station Device>

Figure 3:
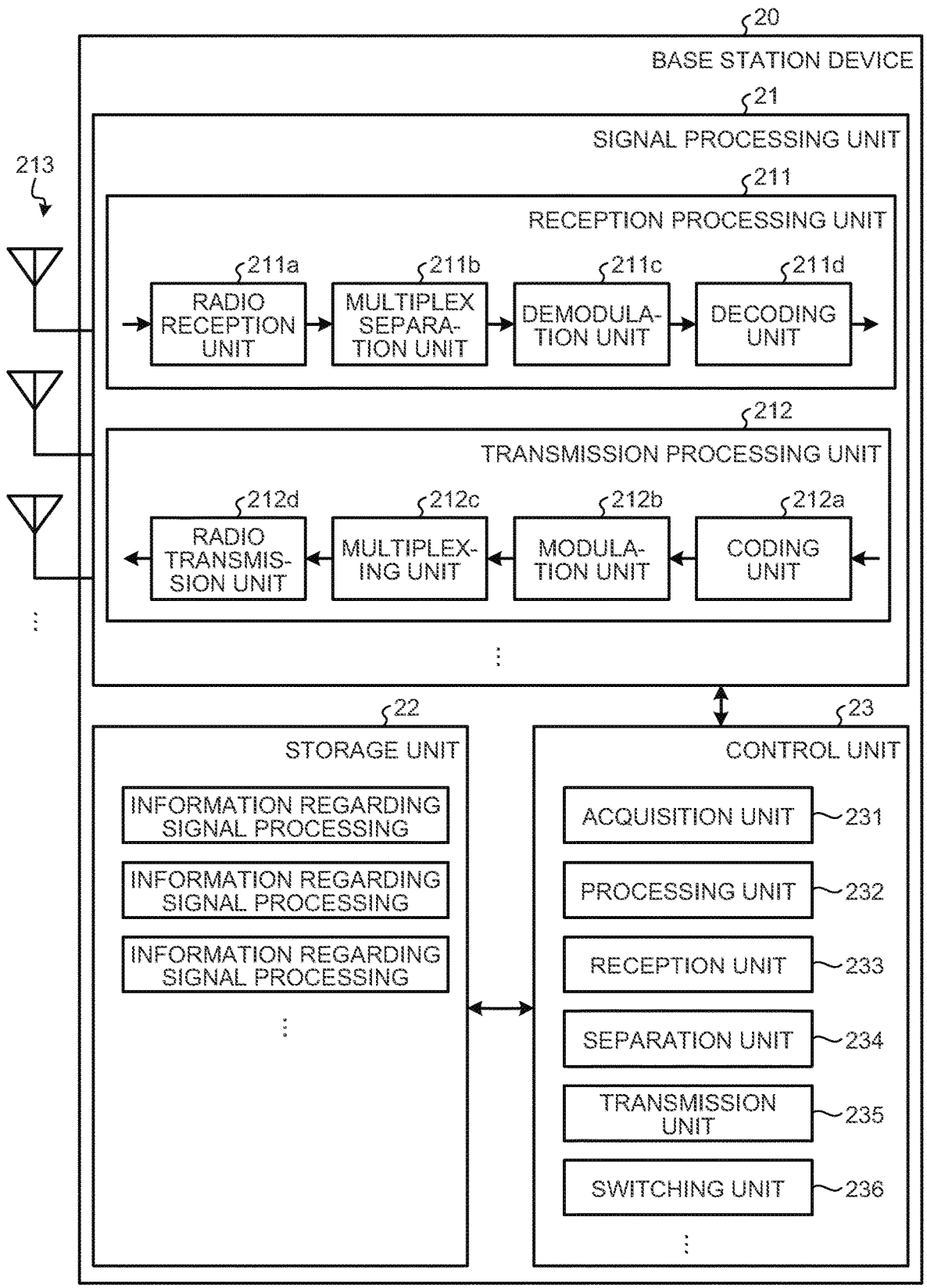
FIG. 3 is a diagram illustrating a configuration example of a base station device according to the embodiment of the present disclosure.

Next, the configuration of the base station device will be described. FIG. 3 is a diagram illustrating a configuration example of the base station device 20 according to the embodiment of the present disclosure. The base station device 20 is capable of NOMA communication with the terminal device 40. The base station device 20 includes a signal processing unit 21, a storage unit 22, and a control unit 23. Incidentally, the configuration illustrated in FIG. 3 is a functional configuration, and the hardware configuration may be different therefrom. Further, the functions of the base station device 20 may be distributed and implemented in a plurality of physically separated devices.

The signal processing unit 21 is a signal processing unit for radio communication with another radio communication device (for example, the terminal device 40 and the relay device 30). The signal processing unit 21 operates according to the control of the control unit 23. The signal processing unit 21 supports one or more radio access methods. For example, the signal processing unit 21 supports both NR and LTE. The signal processing unit 21 may support W-CDMA or cdma2000 in addition to NR and LTE. Further, the signal processing unit 21 supports communication using NOMA. The NOMA will be described in detail later.

The signal processing unit 21 includes a reception processing unit 211, a transmission processing unit 212, and an antenna 213. The signal processing unit 21 may include a plurality of reception processing units 211, a plurality of transmission processing units 212, and a plurality of antennas 213. Incidentally, in a case where the signal processing unit 21 supports a plurality of radio access methods, each unit of the signal processing unit 21 may be individually configured for each radio access method. For example, the reception processing unit 211 and the transmission processing unit 212 may be individually configured by LTE and NR.

The reception processing unit 211 performs processing of the uplink signal received via the antenna 213. The reception processing unit 211 includes a radio reception unit 211a, a multiplex separation unit 211b, a demodulation unit 211c, and a decoding unit 211d.

With respect to the uplink signal, the radio reception unit 211a performs down-conversion, the removal of unnecessary frequency components, the control of amplification level, orthogonal demodulation, the conversion to digital signals, the removal of guard interval, the extraction of frequency domain signals by fast Fourier transform, and the like. The multiplex separation unit 211b separates uplink channels such as a Physical Uplink Shared Channel (PUSCH) and a Physical Uplink Control Channel (PUCCH) and uplink reference signals from the signal output from the radio reception unit 211a. The demodulation unit 211c demodulates the received signal for the modulation symbol of the uplink channel by using a modulation method such as Binary Phase Shift Keying (BPSK) and Quadrature Phase shift Keying (QPSK). The modulation method used by the demodulation unit 211c may be 16 Quadrature Amplitude Modulation (QAM), 64QAM, or 256QAM. In this case, the signal points on a constellation do not necessarily have to be equidistant. The constellation may be a non uniform constellation (NUC). The decoding unit 211d performs decoding processing on encoded bits of the demodulated uplink channel. The decoded uplink data and/or uplink control information are output to the control unit 23.

The transmission processing unit 212 performs transmission processing of downlink control information and downlink data. The transmission processing unit 212 includes a coding unit 212a, a modulation unit 212b, a multiplexing unit 212c, and a radio transmission unit 212d.

The coding unit 212a encodes the downlink control information and the downlink data input from the control unit 23 by using a coding method such as block coding, convolutional coding, and turbo coding. The modulation unit 212b modulates the encoded bits output from the coding unit 212a by using a predetermined modulation method such as BPSK, QPSK, 16QAM, 64QAM, and 256QAM. In this case, the signal points on a constellation do not necessarily have to be equidistant. The constellation may be a non-uniform constellation. The multiplexing unit 212c multiplexes the modulation symbol and the downlink reference signal of each channel and arranges the result in a predetermined resource element. The radio transmission unit 212d performs various signal processing on the signal from the multiplexing unit 212c. For example, the radio transmission unit 212d performs processing such as the conversion to time domains by fast Fourier transform, the addition of guard intervals, the generation of baseband digital signals, the conversion to analog signals, quadrature modulation, up-conversion, the removal of extra frequency components, and power amplification. The signal generated by the transmission processing unit 212 is transmitted from the antenna 213.

The storage unit 22 is a storage device, such as a DRAM, an SRAM, a flash memory, and a hard disk, which can read and write data. The storage unit 22 functions as a storage means of the base station device 20. The storage unit 22 stores "information regarding transmission from the unconnected state (information for unconnected transmission)" to be notified to the terminal device. The "Information regarding transmission from the unconnected state (information for unconnected transmission)" will be described in detail later.

The control unit 23 is a controller which controls each unit of the base station device 20. For example, the control unit 23 is realized by a processor such as a Central Processing Unit (CPU) or a Micro Processing Unit (MPU). For example, the control unit 23 is realized when the processor executes various programs stored in the storage device inside the base station device 20 by using Random Access Memory (RAM) or the like as a work area. Incidentally, the control unit 23 may be realized by an integrated circuit such as an Application Specific Integrated Circuit (ASIC) and a Field Programmable Gate Array (FPGA). Any one of the CPU, MPU, ASIC, and FPGA can be regarded as a controller.

As illustrated in FIG. 3, the control unit 23 includes an acquisition unit 231, a processing unit 232, a reception unit 233, a separation unit 234, a transmission unit 235, and a switching unit 236. Each of the blocks (the acquisition unit 231 to the switching unit 236) configuring the control unit 23 is a functional block indicating the function of the control unit 23. These functional blocks may be software blocks or hardware blocks. For example, each of the above-described functional blocks may be one software module realized by software (including a microprogram) or one circuit block on a semiconductor chip (die). Of course, each functional block may be one processor or one integrated circuit. A method of configuring the functional block is arbitrary.

Incidentally, the control unit 23 may be configured in a functional unit different from the above-described functional blocks. The operation of each block (the acquisition unit 231 to the switching unit 236) configuring the control unit 23 will be described later. Incidentally, the operation of each block configuring the control unit 23 may be similar to the operation of each block configuring the control unit of the terminal device 40. The configuration of the terminal device 40 will be described later.

<2-4. Configuration of Relay Device>

Figure 4:
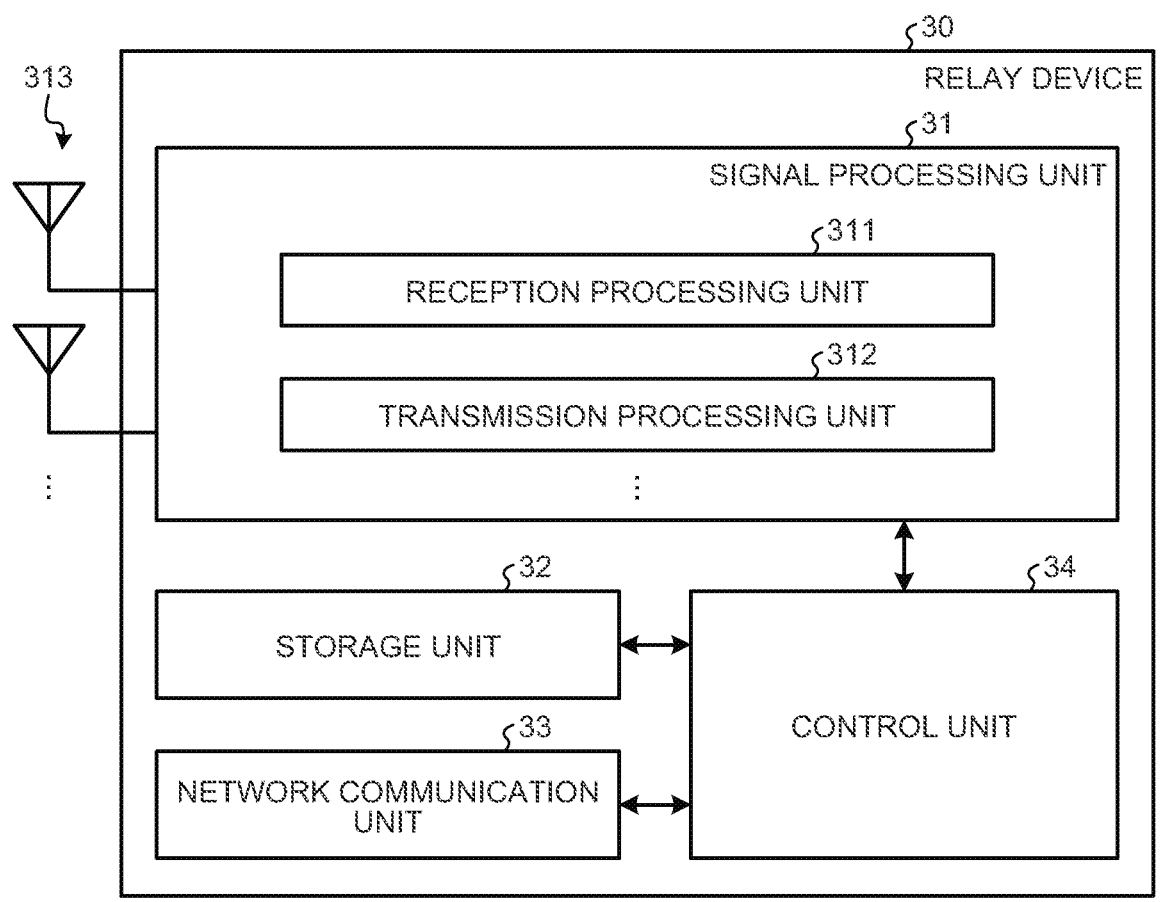
FIG. 4 is a diagram illustrating a configuration example of a relay device according to the embodiment of the present disclosure.

Next, the configuration of the relay device 30 will be described. FIG. 4 is a diagram illustrating a configuration example of the relay device 30 according to the embodiment of the present disclosure. The relay device 30 is capable of NOMA communication with the terminal device 40. The relay device 30 includes a signal processing unit 31, a storage unit 32, a network communication unit 33, and a control unit 34. Incidentally, the configuration illustrated in FIG. 4 is a functional configuration, and the hardware configuration may be different therefrom. Further, the functions of the relay device 30 may be distributed and implemented in a plurality of physically separated configurations.

The signal processing unit 31 is a signal processing unit for radio communication with another radio communication device (for example, the base station device 20 and the terminal device 40). The signal processing unit 31 operates according to the control of the control unit 34. The signal processing unit 31 includes a reception processing unit 311, a transmission processing unit 312, and an antenna 313. The configuration of the signal processing unit 31, the reception processing unit 311, the transmission processing unit 312, and the antenna 313 is similar to the signal processing unit 21, the reception processing unit 211, the transmission processing unit 212, and the antenna 213 of the base station device 20.

The storage unit 32 is a storage device, such as a DRAM, an SRAM, a flash memory, and a hard disk, which can read and write data. The storage unit 32 functions as a storage means of the relay device 30. The configuration of the storage unit 32 is similar to that of the storage unit 22 of the base station device 20.

The network communication unit 33 is a communication interface for communication with other devices. For example, the network communication unit 33 is a LAN interface such as a NIC. Further, the network communication unit 33 may be a wired interface or a wireless interface. The network communication unit 33 functions as a network communication means of the relay device 30. The network communication unit 33 communicates with the base station device 20 according to the control of the control unit 34.

The control unit 34 is a controller which controls each unit of the relay device 30. The configuration of the control unit 34 is similar to that of the control unit 23 of the base station device 20.

<2-5. Configuration of Terminal Device>

Figure 5:
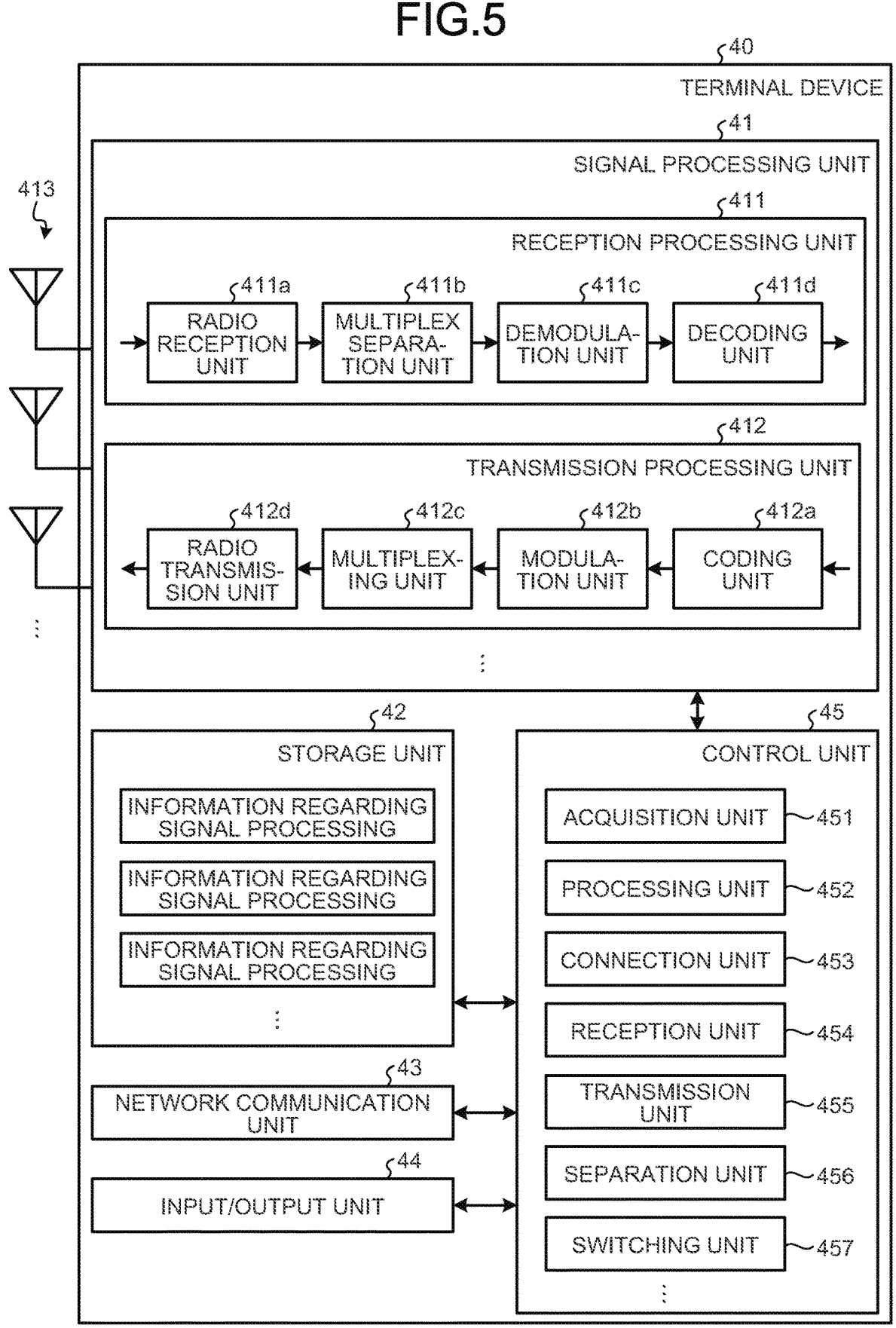
FIG. 5 is a diagram illustrating a configuration example of a terminal device according to the embodiment of the present disclosure.

Next, the configuration of the terminal device 40 will be described. FIG. 5 is a diagram illustrating a configuration example of the terminal device 40 according to the embodiment of the present disclosure. The terminal device 40 is capable of NOMA communication with the base station device 20 and the relay device 30. The terminal device 40 includes a signal processing unit 41, a storage unit 42, a network communication unit 43, an input/output unit 44, and a control unit 45. Incidentally, the configuration illustrated in FIG. 5 is a functional configuration, and the hardware configuration may be different therefrom. Further, the functions of the terminal device 40 may be distributed and implemented in a plurality of physically separated configurations.

The signal processing unit 41 is a signal processing unit for radio communication with another radio communication device (for example, the base station device 20 and the relay device 30). The signal processing unit 41 operates according to the control of the control unit 45. The signal processing unit 41 supports one or more radio access methods. For example, the signal processing unit 41 supports both NR and LTE. The signal processing unit 41 may support W-CDMA or cdma2000 in addition to NR and LTE. Further, the signal processing unit 41 supports communication using NOMA. The NOMA will be described in detail later.

The signal processing unit 41 includes a reception processing unit 411, a transmission processing unit 412, and an antenna 413. The signal processing unit 41 may include a plurality of reception processing units 411, a plurality of transmission processing units 412, and a plurality of antennas 413. Incidentally, in a case where the signal processing unit 41 supports a plurality of radio access methods, each unit of the signal processing unit 41 may be individually configured for each radio access method. For example, the reception processing unit 411 and the transmission processing unit 412 may be individually configured by LTE and NR.

The reception processing unit 411 performs processing of the downlink signal received via the antenna 413. The reception processing unit 411 includes a radio reception unit 411*a*, a multiplex separation unit 411*b*, a demodulation unit 411*c*, and a decoding unit 411*d*.

With respect to the downlink signal, the radio reception unit 411*a* performs down-conversion, the removal of unnecessary frequency components, the control of amplification level, orthogonal demodulation, the conversion to digital signals, the removal of guard interval, the extraction of frequency domain signals by fast Fourier transform, and the like. The multiplex separation unit 411*b* separates a downlink channel, a downlink synchronization signal, and a downlink reference signal from the signal output from the radio reception unit 411*a*. The downlink channel is, for example, a channel such as Physical Broadcast Channel (PBCH), Physical Downlink Shared Channel (PDSCH), and Physical Downlink Control Channel (PDSCH). The demodulation unit 211*c* demodulates the received signal for the modulation symbol of the downlink channel by using a modulation method such as BPSK, QPSK, 16QAM, 64QAM, or 256QAM. In this case, the signal points on a constellation do not necessarily have to be equidistant. The constellation may be a non-uniform constellation. The decoding unit 411*d* performs decoding processing on encoded bits of the demodulated downlink channel. The decoded downlink data and/or downlink control information are output to the control unit 45.

The transmission processing unit 412 performs transmission processing of uplink control information and uplink data. The transmission processing unit 412 includes a coding unit 412*a*, a modulation unit 412*b*, a multiplexing unit 412*c*, and a radio transmission unit 412*d*.

The coding unit 412*a* encodes the uplink control information and the uplink data input from the control unit 45 by using a coding method such as block coding, convolutional coding, and turbo coding. The modulation unit 412*b* modulates the encoded bits output from the coding unit 412*a* by using a predetermined modulation method such as BPSK, QPSK, 16QAM, 64QAM, and 256QAM. In this case, the signal points on a constellation do not necessarily have to be equidistant. The constellation may be a non-uniform constellation. The multiplexing unit 412*c* multiplexes the modulation symbol and the uplink reference signal of each channel and arranges the result in a predetermined resource element. The radio transmission unit 412*d* performs various signal processing on the signal from the multiplexing unit 412*c*. For example, the radio transmission unit 412*d* performs processing such as the conversion to time domains by fast Fourier transform, the addition of guard intervals, the generation of baseband digital signals, the conversion to analog signals, quadrature modulation, up-conversion, the removal of extra frequency components, and power amplification. The signal generated by the transmission processing unit 412 is transmitted from the antenna 413.

The storage unit 42 is a storage device, such as a DRAM, an SRAM, a flash memory, and a hard disk, which can read and write data. The storage unit 42 functions as a storage means of the terminal device 40. The storage unit 42 stores "information regarding transmission from the unconnected state (information for unconnected transmission)" acquired from the base station device 20. The "Information regarding transmission from the unconnected state (information for unconnected transmission)" will be described in detail later.

The network communication unit 43 is a communication interface for communication with other devices. For example, the network communication unit 43 is a LAN interface such as a NIC. Further, the network communication unit 43 may be a wired interface or a wireless interface. The network communication unit 43 functions as a network communication means of the terminal device 40. The network communication unit 43 communicates with another device according to the control of the control unit 45.

The input/output unit 44 is a user interface for exchanging information with the user. For example, the input/output unit 44 is an operation device, such as a keyboard, a mouse, operation keys, and a touch panel, for the user performing various operations. Alternatively, the input/output unit 44 is a display device such as a liquid crystal display and an organic electroluminescence display (organic EL display). The input/output unit 44 may be an audio device such as a speaker and a buzzer. Further, the input/output unit 44 may be a lighting device such as an LED (Light Emitting Diode) lamp. The input/output unit 44 functions as an input/output means (an input means, an output means, an operation means, or a notification means) of the terminal device 40.

The control unit 45 is a controller which controls each unit of the terminal device 40. The control unit 45 is realized by, for example, a processor such as a CPU and MPU. For example, the control unit 45 is realized when the processor executes various programs stored in the storage device inside the terminal device 40 by using RAM or the like as a work area. Incidentally, the control unit 45 may be realized by an integrated circuit such as an ASIC or FPGA. Any one of the CPU, MPU, ASIC, and FPGA can be regarded as a controller.

As illustrated in FIG. 5, the control unit 45 includes an acquisition unit 451, a processing unit 452, a connection unit 453, a reception unit 454, a transmission unit 455, a separation unit 456, and a switching unit 457. Each of the blocks (the acquisition unit 451 to the switching unit 457) configuring the control unit 45 is a functional block indicating the function of the control unit 45. These functional blocks may be software blocks or hardware blocks. For example, each of the above-described functional blocks may be one software module realized by software (including a microprogram) or one circuit block on a semiconductor chip (die). Of course, each functional block may be one processor or one integrated circuit. A method of configuring the functional block is arbitrary.

Incidentally, the control unit 45 may be configured in a functional unit different from the above-described functional blocks. The operation of each block (the acquisition unit 451 to the switching unit 457) configuring the control unit 45 will be described later. Incidentally, the operation of each block configuring the control unit 45 may be similar to the operation of each block (the acquisition unit 231 to the switching unit 236) configuring the control unit 23 of the base station device 20.

<2-6. Radio Frame Configuration>

Next, the radio frame configuration in the radio access network RAN will be described.

Figure 6:
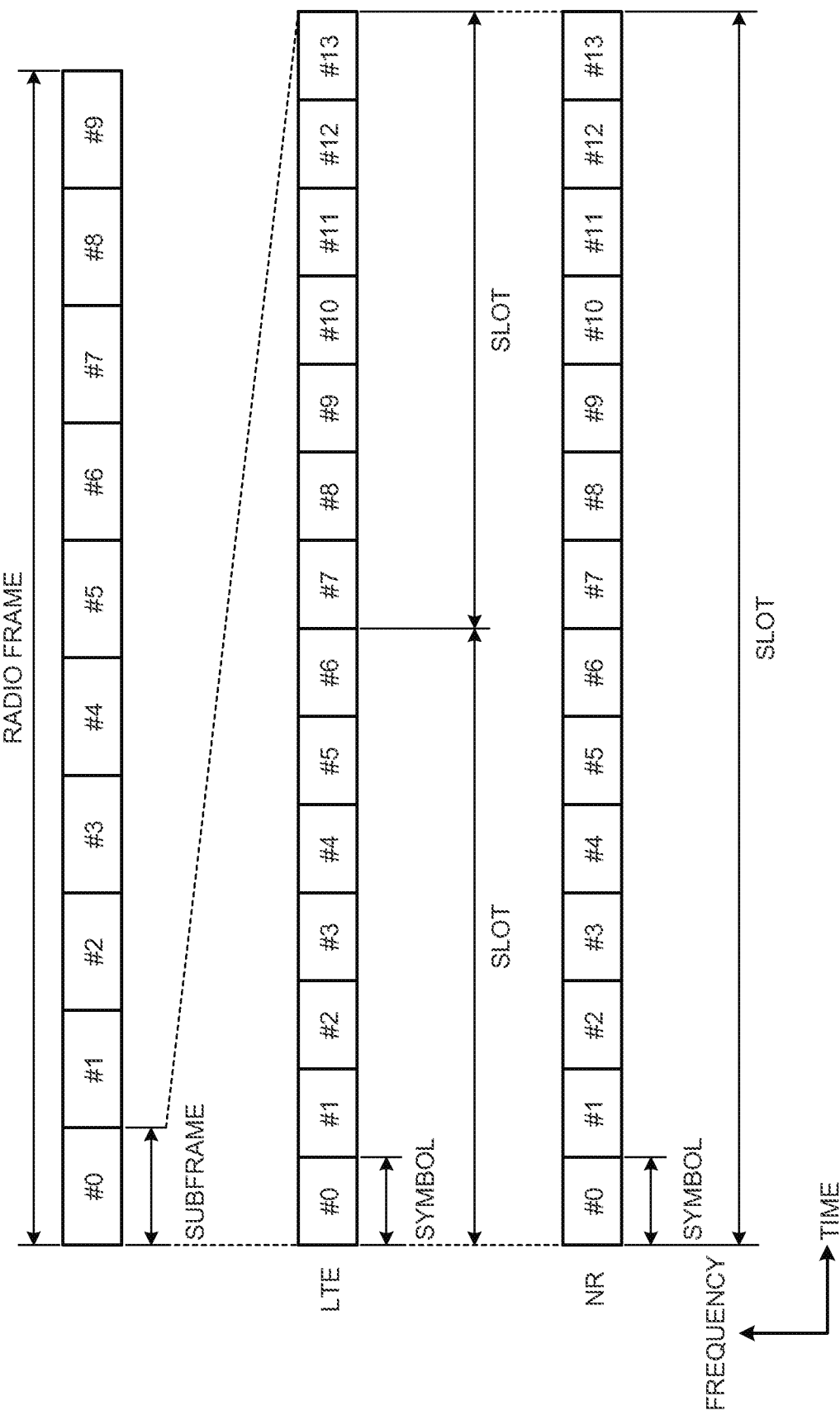
FIG. 6 is a diagram illustrating a radio frame configuration used in a radio access network according to the embodiment of the present disclosure.

FIG. 6 is a diagram illustrating a radio frame configuration used in the radio access network RAN according to the embodiment of the present disclosure. The radio access network RAN defines a radio frame configured in 10 ms. One radio frame is configured by 10 subframes. The subframe time interval is 1 ms. The subframe is configured by, for example, 14 symbols. Herein, the symbol is, for example, an OFDM symbol or an SC-FDMA symbol. In LTE, for example, one slot is configured by seven symbols. In NR, for example, one slot is configured by 14 symbols. The subframe configurations of LTE and NR will be described below.

[Subframe Configuration of LTE]

Figure 7:
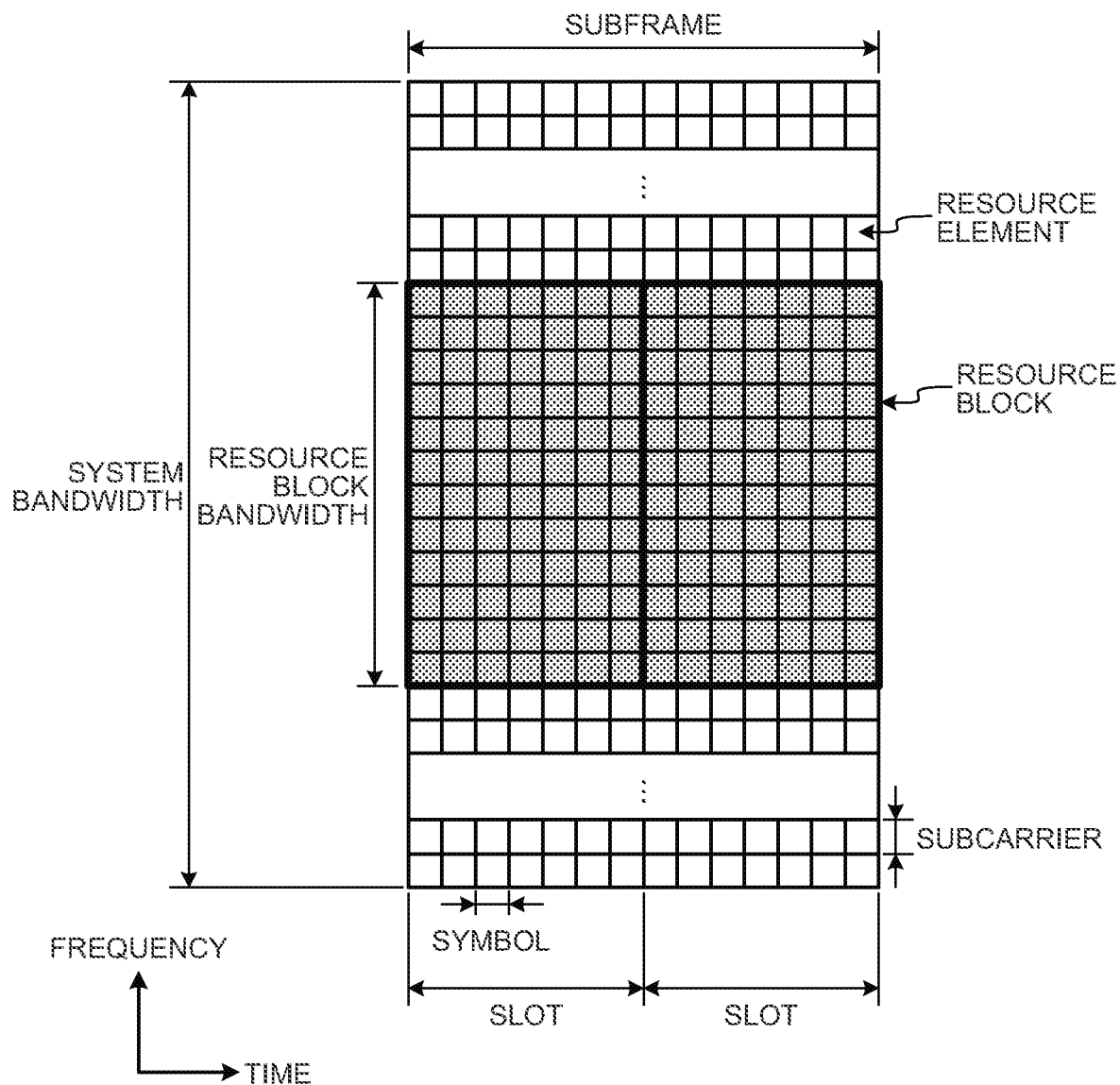
FIG. 7 is a diagram illustrating an example of a subframe configuration of LTE.

FIG. 7 is a diagram illustrating an example of a subframe configuration of LTE. In the example illustrated in FIG. 7, a resource grid with frequency on the vertical axis and time on the horizontal axis is illustrated. In the example illustrated in FIG. 7, a system bandwidth indicates the bandwidth of the LTE cell. Each of a plurality of grids in the resource grid represents a resource element. The size of one resource element is one subcarrier in a frequency direction and one symbol in a time direction. In the case of LTE, one slot is defined by a plurality of symbols. The number of symbols in one slot is determined by the type of CP (Cyclic Prefix). The type of CP is a normal CP or an extended CP. In the normal CP, the number of symbols which configure one slot is seven. In the extended CP, the number of symbols which configure one slot is six.

A resource block is used to map a physical channel (PDSCH, PUSCH, and the like) to a resource element. One resource block is defined by a predetermined number of subcarriers continuous in the frequency domain and a predetermined number of symbols continuous in the time domain. The number of symbols and the number of subcarriers (resource block bandwidth) in one resource block are determined on the basis of the type of CP in the cell, a subcarrier interval, the parameters set by an upper layer, and/or the like. For example, in a case where the type of CP is a normal CP, and the subcarrier interval is 15 kHz, the number of symbols in one resource block is seven, and the number of subcarriers is 12. In this case, one resource block is configured by (7×12) resource elements.

In each of the LTE cells, one predetermined parameter is used in a certain subframe. The predetermined parameter is, for example, a parameter (physical parameter) related to a transmission signal. The parameters related to the transmission signal include a CP length, a subcarrier interval, the number of symbols in one subframe (predetermined time length), the number of subcarriers in one resource block (predetermined frequency band), a multiple access method, a signal waveform, and the like. In the LTE cells, link signals (the downlink signal and the uplink signal) are each generated by using one or more predetermined parameters in a predetermined time length (for example, a subframe).

[Frame Configuration of NR]

Figure 8:
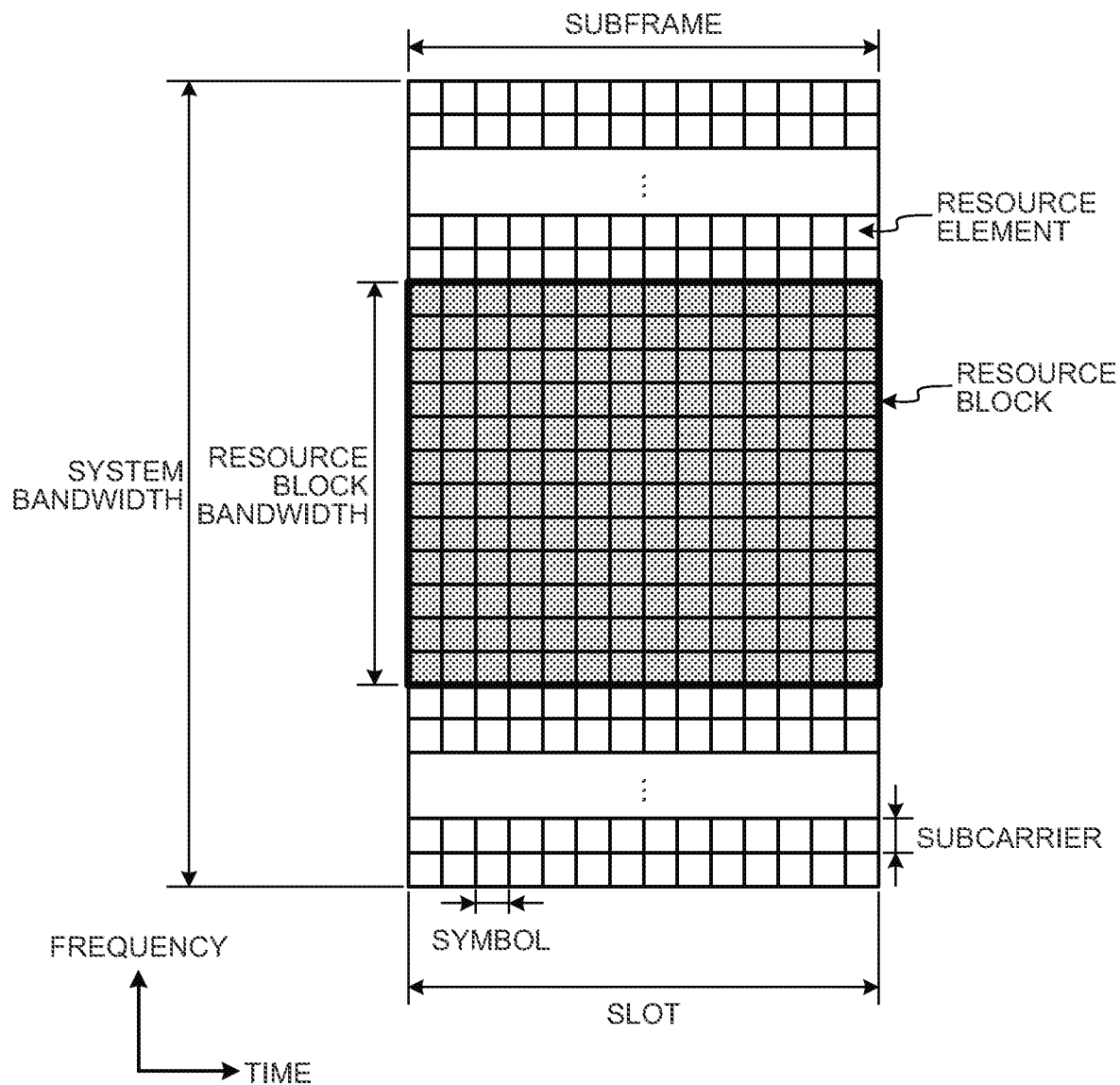
FIG. 8 is a diagram illustrating an example of a subframe configuration of NR.

FIG. 8 is a diagram illustrating an example of the subframe configuration of NR. In the example illustrated in FIG. 8, the system bandwidth indicates the bandwidth of the NR cell. In the case of NR cell, one or more predetermined parameters are used in a certain predetermined time length (for example, a subframe). That is, in the NR cell, the link signal is generated using one or more predetermined parameters in a predetermined time length. In a case where the plurality of predetermined parameters are used, a signal generated using the predetermined parameters is multiplexed in accordance with a predetermined method. For example, the predetermined method is Frequency Division Multiplexing (FDM), Time Division Multiplexing (TDM), Code Division Multiplexing (CDM), Spatial Division Multiplexing (SDM), and/or the like.

In a combination of the predetermined parameters set in the NR cell, a plurality of kinds of parameter sets can be specified in advance. FIG. 9 is a diagram illustrating examples of the parameter sets related to a transmission signal in the NR cell. In the example of FIG. 9, the parameters are a "subcarrier interval (subcarrier spacing)", the "maximum bandwidth" of component carriers, a "CP length type", the "number of symbols" per subframe, and the "number of subcarriers" per resource block in the NR cell. One of the parameters may be "radio frame length". Incidentally, the "CP length type" is the type of CP length used in the NR cell. For example, CP length type 1 is equivalent to a normal CP in LTE, and CP length type 2 is equivalent to an extended CP in LTE. The parameter sets related to a transmission signal in the NR cell can be specified individually with a downlink and an uplink. Further, the parameter sets related to a transmission signal in the NR cell can be set independently with a downlink and an uplink.

In the example of FIG. 9, 15 kHz (subcarrier interval), 20 MHz (maximum bandwidth), type 1 (CP length type), (the number of symbols), 1 ms (subframe length), 10 ms (radio frame length), and 12 (the number of subcarriers) are defined as parameter set 0. Further, 7.5 kHz (subcarrier interval), 1.4 MHz (maximum bandwidth), type 1 (CP length type), 70 (the number of symbols), 10 ms (subframe length), 10 ms (radio frame length), (the number of subcarriers) are defined as parameter set 1. Further, 30 kHz (subcarrier interval), 80 MHz (maximum bandwidth), type 1 (CP length type), seven (the number of symbols), 0.25 ms (subframe length), 10 ms (radio frame length), six (the number of subcarriers) are defined as parameter set 2. Further, 15 kHz (subcarrier interval), 20 MHz (maximum bandwidth), type 2 (CP length type), 12 (the number of symbols), 1 ms (subframe length), 10 ms (radio frame length), 12 (the number of subcarriers) are defined as parameter set 3.

Figure 10:
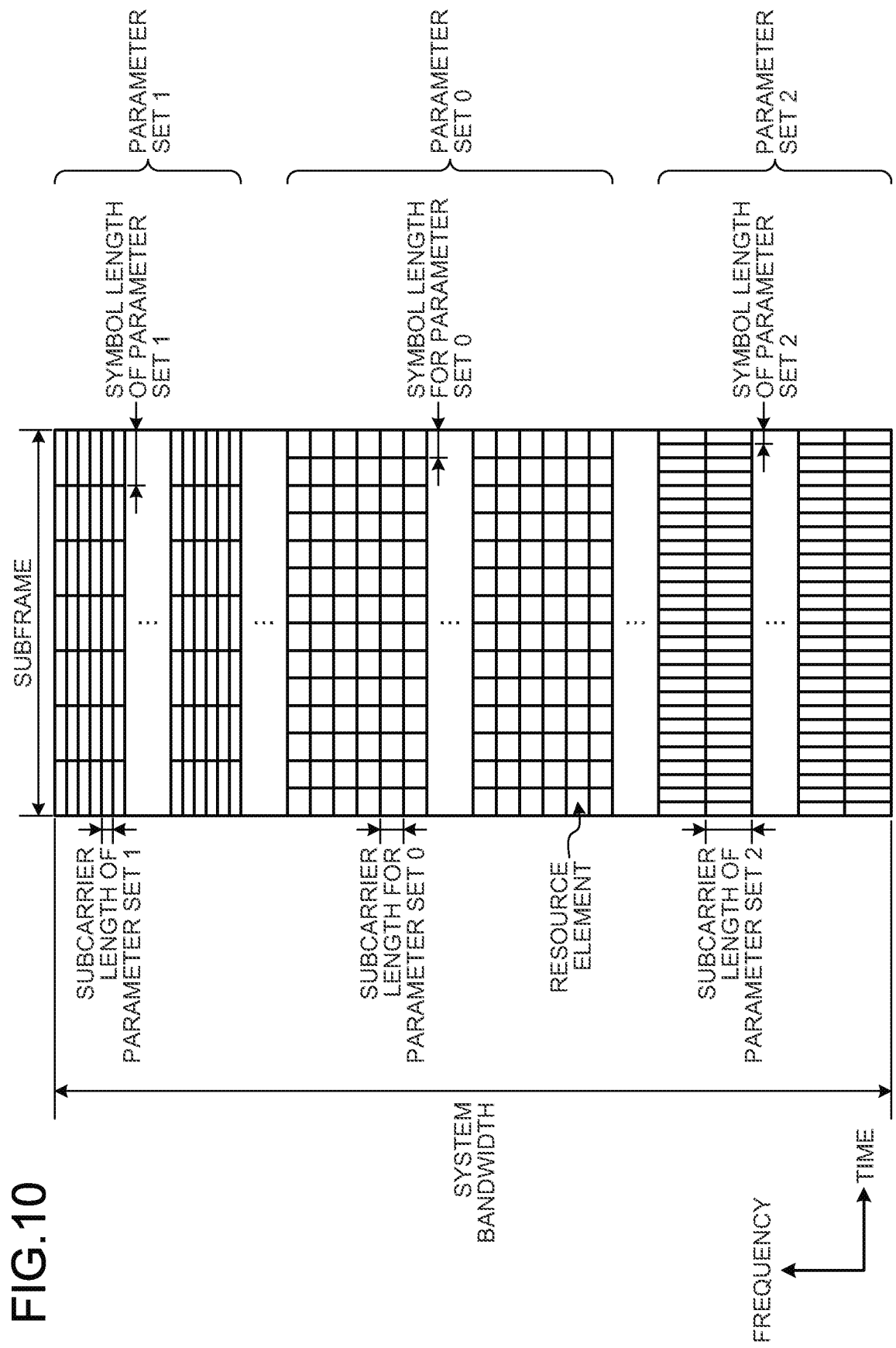
FIG. 10 is a diagram illustrating an example of a downlink subframe of NR.

FIG. 10 is a diagram illustrating an example of a downlink subframe of NR. In the example of FIG. 10, the signals generated using parameter set 1, parameter set 0, and parameter set 2 are frequency-division multiplexed (FDM) into a cell bandwidth (system bandwidth).

3. AS FOR NOMA

One of the technologies being examined by NR is non-orthogonal multiple access (NOMA). This is a technology for improving frequency utilization efficiency by using non-orthogonal resources.

The orthogonal resource is, for example, time (for example, a subframe, a slot, a radio frame), a frequency (for example, a component carrier, a subcarrier, a subchannel, a resource block), an orthogonal code, and the like. Further, the non-orthogonal resource is, for example, a space, power, interleaving (for example, bit interleaving and symbol interleaving), data rate, and a code (for example, a sparse code and a spreading codebook). Herein, the space is, for example, a spatial stream, a spatial layer, a spatial codebook, an antenna, an antenna port, and the like. The orthogonal resource and the non-orthogonal resource are not limited to the above examples. In the following description, the communication (transmission, reception, or both) using non-orthogonal resources may be referred to as NOMA communication. Further, in the following description, the transmission using non-orthogonal resources may be referred to as NOMA transmission, and the reception (decoding and the like) of the signal transmitted by NOMA transmission may be referred to as NOMA reception.

As described above, the communication device of this embodiment can transmit user data from the unconnected state. By using NOMA communication for transmitting user data from the unconnected state, frequency utilization efficiency is further improved.

Incidentally, in orthogonal multiple access (OMA), for example, data transmission/reception is performed using a frequency axis and a time axis which are orthogonal. At this time, the frame configuration of the frequency and time resources is determined by a subcarrier interval, and it is not possible to use resources equal to or more than the number of resource elements. On the other hand, in non-orthogonal multiple access (NOMA), a non-orthogonal axis (for example, an Interleave pattern axis, a Spreading Pattern axis, a Scrambling Pattern axis, a Codebook axis, and a Power axis) is added to the orthogonal frequency axis and time axis to determine a frame configuration.

<3-1. Data Transmission/Reception Using NOMA>

Hereinafter, data transmission/reception using NOMA will be described.

[Non-Orthogonal Multiplexing in Transmission Device]

Figure 12:
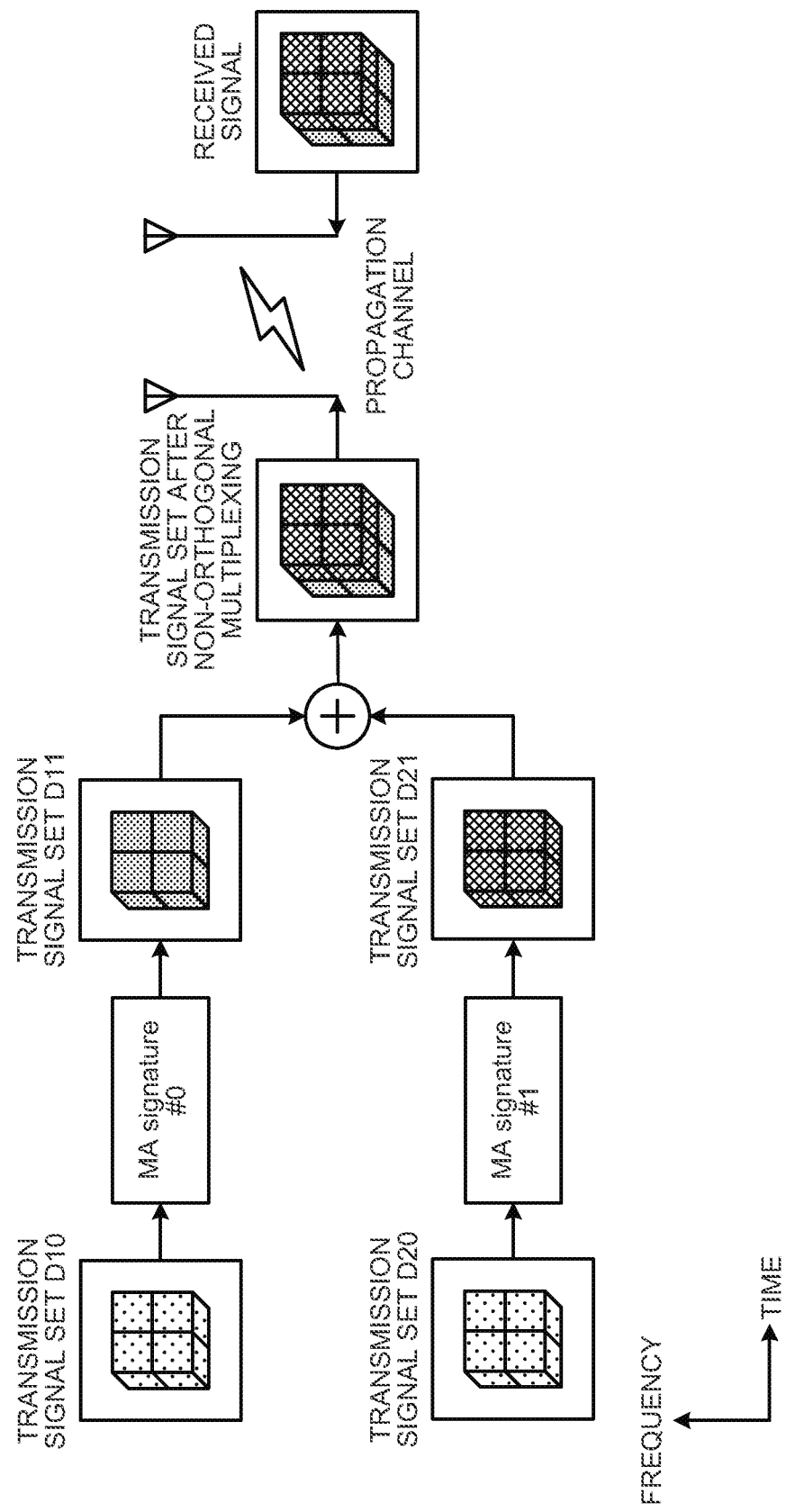
FIG. 12 is an explanatory diagram illustrating an example of NOMA transmission processing according to the embodiment of the present disclosure.

FIG. 11 is a diagram for explaining the data transmission/reception using NOMA. In the example of FIG. 11, an aspect is described in which one transmission device multiplexes and transmits a transmission signal on the non-orthogonal axis. Herein, the transmission device is a communication device such as the base station device 20, the relay device 30, and the terminal device 40. In the example of FIG. 11, one transmission device (for example, the terminal device 40$_1$) multiplexes two transmission signal sets. FIG. 12 is an explanatory diagram illustrating an example of NOMA transmission processing according to the embodiment of the present disclosure. In the example of FIG. 12, all the resources multiplexed on the non-orthogonal axis have the same parameter set.

Incidentally, the NOMA transmission processing described below is realized, for example, by the control unit 45 (for example, the connection unit 453 and the transmission unit 455) of the terminal device 40 controlling the transmission processing unit 412. Alternatively, the following transmission processing is realized, for example, by the control unit 23 (for example, the processing unit 232 and the transmission unit 235) of the base station device 20 controlling the transmission processing unit 212.

For example, the transmission signal set is a signal generated by subjecting part or all of the transmission data generated in the communication device to signal processing for radio communication. That is, the transmission signal set is transmission data (part or all of transmission data) which is subjected to signal processing for radio communication. Here, the transmission data is data related to one processing generated by the communication device. For example, the transmission data is data related to one transmission job generated in various programs (for example, an application program and an operating system) executed by a communication device.

Incidentally, in this embodiment, the transmission data is divided into a plurality of pieces of data. In the following description, the data which is transmission units (division units) of the transmission data is referred to as transmission unit data. Herein, the transmission unit data may be one IP packet or may be one transport block. Of course, the transmission unit data may be another transmission unit. For example, the transport block is a unit of error correction such as Hybrid Automatic Repeat reQuest (ARQ) (HARQ). For example, the transport block is a block of data in a transport channel (transport layer). Incidentally, the transmission signal set may be a signal (transmission unit data) generated by performing signal processing on transmission unit data such as the transport block. In the following description, it is assumed that the transmission signal set is data in which transmission unit data such as the transport block is subjected to signal processing for radio communication using OFDM.

The transmission signal set (transmission unit data) may be configured by a plurality of blocks or a plurality of elements. For example, it is assumed that the transmission signal set is a transport block. At this time, in the transmission signal set, it is assumed that the transmission unit data is configured by a plurality of resource blocks or resource elements. In the following example, it is assumed that the transmission signal set is configured by a plurality of blocks. In the example of FIG. 12, transmission signal sets D10 and D20 are configured by four blocks (for example, resource blocks).

In the example of FIG. 12, the transmission device applies the corresponding multiple access signature (MA signature) to each of the transmission signal sets D10 and D20. The MA signature is one of the information regarding non-orthogonal multiplexing. For example, the MA signature includes Interleave Pattern, Spreading Pattern, Scrambling Pattern, Codebook, and Power Allocation. Incidentally, the MA signature may be simply called Pattern or Index. For example, the MA signature may be an identifier indicating the Pattern or Index used in the NOMA transmission as described above or may represent the Pattern itself. In the following description, applying the MA signature to a pre-determined transmission signal set may be referred to as NOMA transmission processing using the MA signature. An example of NOMA transmission processing using the MA signature is processing of converting a predetermined transmission signal set mapped on a predetermined orthogonal resource into a transmission signal set which can be transmitted by using the non-orthogonal resource indicated by the MA signature.

In the example of FIG. 12, the transmission device (for example, the control unit 45 of the terminal device $40_1$) executes NOMA transmission processing using the MA signature #0 on the transmission signal set D10 and executes NOMA transmission processing using the MA signature #1 on the transmission signal set D20. The MA signature #0 and the MA signature #1 are corresponding non-orthogonal resources. For example, it is assumed that the MA signature is Power Allocation (that is, the non-orthogonal axis is a Power axis). At this time, the MA signature #0 may be information indicating a conversion of a predetermined transmission signal set into a transmission signal set having a small power (for example, a power equal to or less than a first threshold value). Further, the MA signature #1 may be information indicating a conversion of a predetermined transmission signal set into a transmission signal set having a large power (for example, a power equal to or higher than a second threshold value larger than the first threshold value). The transmission device multiplexes the signal in which the MA signature is applied on the same frequency and time resource. For example, the transmission device non-orthogonally multiplexes the transmission signal sets D11 and D21 generated as a result of the NOMA transmission processing on the same orthogonal resource. Thereafter, the transmission device (for example, the transmission unit 455 of the terminal device $40_1$) sends the non-orthogonal multiplexed transmission signal to the antenna port.

Incidentally, in the example of FIG. 12, the transmission device multiplexes two transmission signal sets. However, the transmission device may multiplex three or more transmission signal sets. Further, each transmission signal set may be a transmission signal to a different reception device or may be a transmission signal to the same reception device. Herein, the reception device is a communication device such as the base station device 20, the relay device 30, and the terminal device 40.

Figure 13:
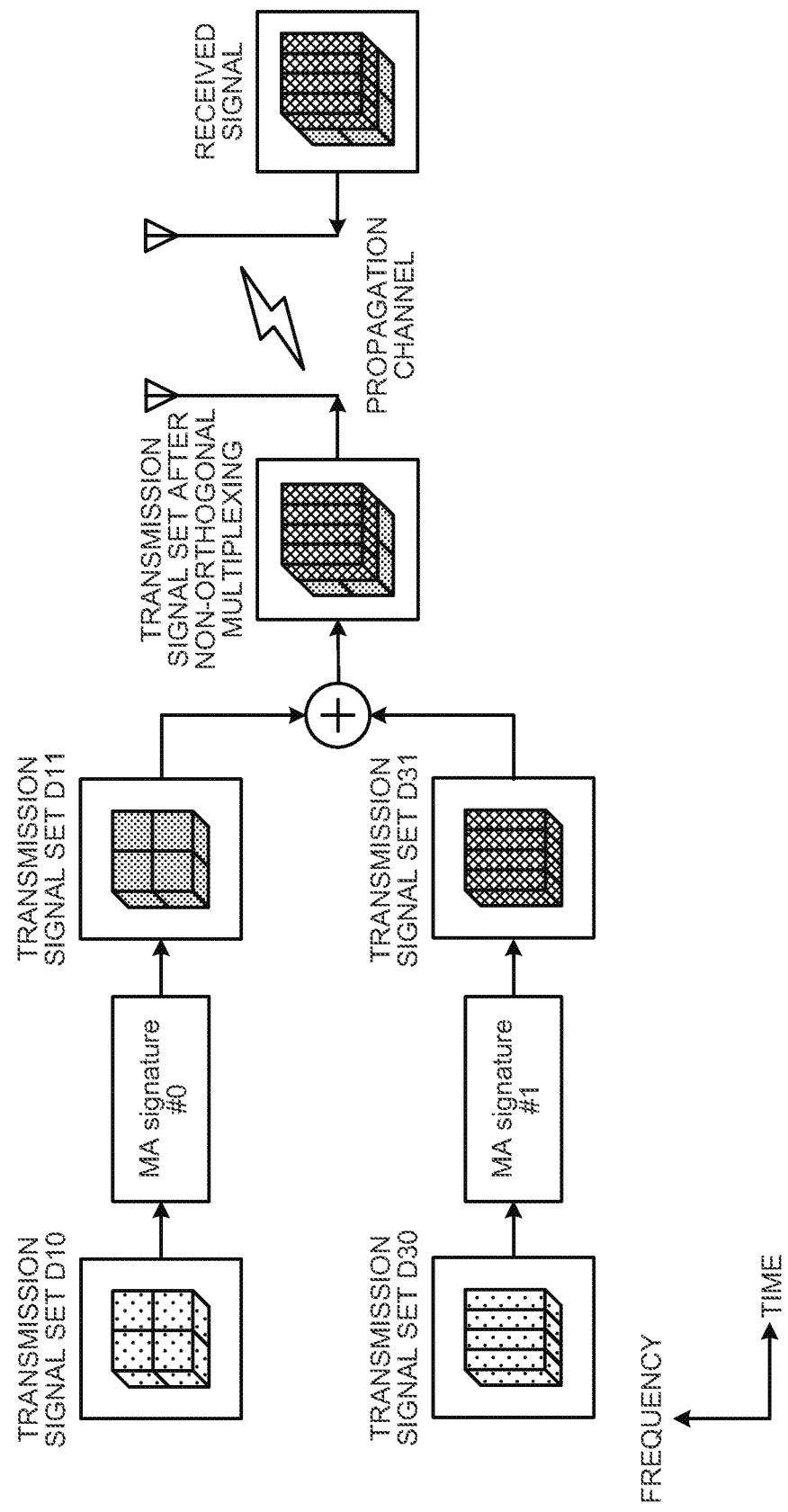
FIG. 13 is an explanatory diagram illustrating an example of the NOMA transmission processing according to the embodiment of the present disclosure.

In the example of FIG. 12, the transmission device multiplexes the transmission signal sets with the same parameter set. However, the transmission device may multiplex transmission signal sets with different parameter sets. FIG. 13 is an explanatory diagram illustrating an example of NOMA transmission processing according to the embodiment of the present disclosure. In the example of FIG. 13, two transmission signal sets with different parameter sets are multiplexed. Specifically, in the example of FIG. 13, the transmission device (for example, the control unit 45 of the terminal device $40_1$) executes NOMA transmission processing using the MA signatures (MA signatures #0 and #1) corresponding to the transmission signal sets D10 and D30, respectively. The transmission signal sets D30 and D40 are transmission signal sets with different parameter sets. Then, the transmission device non-orthogonally multiplexes the transmission signal sets D11 and D31 generated as a result of the NOMA transmission processing on the same orthogonal resource. Thereafter, the transmission device (for example, the transmission unit 455 of the terminal device $40_1$) sends the non-orthogonal multiplexed transmission signal to the antenna port.

[Non-Orthogonal Multiplexing in Propagation Channel]

Incidentally, in the examples of FIGS. 12 and 13, a plurality of transmission signal sets are non-orthogonally multiplexed in the transmission device. However, the plurality of transmission signal sets may be non-orthogonally multiplexed on a propagation channel.

Figure 14:
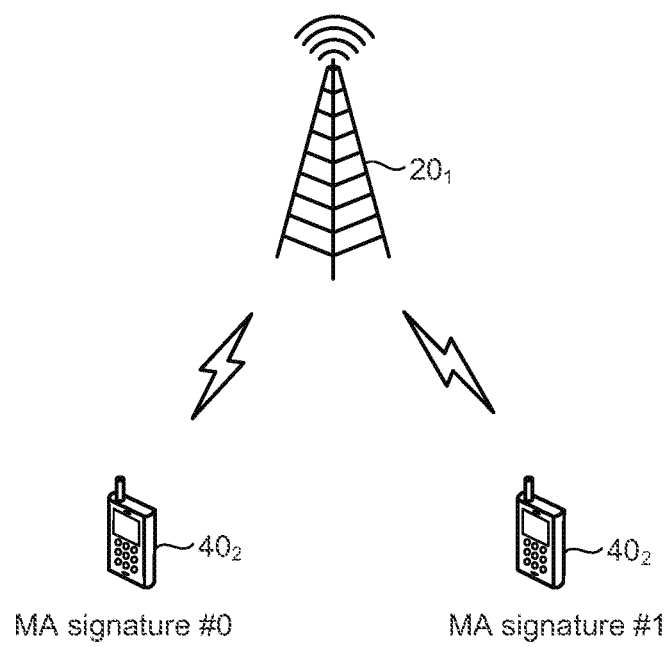
FIG. 14 is a diagram for explaining data transmission/reception using the NOMA.
Figure 15:
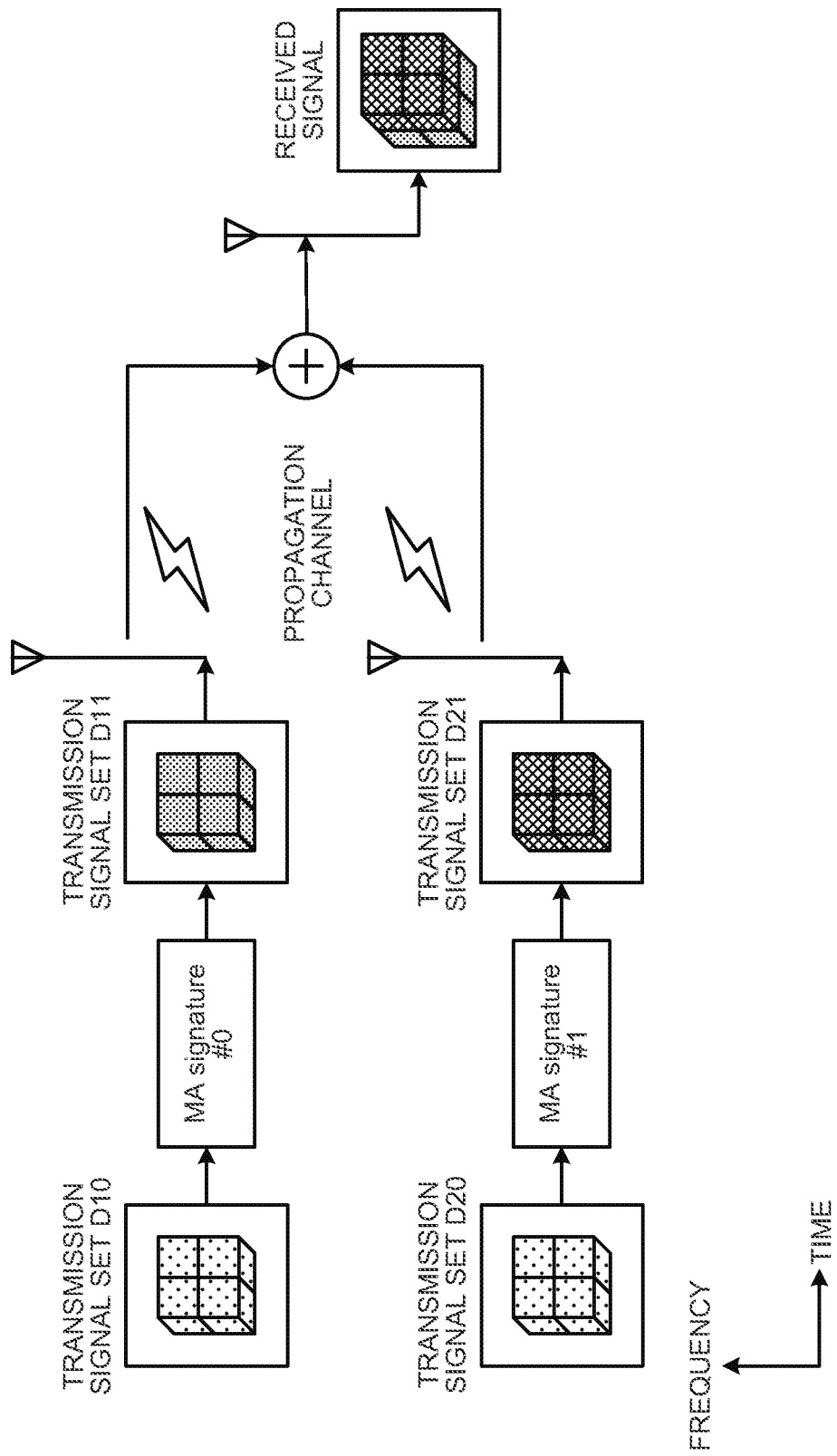
FIG. 15 is an explanatory diagram illustrating an example of the NOMA transmission processing according to the embodiment of the present disclosure.

FIG. 14 is a diagram for explaining the data transmission/reception using the NOMA. In the example of FIG. 14, an aspect is described in which the transmission signals of a plurality of transmission devices are non-orthogonally multiplexed on the propagation channel. The plurality of transmission signal sets may be transmitted from separate terminal devices (for example, the terminal devices 401 and 402) or may be transmitted from different antennas in one transmission device (for example, the terminal device 401). In the following description, it is assumed that the two transmission signal sets are transmitted from different transmission devices, but of course, the two transmission signal sets may be transmitted from one transmission device. FIG. 15 is an explanatory diagram illustrating an example of NOMA transmission processing according to the embodiment of the present disclosure. In the example of FIG. 15, the two transmission signal sets are transmitted from different antennas.

In the example of FIG. 15, one transmission device (for example, the terminal device $40_1$) executes NOMA transmission processing using the MA signature #0 on the transmission signal set D10. Further, another transmission device (for example, the terminal device $40_2$) executes NOMA transmission processing using the MA signature #1 on the transmission signal set D20. The MA signature #0 and the MA signature #1 are corresponding non-orthogonal resources. For example, the MA signature includes Interleave Pattern, Spreading Pattern, Scrambling Pattern, Codebook, Power Allocation, and Repetition. The transmission signal sets D11 and D21 after applying the MA signature are transmitted on the same frequency and time resource and are multiplexed through the propagation channel.

In the example of FIG. 15, the transmission signal sets with the same parameter set are multiplexed. However, the multiplexed transmission signal set may be transmission signal sets with different parameter sets.

Figure 16:
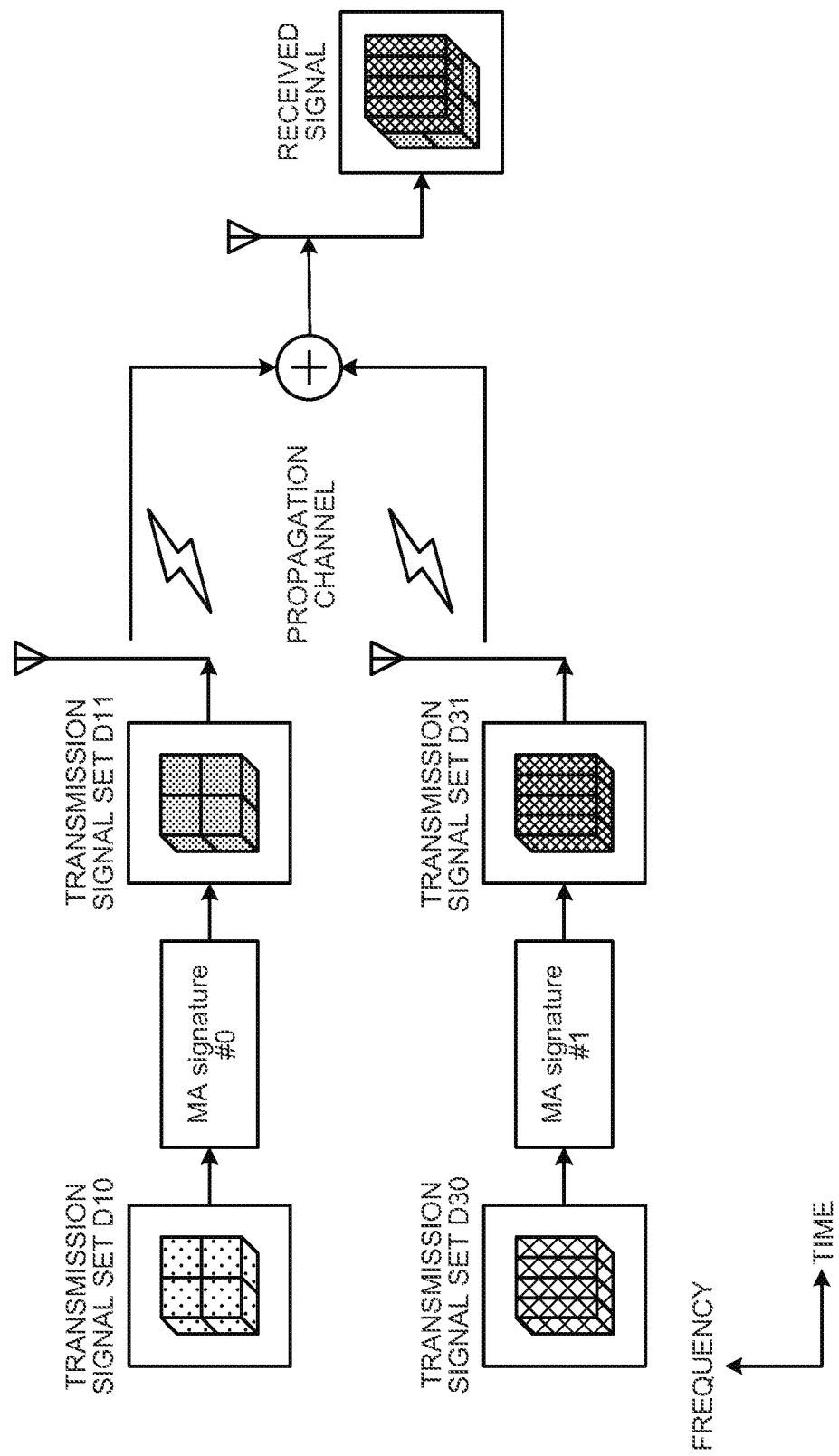
FIG. 16 is an explanatory diagram illustrating an example of the NOMA transmission processing according to the embodiment of the present disclosure.

FIG. 16 is an explanatory diagram illustrating an example of NOMA transmission processing according to the embodiment of the present disclosure. In the example of FIG. 16, two transmission signal sets with different parameter sets are multiplexed. Specifically, in the example of FIG. 16, one transmission device (for example, the terminal device $40_1$) executes NOMA transmission processing using the MA signature #0 on the transmission signal set D10. Another transmission device (for example, the terminal device $40_2$) executes NOMA transmission processing using the MA signature #1 on the transmission signal set D30. The transmission signal sets D10 and D30 are transmission signal sets with different parameter sets. Further, the MA signature #0 and the MA signature #1 are corresponding non-orthogonal resources. The transmission signal sets D11 and D31 after applying the MA signature are transmitted on the same frequency and time resource and are multiplexed through the propagation channel.

Figure 17:
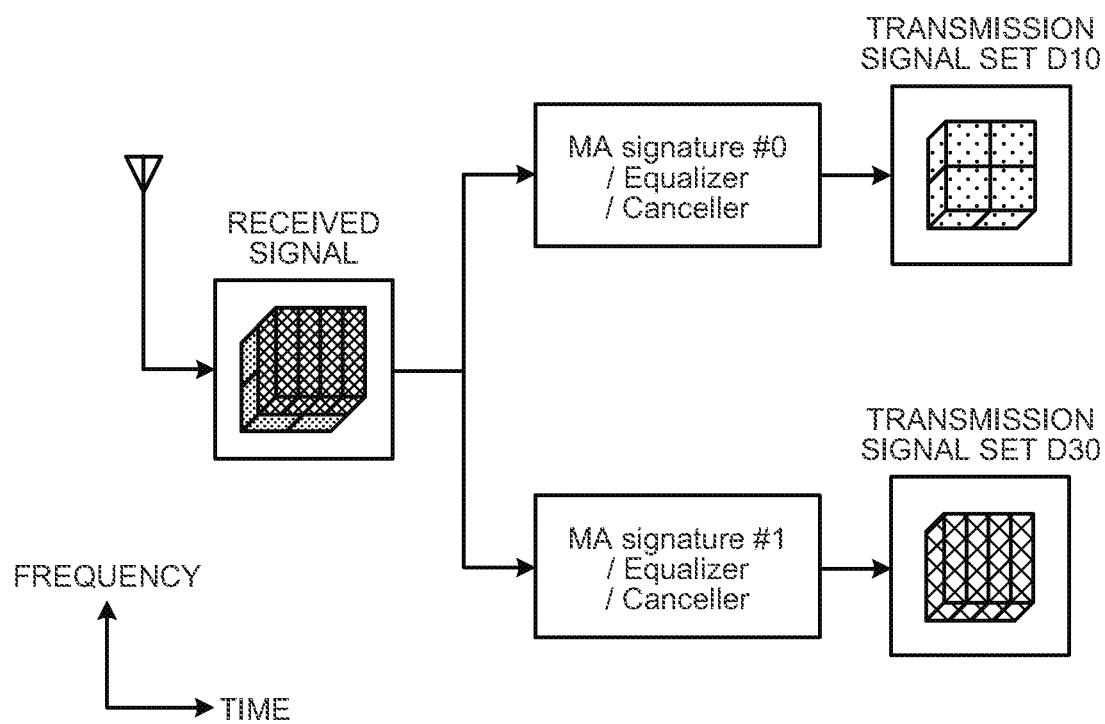
FIG. 17 is an explanatory diagram illustrating an example of NOMA reception processing according to the embodiment of the present disclosure.

FIG. 17 is an explanatory diagram illustrating an example of NOMA reception processing according to the embodiment of the present disclosure. Incidentally, the NOMA reception processing to be described below is realized by the control unit 23 (for example, the reception unit 233 and the separation unit 234) of the base station device 20 controlling the reception processing unit 211. Alternatively, the NOMA reception processing to be described below is realized, for example, by the control unit 45 (for example, the reception unit 454) of the terminal device 40 controlling the reception processing unit 411.

As illustrated in FIG. 17, a received signal is received in a state where a plurality of transmission signals are multiplexed on the same frequency and time resources. In order to decode the multiplexed transmission signal set, the reception device (for example, the separation unit 234 of the base station device 201) executes NOMA reception processing (for example, processing such as a channel equalization and an interference signal canceller) on the basis of the MA signature used by the transmission device. Accordingly, the reception device extracts a desired signal from the received signal. In the example of FIG. 17, the reception device executes NOMA reception processing using MA signature #0 and MA signature #1 on the received signal, and extracts the transmission signal sets D10 and D30. Incidentally, in a case where the same MA signature is used for multiplexing, the influence of interference between the multiplexed signals becomes large, and decoding becomes difficult. Therefore, the base station device 20 schedules the MA signature used by the terminal device 40 and the like so that the MA signatures do not overlap.

As described above, in the NOMA transmission, the MA signature applied to the transmission device and the reception device needs to be shared between the transmission device and the reception device, and the MA signature needs to be applied without duplication. Incidentally, in the following description, it is assumed that the MA signature is also included in the concept of resource (radio resource). Herein, a resource including all of the frequency, time, and the MA signature may be referred to as a Multiple Access Resource (MA resource). Further, a resource with only frequency and time may be referred to as a Multiple Access Physical Resource (MA physical resource).

4. BASIC OPERATION OF COMMUNICATION SYSTEM

<4-1. Initial Connection Processing>

Next, the basic operation of the communication system 1 will be described. First, the initial connection processing will be described. The initial connection processing is processing for transitioning the radio connection state of the terminal device 40 from an unconnected state to a connected state. The unconnected state is, for example, RRC_IDLE or RRC_INACTIVE. RRC_IDLE is an idle state in which the terminal device is not connected to any cell (or the base station device), and is also called Idle mode. Further, RRC_INACTIVE is a radio connection state indicating an inactive state newly defined by NR, and is also called an Inactive mode. Incidentally, the non-connected state may include a Lightning mode. Further, the connected state is, for example, RRC_CONNECTED. RRC_CONNECTED is a connected state in which the terminal device establishes a connection with any cell (or the base station device) and is also called a CONNECTED mode.

Figure 18:
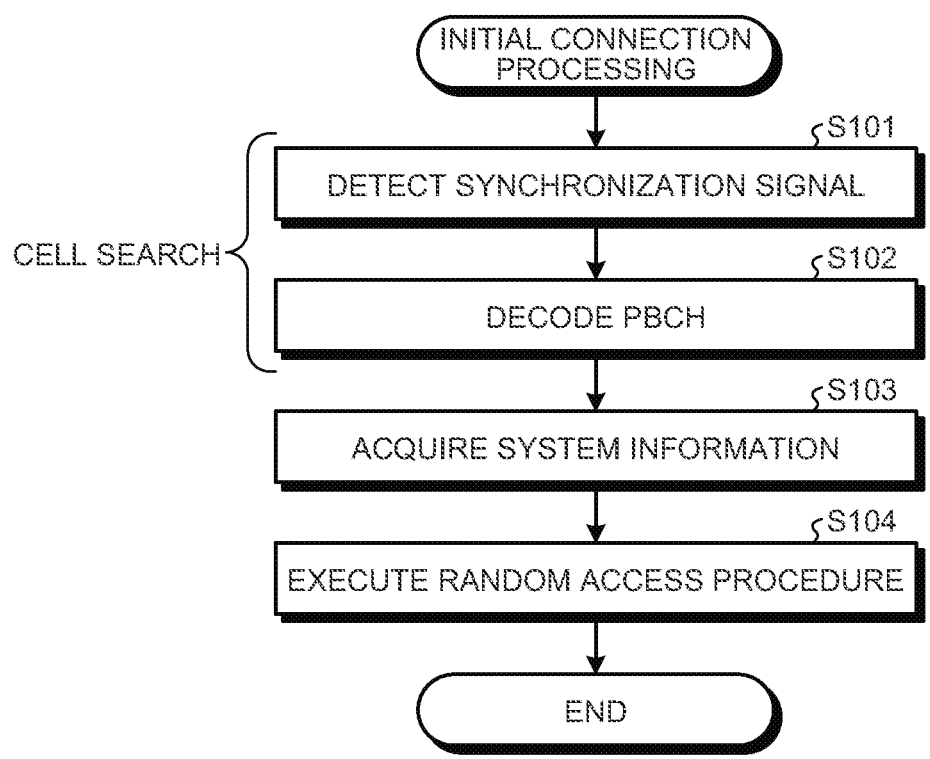
FIG. 18 is a flowchart illustrating an example of initial connection processing.

FIG. 18 is a flowchart illustrating an example of the initial connection processing. Hereinafter, the initial connection processing will be described with reference to FIG. 18. The initial connection processing to be described below is executed, for example, in a case where the terminal device 40 is turned on.

First, the terminal device 40 in the unconnected state performs a cell search. The cell search of this embodiment includes a step of detecting a synchronization signal and decoding a PBCH. The reception unit 454 of the terminal device 40 detects the synchronization signal of a cell (Step S101). The reception unit 454 synchronizes the cell with a downlink on the basis of the detected synchronization signal. Then, after establishing the synchronization of the downlink, the reception unit 454 attempts to decode the PBCH and acquires a Master Information Block (MIB) which is a part of the system information (Step S102).

The system information is information which notifies the setting in the cell which transmits the system information. The system information includes, for example, information regarding access to cells, information regarding cell selection, and information regarding other RATs and other systems. The system information includes an MIB and a System Information Block (SIB). The MIB is information of a physical layer required to receive the SIB and the like and is information of a fixed payload size notified by PBCH. The MIB includes the system bandwidth of the downlink, a part of the system frame number, and scheduling information of the SIB. The SIB is system information other than the MIB and is notified by a PDSCH.

Incidentally, the system information can be classified into first system information, second system information, and third system information. The first system information and the second system information include information regarding access to cells, information regarding acquisition of other system information, and information regarding cell selection. In the LTE, the information included in the MIB is the first system information. Further, the information included in an SIB1 and an SIB2 among the SIB is the second system information. The remaining system information is the third system information.

Also in NR, the system information is notified from the NR cell. The physical channel carrying the system information may be transmitted in slots or minislots. A minislot is defined by the number of symbols less than the number of symbols in the slot. When the physical channel carrying the system information is transmitted in minislots, the time required for beam sweeping can be reduced, and the overhead can be reduced. In the case of NR, the first system information is transmitted on an NR-PBCH, and the second system information is transmitted on a physical channel different from the NR-PBCH.

The acquisition unit 451 of the terminal device 40 acquires the second system information on the basis of the MIB (that is, the first system information) (Step S103). As described above, the second system information is configured by the SIB1 and the SIB2. The SIB1 is cell access regulation information and scheduling information of system information other than the SIB1. The SIB1 includes cell access information, cell selection information, maximum uplink transmission power information, TDD setting information, system information cycle, the mapping information of system information, the length of System Information (SI) window, and the like. Further, the SIB2 includes connection prohibition information, radio resource setting information common to cells (radioResourceConfigCommon), uplink carrier information, and the like. The radio resource setting information common to cells includes a Physical Random Access Channel (PRACH) and a Random Access Channel (RACH) setting information common to cells.

Incidentally, in a case where the acquisition unit 451 cannot acquire the system information necessary for establishing a link, the control unit 45 of the terminal device 40 determines that access to the cell is prohibited. For example, in a case where all of the first system information and the second system information cannot be acquired, the control unit 45 determines that access to the cell is prohibited. In this case, the control unit 45 ends the initial connection processing.

In a case where the system information can be acquired, the control unit 45 executes a random access procedure on the basis of the first system information and/or the second system information (Step S104). The random access procedure may be referred to as a Random Access Channel Procedure (RACH procedure) or an RA procedure. With completion of the random access procedure, the terminal device 40 transitions from the unconnected state to the connected state.

<4-2. Random Access Procedure>

Next, the random access procedure will be described. The random access procedure is executed for the purpose of "RRC connection setup" from the idle state to the connected state (or inactive state), "request for state transition" from the inactive state to the connected state, and the like. Further, the random access procedure is also used for the purpose of "scheduling request" of performing a resource request for uplink data transmission and "timing advance adjustment" of adjusting uplink synchronization. In addition, the random access procedure is executed in the case of "on-demand SI request" for requesting system information which is not transmitted, "beam recovery" for recovering a broken beam connection, "handover" for switching connection cells, and the like.

The "RRC connection setup" is an operation which is executed when the terminal device 40 connects to the base station device in response to the generation of traffic or the like. Specifically, the "RRC connection setup" is an operation of passing information (for example, UE context) regarding the connection from the base station device to the terminal device 40. The UE context is managed by predetermined communication device identification information (for example, C-RNTI) indicated by the base station device. When this operation ends, the terminal device 40 transitions from the idle state to the inactive state or from the idle state to the connected state.

The "request for state transition" is an operation in which the terminal device 40 requests a state transition from the inactive state to the connected state in response to the generation of traffic or the like. By transitioning to the connected state, the terminal device 40 can perform transmission/reception of unicast data to/from the base station device.

The "scheduling request" is an operation in which the terminal device 40 performs a resource request for uplink data transmission in response to the generation of traffic or the like. After normally receiving this scheduling request, the base station device allocates the PUSCH resource to the communication device. Incidentally, the scheduling request is also performed by the PUCCH.

The "timing advance adjustment" is an operation for adjusting the frame error between the downlink and the uplink caused by the propagation delay. The terminal device 40 transmits the PRACH at the timing adjusted to the downlink frame. Accordingly, the base station device can recognize the propagation delay with the terminal device 40, and can instruct the terminal device 40 with the value of the timing advance by message 2 or the like.

The "on-demand SI request" is an operation of requesting the base station device to transmit the system information in a case where the terminal device 40 needs the system information which is not transmitted for the purpose of the overhead of the system information or the like.

The "beam recovery" is an operation of performing a recovery request in a case where the communication quality deteriorates due to the movement of the terminal device 40, the interruption of the communication path by another object, or the like after the beam is established. The base station device which receives this request attempts to connect with the terminal device 40 by using a different beam.

The "handover" is an operation of switching the connection from a connected cell (serving cell) to a cell (neighbor cell) adjacent to the cell due to a change in the radio wave environment such as movement of the terminal device 40. The terminal device 40 which receives the handover command from the base station device 20 performs a connection request to the neighbor cell specified by the handover command.

The random access procedure includes a contention-based random access procedure and a non-contention-based random access procedure. First, the contention-based random access procedure will be described.

Incidentally, the random access procedure described below is a random access procedure assuming that the RAT supported by the communication system 1 is LTE. However, the random access procedure described below is also applicable even in a case where the RAT supported by communication system 1 is other than LTE.

[Contention-Based Random Access Procedure]

Figure 19:
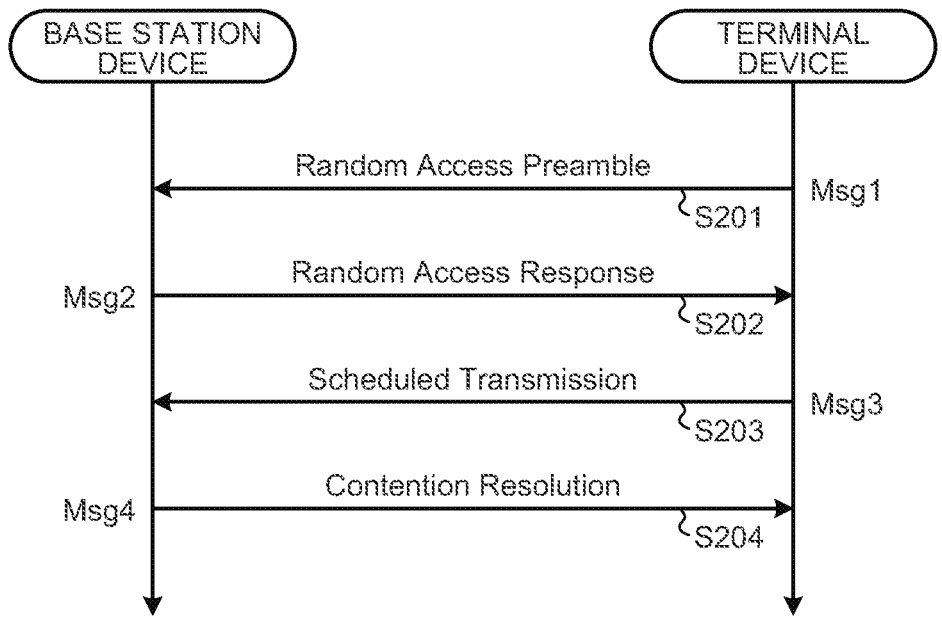
FIG. 19 is a diagram illustrating a contention-based random access procedure.

The contention-based random access procedure is a random access procedure led by the terminal device 40. FIG. 19 is a diagram illustrating the contention-based random access procedure. As illustrated in FIG. 19, the contention-based random access procedure is a four-step procedure starting from the transmission of the random access preamble from the terminal device 40. The contention-based random access procedure includes the steps of transmitting a random access preamble (Msg1), receiving a random access response (Msg2), transmitting a message (Msg3), and receiving a contention resolution message (Msg4).

First, the connection unit 453 of the terminal device 40 randomly selects a preamble series to be used from a plurality of predetermined preamble sequences. Then, the connection unit 453 transmits a message (Msg1: Random Access Preamble) including the selected preamble sequence to the base station device of the connection destination (Step S201). At this time, the base station device 20 may be a non-ground base station device or a ground base station device. In the following description, the base station device 20 to which the connection unit 453 transmits a random access preamble will be described as a non-ground base station device. The random access preamble is transmitted via the PRACH.

When the control unit 23 of the base station device 20 receives the random access preamble, the control unit transmits a random access response (Msg2) corresponding to the random access preamble to the terminal device 40. This random access response is transmitted, for example, using the PDSCH. The connection unit 453 receives the random access response (Msg2) transmitted from the base station device 20 (Step S202). The random access response includes one or more random access preambles which can be received by the base station device 20 and Up Link (UL) resources (hereinafter, referred to as uplink grants) corresponding to the random access preambles. Further, the random access response includes Temporary Cell Radio Network Temporary Identifier (TC-RNTI), which is an identifier unique to the terminal device 40, temporarily allocated to the terminal device 40 by the base station device 20.

When the connection unit 453 of the terminal device 40 receives the random access response from the base station device 20, it determines whether or not the received information includes the random access preamble transmitted in Step S201. When the random access preamble is included, the connection unit 453 extracts the uplink grant corresponding to the random access preamble transmitted in Step S201 from the uplink grants included in the random access response. Then, the connection unit 453 transmits a UL message (Msg3: Scheduled Transmission) by using the resource scheduled by the extracted uplink grant (Step S203). The message (Msg3) is transmitted by using the PUSCH. The message (Msg3) includes an RRC message for a Radio Resource Control (RRC) connection request. Further, the message (Msg3) includes the identifier of the terminal device 40.

In the contention-based random access procedure, a random access preamble randomly selected by the terminal device 40 is used for the procedure. Therefore, at the same time that the terminal device 40 transmits the random access preamble, another terminal device 40 may transmit the same random access preamble to the base station device 20. In this regard, when the control unit 23 of the base station device 20 receives the identifier transmitted by the terminal device 40 in Step S203, the control unit recognizes the terminal device where a preamble contention occurs and resolves the contention. The control unit 23 transmits a contention resolution (Msg4) to the terminal device 40 selected by the contention resolution. The contention resolution (Msg4) includes the identifier transmitted by the connection unit 453 in Step S203. Further, the contention resolution (Msg4) also includes RRC messages for RRC connection setup. The connection unit 453 receives the contention resolution message (Msg4) transmitted from the base station device 20 (Step S204).

The connection unit 453 of the terminal device 40 compares the identifier transmitted in Step S203 with the identifier received in Step S204. In a case where the identifiers do not match, the connection unit 453 starts the random access procedure again from Step S201. In a case where the identifiers match, the connection unit 453 performs an RRC connection operation and transitions from the idle state (RRC_IDLE) to the connected state (RRC_CONNECTED). The connection unit 453 uses the TC-RNTI acquired in Step S202 as Cell Radio Network Temporary Identifier (C-RNTI) in subsequent communications. After transitioning to the connected state, the connection unit 453 transmits the RRC message of the RRC connection setup completion to the base station device. The message of the RRC connection setup completion is also called message 5. Through this series of operations, the terminal device 40 is connected to the base station device 20.

Incidentally, the contention-based random access procedure illustrated in FIG. 19 is a four-step random access procedure (4-Step RACH). However, the communication system 1 can also support a two-step random access procedure (2-Step RACH) as a contention-based random access procedure. For example, the connection unit 453 of the terminal device 40 transmits the random access preamble and also transmits the message (Msg3) indicated in Step S203. Then, the control unit 23 of the base station device 20 transmits the random access response (Msg2) and the contention resolution (Msg4) as the responses. Since the random access procedure is completed in two steps, the terminal device 40 can quickly connect with the base station device 20.

[Non-Contention-Based Random Access Procedure]

Figure 20:
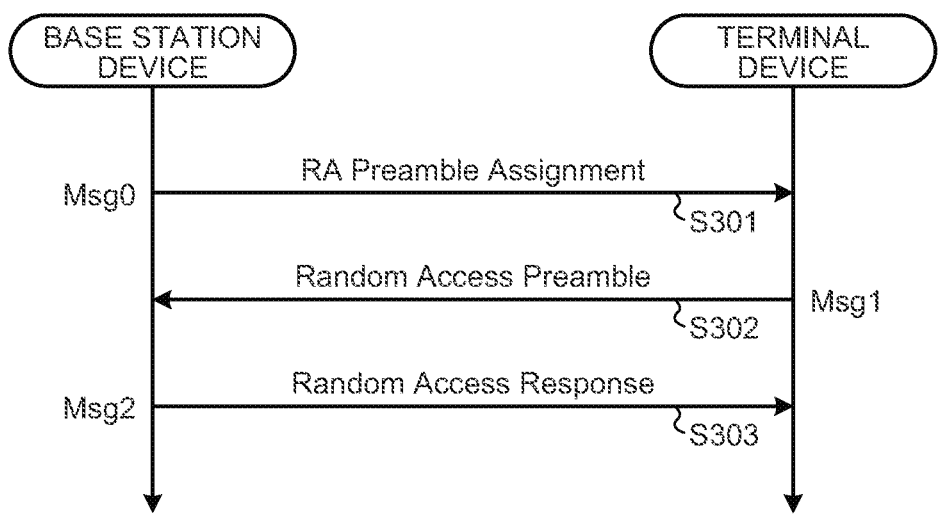
FIG. 20 is a diagram illustrating a non-contention-based random access procedure.

Next, the non-contention-based random access procedure will be described. The non-contention-based random access procedure is a random access procedure led by the base station device. FIG. 20 is a diagram illustrating the non-contention-based random access procedure. The non-contention-based random access procedure is a three-step procedure starting from the transmission of the random access preamble assignment from the base station device. The non-contention-based random access procedure includes the steps of receiving a random access preamble assignment (Msg0), transmitting a random access preamble (Msg1), and receiving a random access response (Msg2). Incidentally, in the following description of the random access procedure, it is assumed that the base station device 20 is a non-ground base station device, but the base station device may be a ground base station device.

In the contention-based random access procedure, the connection unit 453 of the terminal device 40 randomly selects the preamble sequence. However, in the non-contention-based random access procedure, the base station device 20 assigns a separate random access preamble to the terminal device 40. The connection unit 453 of the terminal device 40 receives the random access preamble assignment (Msg0: RA Preamble Assignment) from the base station device 20 (Step S301).

The connection unit 453 of the terminal device 40 executes random access to the base station device 20 by using the random access preamble assigned in Step S301. That is, the connection unit 453 of the terminal device 40 transmits the assigned random access preamble (Msg1) to the base station device 20 by the PRACH (Step S302).

The control unit 23 of the base station device 20 receives the random access preamble (Msg1) from the terminal device 40. Then, the control unit 23 transmits a random access response (Msg2) to the random access preamble to the terminal device 40 (Step S303). For example, the random access response includes the information of the uplink grant corresponding to the received random access preamble. When the connection unit 453 of the terminal device 40 receives the random access response (Msg2), the connection unit performs an RRC connection operation and transitions from the idle state (RRC_IDLE) to the connected state (RRC_CONNECTED).

As described above, in the non-contention-based random access procedure, the base station device schedules the random access preamble, and thus the preamble contention is unlikely to occur.

[Details of NR Random Access Procedure]

Hereinbefore, the random access procedure has been described in which it is assumed that the RAT supported by the communication system 1 is LTE. Incidentally, the above random access procedure can also be applied to RATs other than LTE. Hereinbefore, the detail of the random access procedure has been described in which it is assumed that the RAT supported by the communication system 1 is NR. Incidentally, in the following description, each of the four steps related to Msg1 to Msg4 illustrated in FIG. 19 or 20 will be described in detail. The step of Msg1 corresponds to Step S201 illustrated in FIG. 19 and Step S302 illustrated in FIG. 20. The step of Msg2 corresponds to Step S202 illustrated in FIG. 19 and Step S303 illustrated in FIG. 20. The step of Msg3 corresponds to Step S203 illustrated in FIG. 19. The step of Msg4 corresponds to Step S204 illustrated in FIG. 19.

[Random Access Preamble (Msg1) of NR]

In NR, the PRACH is called a NR Physical Random Access Channel (NR-PRACH). The NR-PRACH is configured by using a Zadoff-Chu sequence or M sequence. In NR, a plurality of preamble formats are defined as a format of the NR-PRACH. The preamble format is defined by a combination of parameters such as a PRACH subcarrier interval, a transmission bandwidth, a sequence length, the number of symbols used for transmission, the number of transmission repetitions, a Cyclic Prefix (CP) length, and a guard period length. Incidentally, the type (Zadoff-Chu sequence or M sequence) of sequence used for transmitting the NR-PRACH may be specified depending on the preamble format. The types of NR-PRACH preamble sequence are numbered. The number of the preamble sequence type is called a preamble index.

In NR, the setting regarding the NR-PRACH is made by the system information for the terminal device 40 in the idle state. Further, the setting regarding the NR-PRACH is made by dedicated RRC signaling for the terminal device 40 in the connected state.

The connection unit 453 of the terminal device 40 transmits the NR-PRACH by using a physical resource (NR-PRACH Occasion) which can be transmitted by the NR-PRACH. The physical resource is indicated by the setting regarding the NR-PRACH. The connection unit 453 of the terminal device 40 selects one of the physical resources and transmits the NR-PRACH. Further, in a case where the terminal device 40 is in the connected state, the connection unit 453 transmits the NR-PRACH by using the NR-PRACH resource. The NR-PRACH resource is a combination of the NR-PRACH preamble and the physical resource. The base station device 20 can instruct the terminal device 40 with the NR-PRACH resource. At this time, the base station device 20 may be a non-ground base station device or may be a ground base station device. In the following description of the NR random access procedure, the base station device 20 will be described as a non-ground base station device.

Incidentally, the NR-PRACH is also transmitted even when the random access procedure fails. When retransmitting the NR-PRACH, the connection unit 453 of the terminal device 40 waits for the transmission of the NR-PRACH for a waiting period calculated from a backoff value (backoff indicator, BI). Incidentally, the backoff value may differ depending on the terminal category of the terminal device 40 or the priority of the generated traffic. At that time, a plurality of backoff values are notified, and the terminal device 40 selects the backoff value to be used according to the priority. Further, when retransmitting the NR-PRACH, the connection unit 453 raises the transmission power of the NR-PRACH as compared with an initial transmission. This procedure is called power ramping.

[Random Access Response (Msg2) of NR]

The random access response of NR is transmitted by using an NR Physical Downlink Shared Channel (NR-PDSCH). The NR-PDSCH including the random access response is scheduled by the NR Physical Downlink Control Channel (NR-PDCCH) with a Cyclic Redundancy Check (CRC) scrambled by RA-RNTI. The NR-PDCCH is transmitted in a common control subband. The NR-PDCCH is arranged in Common Search Space (CSS). Incidentally, the value of Random Access Radio Network Temporary Identifier (RA-RNTI) is determined on the basis of the transmission resource of the NR-PRACH corresponding to the random access response thereof. For example, the transmission resource of NR-PRACH is a time resource (a slot or a subframe) and a frequency resource (resource block). Incidentally, the NR-PDCCH may be arranged in a search space associated with the NR-PRACH associated with the random access response. Specifically, the search space in which the NR-PDCCH is arranged is set in association with the preamble of the NR-PRACH and/or the physical resource to which the NR-PRACH is transmitted. The search space in which the NR-PDCCH is arranged is set in association with the preamble index and/or the index of the physical resource. The NR-PDCCH is an NR Synchronization signal (NR-SS) and Quasi co-location (QCL).

The random access response of NR is the information of Medium Access Control (MAC). The random access response of NR includes at least the uplink grant for transmitting a message 3 of NR, the value of the timing advance used to adjust the uplink frame synchronization, and the value of TC-RNTI. Further, the random access response of NR includes the PRACH index used for the NR-PRACH transmission corresponding to the random access response thereof. Further, the random access response of NR also includes information regarding the backoff used to wait for the transmission of PRACH.

The control unit 23 of the base station device 20 transmits a random access response by the NR-PDSCH. The connection unit 453 of the terminal device 40 determines whether or not the transmission of the random access preamble is successful from the information included in the random access response. In a case where it is determined that the transmission of the random access preamble fails, the connection unit 453 performs the transmission processing of the message 3 (Msg3) of NR according to the information included in the random access response. On the other hand, in a case where the transmission of the random access preamble fails, the connection unit 453 determines that the random access procedure fails and performs the retransmission processing of the NR-PRACH.

Incidentally, the random access response of NR may include a plurality of uplink grants for transmitting the message 3 (Msg3) of NR. The connection unit 453 of the terminal device 40 can select one resource for transmitting the message 3 (Msg3) from a plurality of uplink grants. Accordingly, in a case where the random access response of the same NR is received by different terminal devices 40, it is possible to alleviate the contention of the message 3 (Msg3) transmission of NR. As a result, the communication system 1 can provide a more stable random access procedure.

[Message 3 (Msg3) of NR]

The message 3 (Msg3) of NR is transmitted by an NR Physical Uplink Shared Channel (NR-PUSCH). The NR-PUSCH is transmitted by using the resource indicated by the random access response. The message 3 of the NR includes an RRC connection request message. The format of the NR-PUSCH is indicated by the parameters included in the system information. For example, with the parameters, it is determined which of Orthogonal Frequency Division Multiplexing (OFDM) and Discrete Fourier Transform Spread OFDM (DFT-s-OFDM) is used as the NR-PUSCH format.

In a case where the message 3 of NR is normally received, the control unit 23 of the base station device 20 shifts to the transmission processing of the contention resolution (Msg4). On the other hand, in a case where the message 3 of NR cannot be received normally, the control unit 23 attempts to receive the message 3 of NR again for at least a predetermined period. As an example, the control unit 23 instructs the terminal device 40 to retransmit the message 3. At this time, the control unit 23 transmits an instruction to retransmit the message 3 by using the downlink resource after a predetermined number of slots (or subframes or radio frames) from the resources on which an instruction to transmit the message 3 is given.

An example of the instruction for retransmitting the message 3 and the transmission resource is an instruction by the retransmission of the random access response. The NR-PDSCH including the retransmitted random access response is scheduled by the NR-PDCCH with the CRC scrambled by RA-RNTI. The same value as the value of RA-RNTI used in the initial transmission is used as the value of RA-RNTI. That is, it is determined on the basis of the transmission resource of the NR-PRACH corresponding to the random access response. Alternatively, the value of RA-RNTI is determined on the basis of the information that identifies the initial transmission and the retransmission in addition to the transmission resource of the NR-PRACH. The NR-PDCCH is arranged in CSS (Common Search Space).

Alternatively, the NR-PDSCH including the retransmitted random access response is scheduled by the NR-PDCCH with the CRC scrambled by TC-RNTI or C-RNTI included in the random access response transmitted in the initial transmission.

Another example of the instruction of the retransmission of the message 3 and the transmission resource is an instruction by the NR-PDCCH used for the retransmission of the message 3. The NR-PDCCH is an uplink grant. The resource of the retransmission of the message 3 is indicated by the Downlink Control Information (DCI) of the NR-PDCCH. The connection unit 453 of the terminal device 40 retransmits the message 3 on the basis of the instruction of the uplink grant.

As a specific example of the processing after the message 3 of NR cannot be normally received, the control unit 23 of the base station device 20 attempts to receive the message 3 in the retransmission resource on which an instruction is given in advance. In a case where the contention resolution is not transmitted from the base station device 20 after the transmission of the message 3 within a predetermined period, the connection unit 453 of the terminal device 40 transmits the NR-PUSCH including the message 3 by using the retransmission resource on which the instruction is given in advance.

Alternatively, in a case where the connection unit 453 of the terminal device 40 receives a negative response (NACK) to the message 3, the connection unit transmits the NR-PUSCH including the message 3 by using the retransmission resource, corresponding to the negative response, on which the instruction is given in advance. For example, the information of the "retransmission resource on which the instruction is given in advance" is included in the system information or a random access response.

Incidentally, in a case where the number of retransmissions of the message 3 of NR exceeds a predetermined number or a case where the reception of the contention resolution of NR is not successful within a predetermined period, the connection unit 453 of the terminal device 40 considers that the random access procedure fails and performs the retransmission processing of the NR-PRACH. Incidentally, the transmission beam of the terminal device 40 used for retransmitting the message 3 of NR may be different from the transmission beam of the terminal device 40 used for the initial transmission of the message 3. Incidentally, in a case where neither the contention resolution of NR nor the instruction of the retransmission of the message 3 can be received within a predetermined period, the connection unit 453 of the terminal device 40 considers that the random access procedure fails and performs retransmission processing of the NR-PRACH. The predetermined period is set by, for example, the system information.

[Contention Resolution (Msg4) of NR]

The contention resolution of NR is transmitted by using the NR-PDSCH. The NR-PDSCH including the contention resolution is scheduled by the NR-PDCCH with the CRC scrambled by TC-RNTI or C-RNTI. The NR-PDCCH is transmitted in a common control subband. The NR-PDCCH is arranged in User equipment specific Search Space (USS). Incidentally, the NR-PDCCH may be arranged in CSS.

In a case where the connection unit 453 of the terminal device 40 normally receives the NR-PDSCH including the contention resolution, the connection unit transmits an acknowledgment (ACK) to the base station device 20. Thereafter, the terminal device 40 considers that the random access procedure is successful and shifts to the connected state (RRC_CONNECTED). On the other hand, in a case where a negative response (NACK) to the NR-PDSCH is received from the terminal device 40 or a case where there is no response, the control unit 23 of the base station device 20 retransmits the NR-PDSCH including the contention resolution. In a case where the contention resolution (Msg4) of NR cannot be received within the predetermined period, the connection unit 453 of the terminal device 40 considers that the random access procedure fails and performs retransmission processing of the random access preamble (Msg1).

<4-3. Transmission/Reception Processing (Grant Based)>

Next, data transmission (uplink) from the terminal device 40 to the base station device 20 will be described. The data transmission of uplink is divided into "transmission/reception processing (Grant Based)" and "transmission/reception processing (Configured Grant)". First, "transmission/reception processing (Grant Based)" will be described.

Figure 21:
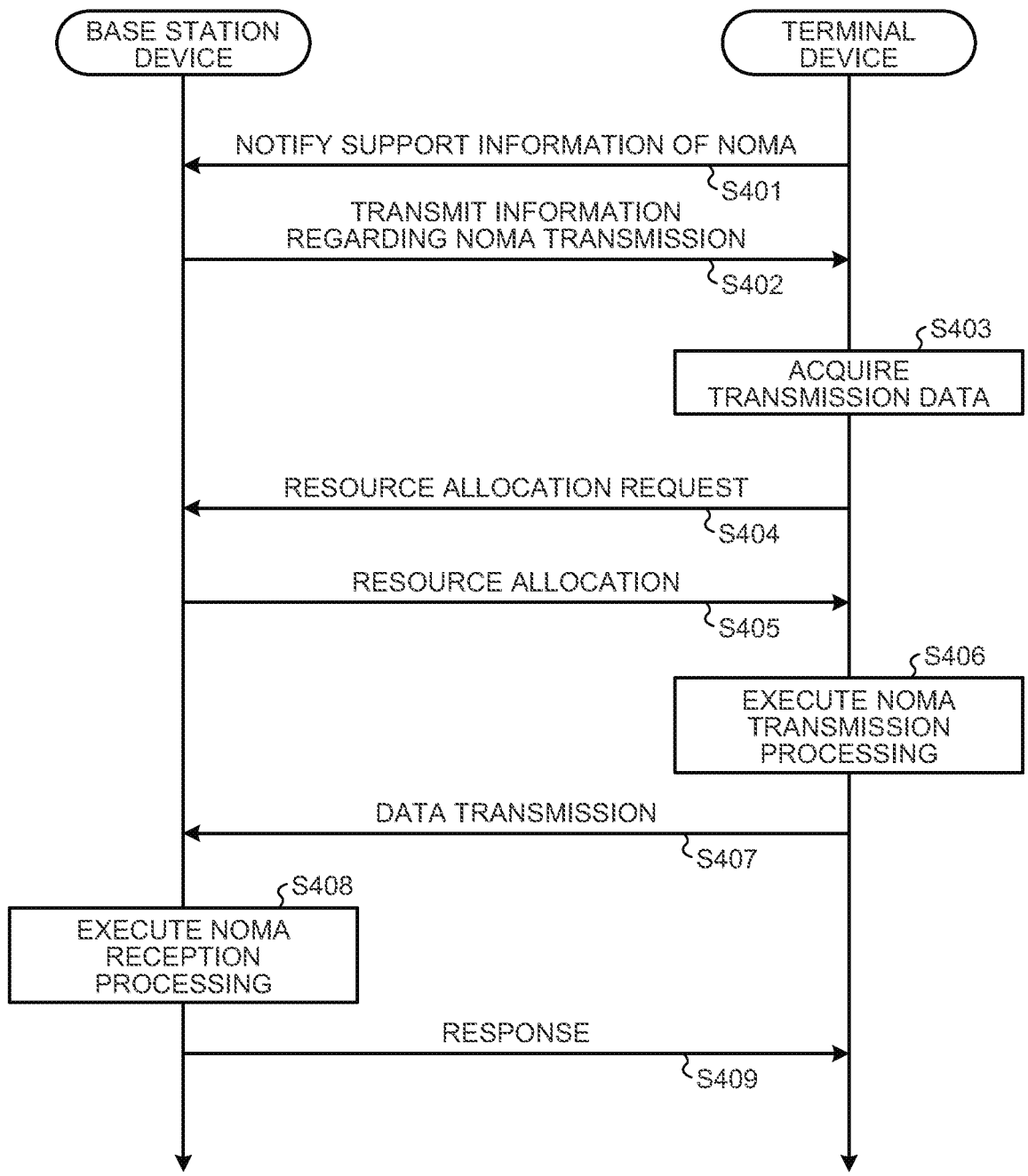
FIG. 21 is a sequence diagram illustrating an example of transmission/reception processing (Grant Based).

The transmission/reception processing (Grant Based) is processing in which the terminal device 40 receives a dynamic resource allocation (Grant) from the base station device 20 and transmits data. FIG. 21 is a sequence diagram illustrating an example of the transmission/reception processing (Grant Based). Hereinafter, the transmission/reception processing (Grant Based) will be described with reference to FIG. 21. The transmission/reception processing (Grant Based) illustrated below is executed, for example, in a case where the terminal device 40 is in the connected state (RRC_CONNECTED) with the base station device 20.

First, the transmission unit 455 of the terminal device 40 transmits support information of NOMA to the base station device 20 in the connected state (Step S401). The support information of NOMA is information indicating whether or not the terminal device 40 supports NOMA (for example, whether or not the NOMA transmission processing can be executed). The support information of NOMA may include information of non-orthogonal resources available to the terminal device 40.

Then, the transmission unit 235 of the base station device 20 transmits the information regarding the NOMA transmission to the terminal device 40 together with the information for instructing to use the NOMA transmission (Step S402). This transmission may be performed by using RRC signaling.

The reception unit 454 of the terminal device 40 receives information regarding NOMA transmission from the base station device 20 and stores the information in the storage unit 22. Then, the acquisition unit 451 of the terminal device 40 acquires the transmission data (Step S403). For example, the acquisition unit 451 acquires data generated as data to be transmitted by various programs of the terminal device 40 to another communication device (for example, the base station device 20) as transmission data. Then, the transmission unit 455 transmits a resource allocation request to the base station device 20 (Step S404).

The reception unit 233 of the base station device 20 receives the resource allocation request from the terminal device 40. Then, the processing unit 232 of the base station device 20 determines the MA resource to be allocated to the terminal device 40. Then, the transmission unit 235 of the base station device 20 transmits the information (MA resource information) of the MA resource allocated to the terminal device 40 to the terminal device 40 (Step S405).

The reception unit 454 of the terminal device 40 receives the MA resource information from the base station device 20 and stores the information in the storage unit 42. Then, the terminal device 40 executes NOMA transmission processing on the transmission unit data on the basis of the MA resource information (Step S406).

When the NOMA transmission processing is completed, the transmission unit 455 of the terminal device 40 transmits the NOMA transmission-processed data to the base station device (Step S407).

The reception unit 233 of the base station device 20 receives the NOMA transmission-processed data from the terminal device 40. The data received from the terminal device 40 is multiplexed data obtained by non-orthogonal multiplexing the data transmitted by another terminal device 40. Then, the base station device 20 executes NOMA reception processing on the multiplexed data in order to extract the data transmitted by the terminal device 40 from the multiplexed data (Step S408).

For example, the acquisition unit 231 of the base station device 20 acquires the information of NOMA transmission processing used by the terminal device 40 from the storage unit 22. Then, the separation unit 234 of the base station device 20 separates the data transmitted by the terminal device 40 from the multiplexed data on the basis of the information of NOMA transmission processing acquired by the acquisition unit 231.

When the separation is completed, the transmission unit 235 of the base station device 20 transmits response data (for example, an acknowledgment) to the terminal device 40 (Step S409). When the transmission of the response data is completed, the base station device 20 and the terminal device 40 end the transmission/reception processing (Grant Based).

<4-4. Transmission/Reception Processing (Configured Grant)>

Next, the "transmission/reception processing (Configured Grant)" will be described.

The transmission/reception processing (Configured Grant) is processing of using the Configured Grant transmission and transmitting data from the terminal device 40 to the base station device 20. Herein, Configured Grant transmission means that a communication device does not receive a dynamic resource allocation (Grant) from another communication device, and the communication device performs transmission using appropriate resources from available frequency and time resources on which an instruction is given in advance by another communication device. That is, the Configured Grant transmission means that the data transmission is performed on the DCI without including Grant. The Configured Grant transmission is also called Data transmission without grant, Grant-free, Semi persistent Scheduling, and the like.

In the case of Configured Grant transmission, the base station device 20 may specify in advance the candidates of frequency and time resources that the terminal device 40 can select. The main purpose thereof is the power saving of the terminal device 40 and low-delay communication by the reduction of signaling overhead. In Grant Based transmission/reception processing, the base station device 20 notifies the terminal device 40 of the resources used in the uplink or the sidelink. Accordingly, the terminal device 40 can communicate with other terminal devices 40 without resource contention. However, this method causes signaling overhead due to notification.

This will be specifically described using the sequence illustrated in FIG. 21. In the example of FIG. 21, when data is generated (Step S403), the terminal device 40 issues a resource allocation request to the base station device 20 (Step S404). The base station device 20 allocates resources to the terminal device 40 in response to the resource allocation request (Step S405). The terminal device 40 transmits data by using the resources allocated from the base station device 20 (Step S406). In the example of FIG. 21, signaling overhead for Step S404 and Step S405 occurs.

In the Configured Grant transmission, it is possible to reduce the processing of Steps S404 and S405 in the example of FIG. 21. Therefore, in the power saving and low-delay communication required for next-generation communication, the Configured Grant transmission without resource allocation notification is considered to be a promising technical candidate. The transmission resource for the Configured Grant transmission may be selected from all available bands or may be selected from the resources specified in advance from the base station device 20.

Figure 22:
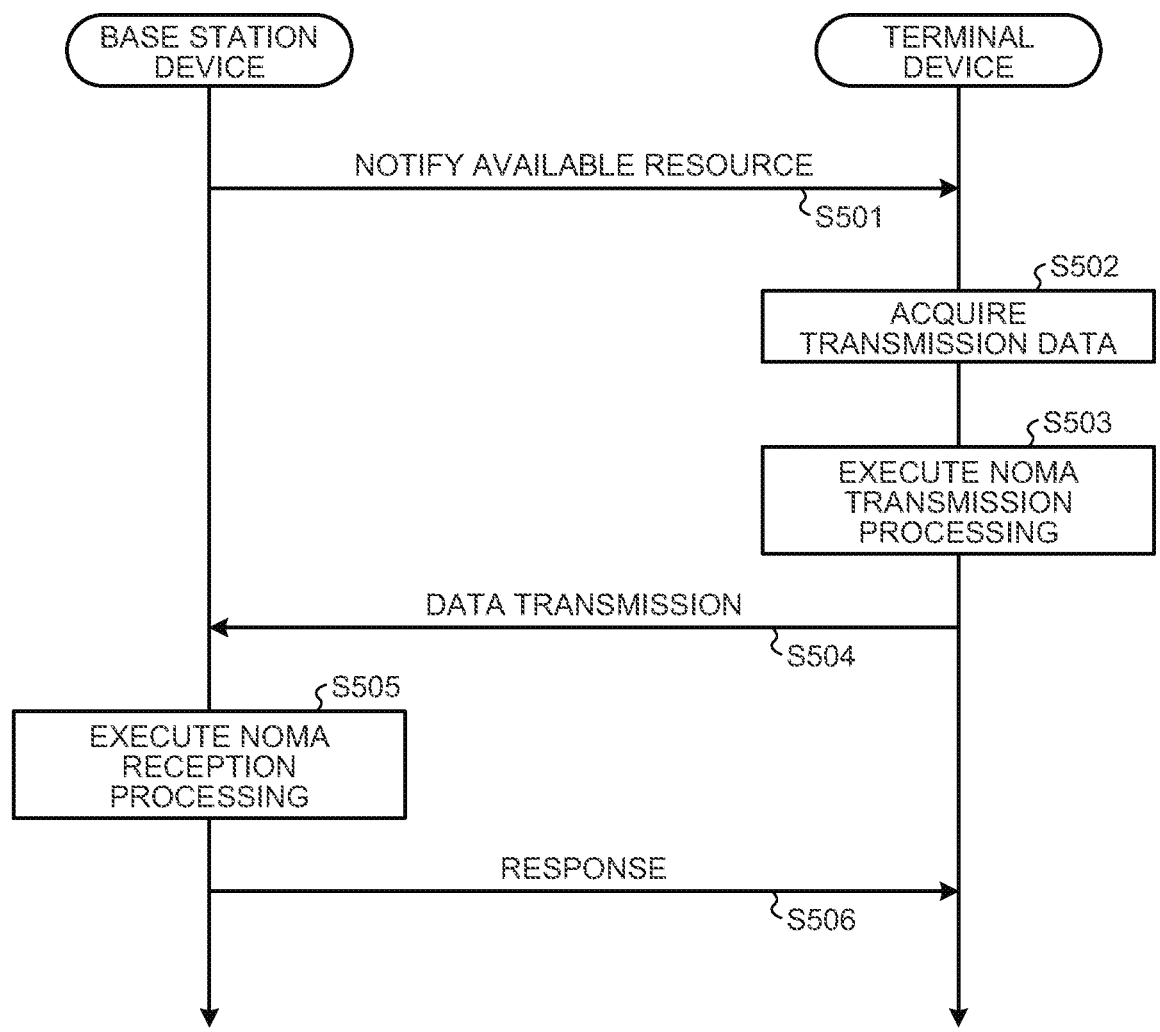
FIG. 22 is a sequence diagram illustrating an example of transmission/reception processing (Configured Grant).

FIG. 22 is a sequence diagram illustrating an example of transmission/reception processing (Configured Grant). Hereinafter, the transmission/reception processing (Configured Grant) will be described with reference to FIG. 22. The transmission/reception processing (Configured Grant) illustrated below is executed, for example, in a case where the terminal device 40 is in the connected state (RRC_CONNECTED) with the base station device 20.

When the terminal device 40 is in the connected state, the processing unit 232 of the base station device 20 determines the MA resource to be allocated to the terminal device 40. Then, the transmission unit 235 of the base station device 20 transmits the information (MA resource information) of the MA resource allocated to the terminal device 40 to the terminal device 40 (Step S501).

The reception unit 454 of the terminal device 40 receives the MA resource information from the base station device 20 and stores the information in the storage unit 22. Then, the acquisition unit 451 of the terminal device 40 acquires the generated transmission data (Step S502). For example, the acquisition unit 451 acquires data generated as data to be transmitted by various programs of the terminal device 40 to another communication device as transmission data.

Then, the control unit 45 of the terminal device 40 executes NOMA transmission processing on the transmission unit data on the basis of the MA resource information stored in the storage unit 22 (Step S503). When the NOMA transmission processing is completed, the transmission unit 455 of the terminal device 40 transmits the NOMA transmission-processed data to the base station device 20 (Step S504).

The reception unit 233 of the base station device 20 receives the NOMA transmission-processed data from the terminal device 40. The data received from the terminal device 40 is multiplexed data obtained by non-orthogonal multiplexing the data transmitted by another terminal device 40. Then, the base station device 20 executes NOMA reception processing on the multiplexed data in order to extract the data transmitted by the terminal device 40 from the multiplexed data (Step S505). For example, the acquisition unit 231 of the base station device 20 acquires the information of NOMA transmission processing used by the terminal device 40. Then, the separation unit 234 of the base station device 20 separates the data transmitted by the terminal device 40 from the multiplexed data on the basis of the information of NOMA transmission processing acquired by the acquisition unit 231.

When the separation is completed, the transmission unit 235 of the base station device 20 transmits response data (for example, an acknowledgment) to the terminal device 40 (Step S506). When the transmission of the response data is completed, the base station device 20 and the terminal device 40 end the transmission/reception processing (Configured Grant).

<4-5. Transmission/Reception Processing (Downlink)>

Next, data transmission (downlink) from the base station device 20 to the terminal device 40 will be described.

Figure 23:
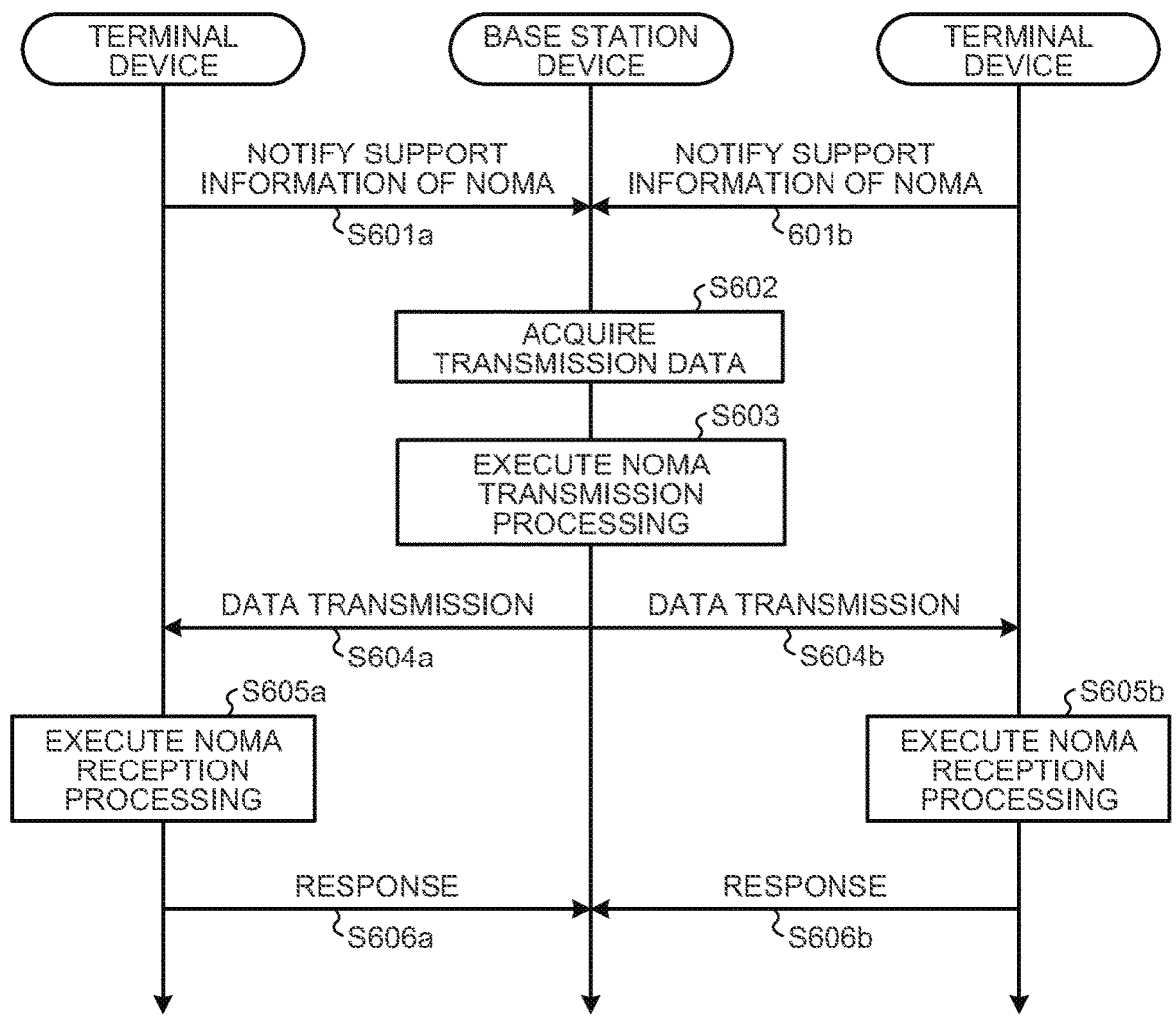
FIG. 23 is a sequence diagram illustrating an example of transmission/reception processing (downlink).

FIG. 23 is a sequence diagram illustrating an example of transmission/reception processing (downlink). FIG. 23 illustrates an example in which the base station device 20 transmits data to two terminal devices 40 in a non-orthogonal multiplexing manner. Hereinafter, the transmission/reception processing (downlink) will be described with reference to FIG. 23. The transmission/reception processing (downlink) illustrated below is executed, for example, in a case where two terminal device 40 are in the connected state (RRC_CONNECTED) with the base station device 20. In the following description, the two terminal devices 40 are simply referred to as the terminal devices 40.

First, the transmission unit 455 of the terminal device 40 transmits support information of NOMA to the base station device 20 in the connected state (Step S601a and Step S601b).

The reception unit 233 of the base station device 20 receives the support information from the terminal device 40. Then, the acquisition unit 231 of the base station device 20 acquires transmission data to be transmitted to each of the two terminal device 40 (Step S602). For example, the acquisition unit 231 acquires data generated as data transmitted by various programs of the base station device 20 to other communication devices as transmission data.

Then, the processing unit 232 of the base station device 20 executes NOMA transmission processing on the transmission unit data (Step S603). When the NOMA transmission processing is completed, the transmission unit 235 of the base station device 20 transmits a plurality of pieces of NOMA transmission-processed data to the terminal device 40 (Step S604a and Step S604b). At this time, the transmission unit 235 may transmit the plurality of pieces of NOMA transmission-processed data in non-orthogonal multiplexing or may transmit the plurality of pieces of NOMA transmission-processed data from different antennas and multiplex the data in the transmission channel.

The reception unit 454 of the terminal device 40 receives the NOMA transmission-processed data from the base station device 20. The data received from the base station device 20 is multiplexed data obtained by non-orthogonal multiplexing the plurality of pieces of NOMA transmission-processed data. Then, the terminal device 40 executes NOMA reception processing on the multiplexed data in order to extract the data transmitted to itself from the multiplexed data (Step S605a and Step S605b). For example, the acquisition unit 451 of the terminal device 40 acquires the information (for example, MA signature information) of NOMA transmission processing used by the base station device 20. Then, the separation unit 456 of the terminal device 40 separates the data transmitted to itself from the multiplexed data on the basis of the information of NOMA transmission processing acquired by the acquisition unit 451.

When the separation is completed, the transmission unit 455 of the terminal device 40 transmits response data (for example, an acknowledgment) to the base station device 20 (Step S606a and Step S606b). When the transmission of the response data is completed, the base station device 20 and the terminal device 40 end the transmission/reception processing (Configured Grant).

5. DYNAMIC SWITCHING PROCESSING OF TRANSMISSION MEANS OF REFERENCE SIGNAL

As described above, in NR, contention-based data transmission such as Configured Grant transmission and Non-orthogonal Multiple Access (NOMA) transmission is examined with the aim of more efficient use of radio waves. When the contention-based data transmission is frequently used, more data transmissions may be multiplexed in the same frequency band than ever before. In this embodiment, even in a communication environment where many data transmissions may be multiplexed, many terminals (or layers) can be multiplexed while preventing constant deterioration of signal quality.

For example, the communication device of this embodiment acquires information regarding signal processing of predetermined data transmission, and the transmission means of the reference signal according to the "predetermined data transmission" is switched on the basis of the acquired information. That is, the communication device of this embodiment dynamically switches the transmission means of the reference signal in accordance with the data transmission.

That is, in a case where there is a high possibility that many transmission signals are multiplexed, the communication device of this embodiment can multiplex many reference signals, so that many data transmissions can be multiplexed on the same orthogonal resource. On the other hand, in a case where the data transmission is the conventional non-contention-based data transmission, the conventional transmission means is used, and thus the signal quality is not significantly deteriorated.

Accordingly, even in a communication environment (for example, an environment where communication using NR is possible) where many data transmissions may be multiplexed, the communication device of this embodiment can realize high communication performance (for example, low delay, high quality, and low occurrence rate of communication errors).

Incidentally, in the following description, it is assumed that the communication device (that is, the communication device which switches the transmission means of the reference signal) which performs data transmission is the terminal device 40, and the communication device which receives the data transmission is the base station device 20. Of course, the communication device which performs data transmission may be the base station device 20, and the communication device which receives the data transmission may be the terminal device 40. In this case, the description of "terminal device 40" appearing in the following description may be replaced with "base station device 20". Further, the description of "acquisition unit 451" and "switching unit 457" may be replaced with "acquisition unit 231" and "switching unit 236".

Incidentally, the communication device which performs data transmission is not limited to the terminal device 40 and the base station device 20, and may be, for example, the relay device 30. Further, the communication device which receives the data transmission is not limited to the base station device 20 and the terminal device 40, and may be the relay device 30. Of course, both the communication device which performs data transmission and the communication device which receives the data transmission may be the base station device 20, the relay device 30, or the terminal device 40.

Incidentally, in the following description, the conventional transmission means of the reference signal may be referred to as a "first transmission means". In the case of NR, the "conventional transmission means of the reference signal" is, for example, the transmission means described in 6.4.1 Reference signals or 7.4.1 Reference signals of 3GPP TS38.211 V15.4.0 (2018 December). Further, in the following description, a transmission means (a transmission means newly disclosed in this embodiment) capable of multiplexing more reference signals than the first transmission means may be referred to as a "second transmission means". Incidentally, the first transmission means is not limited to the "conventional transmission means of the reference signal", and may be a transmission means not existing before.

The embodiment described below is based on the premise that the radio access technology used by the communication system 1 is NR. That is, the embodiment described below is based on the premise that the radio frame configuration is an NR wireless frame configuration as illustrated in FIGS. 6, 8 and 10. Of course, the radio access technology used by the communication system 1 of this embodiment is not limited to NR. For example, the radio access technology used by communication system 1 may be LTE. In this case, the following embodiments are appropriately modified according to the radio frame configuration of the radio access technology adopted in the communication system 1.

Hereinafter, processing related to dynamic switching of the transmission means of the reference signal will be described in detail.

<5-1. Parameters of Transmission Signal Processing>

In this embodiment, the acquisition unit 451 of the terminal device 40 acquires "information regarding signal processing of predetermined data transmission", and the switching unit 457 of the terminal device 40 switches the transmission means of the reference signal according to the "predetermined data transmission" to the second transmission means on the basis of the acquired information. In the following description, the "information regarding signal processing of predetermined data transmission" may be referred to as "parameters of transmission signal processing".

At this time, the parameters of the transmission signal processing may include information (predetermined information) that enables specifying whether or not the "predetermined data transmission" is contention-based data transmission. In the following description, the "information that enables specifying whether or not transmission is contention-based data transmission" may be referred to as "data transmission type specifying information".

The following information (A1) to (A4) can be assumed as the parameters (or data transmission type specifying information) of the transmission signal processing.

(A1) Information regarding non-orthogonal code
(A2) Modulation and Coding Scheme (MCS)
(A3) Information regarding resource allocation
(A4) Information initial transmission or retransmission Hereinafter, each of (A1) to (A4) will be described.

(A1) Information Regarding Non-Orthogonal Code

Information regarding the non-orthogonal code may be assumed as the "parameter of transmission signal processing". At this time, the terminal device 40 can consider all or part of the information regarding the non-orthogonal code as "data transmission type specifying information".

The information regarding the non-orthogonal code is, for example, the Multiple Access signature (MA signature). At this time, the acquisition unit 451 of the terminal device 40 may acquire the MA signature from the base station device 20 or may acquire the MA signature from the storage unit 42 of the terminal device 40.

The MA signature is one of the information regarding non-orthogonal multiplexing. For example, the MA signature includes at least one piece of information of Interleave Pattern, Spreading Pattern, Scrambling Pattern, Codebook, and Power Allocation. Incidentally, the MA signature may be simply called Pattern or Index. For example, the MA signature may be an identifier indicating the Pattern or Index used in the NOMA transmission or may represent the Pattern itself.

Further, the information regarding the non-orthogonal code may be Enable/Disable information (valid/invalid information) of the non-orthogonal multiple access (NOMA). The Enable/Disable information may be notified as one-bit information to the terminal device 40 from the transmission unit 235 of the base station device 20 by DCI, RRC signaling, or SIB. Incidentally, the Enable/Disable information may be included as one pattern of the MA signature in the information for notifying the MA signature.

(A2) Modulation and Coding Scheme (MCS)

MCS may be assumed as the "parameter of transmission signal processing". At this time, the terminal device 40 can consider all or part of the MCS as "data transmission type specifying information".

At this time, the transmission unit 235 of the base station device 20 may notify the terminal device 40 of the data transmission identification information by using some bits of the MCS. For example, in the case of NOMA transmission, when a modulation method with many signal points such as 256QAM is used, it is assumed that demodulation cannot be performed on the receiving side. Therefore, it is assumed that a modulation method with many signal points such as 256QAM is not used in NOMA transmission. The bits allocated to the unused modulation method are diverted as bits for notifying the data transmission type specifying information. Accordingly, it becomes unnecessary to change the payload size of the control information.

Incidentally, the information (data transmission type specifying information) indicated by the diverted bits may be information regarding the non-orthogonal code. Further, at least one bit or more of the MCS may be allocated as a bit indicating the information regarding the non-orthogonal code. At this time, the information regarding the non-orthogonal code may be the MA signature or may be the Enable/Disable information.

(A3) Information Regarding Resource Allocation

Information regarding resource allocation may be assumed as the "parameter of transmission signal processing". At this time, the terminal device 40 can consider a part of the information regarding the resource allocation as "data transmission type specifying information".

At this time, the transmission unit 235 of the base station device 20 may notify the terminal device 40 of the data transmission type specifying information by using some bits of the information regarding the resource allocation. The information regarding the resource allocation may be information regarding advance resource allocation. The information regarding advance resource allocation may also be notified via RRC signaling or SIB. Accordingly, it also becomes unnecessary to change the payload size of the control information. Incidentally, the information (data transmission type specifying information) indicated by the bits may be information regarding the above-described non-orthogonal code.

(A4) Information Initial Transmission or Retransmission

Information regarding initial transmission or retransmission may be assumed as the "parameter of transmission signal processing". At this time, the terminal device 40 can consider all or part of the information regarding the initial transmission or retransmission as "data transmission type specifying information".

For example, it is assumed that the terminal device 40 uses HARQ as an automatic retransmission technology. In this case, it is assumed that contention-based data transmission (for example, NOMA transmission) is often used for the initial transmission so that many terminals can be multiplexed. Further, in retransmission, since the initial transmission fails, it is assumed that non-contention-based data transmission (for example, OMA transmission) is often used to ensure data transmission. Therefore, the terminal device 40 can use the information regarding the initial transmission or retransmission of HARQ as the data transmission type specifying information. When the information regarding the initial transmission or retransmission is used as the data transmission type specifying information, it becomes unnecessary to change the payload size of the control information.

Incidentally, the information regarding the initial transmission or retransmission may be a New Data Indicator (NDI). Further, the information regarding the initial transmission or retransmission may be a Redundancy version. Further, the information regarding the initial transmission or retransmission may be information for specifying whether the data transmission is a Configured grant transmission or a Grant-based transmission.

<5-2. Example of Contention-Based Transmission>

As described above, in NR, contention-based data transmission such as NOMA transmission and Configured Grant transmission is examined. The contention-based data transmission is, for example, a data transmission which contends with or may contend with other data transmissions. The NOMA transmission is contention-based data transmission since the transmission contends with other data transmission superimposed on the non-orthogonal axis on the orthogonal axis. In the following description, the contention-based data transmission may be referred to as contention-based transmission.

The contention-based transmissions are typically NOMA transmission or Configured Grant transmission, but the contention-based transmissions are not limited to NOMA transmission or Configured Grant transmission. The examples of the contention-based transmission include the following (B1) to (B5).

(B1) NOMA transmission
(B2) Configured grant transmission
(B3) Two-step/four-step random access transmission
(B4) Data transmission from unconnected state
(B5) Sidelink transmission NOMA transmission of (B1) is a non-orthogonal multiple access (NOMA) data transmission.

In Configured grant transmission of (B2), a communication device (for example, the terminal device 40) does not receive a dynamic resource allocation (Grant) from another communication device (for example, the base station device 20), and the communication device performs transmission by using appropriate resources from available frequency and time resources on which an instruction is given in advance by another communication device.

Two-step/four-step random access transmission of (B3) is data transmission related to the random access procedure in two steps or four steps.

(B4) data transmission from unconnected state is data transmission which a communication device (for example, the terminal device 40) performs to another communication devices (for example, the base station device 20) without transitioning from the unconnected state to the connected state.

Incidentally, the unconnected state is, for example, RRC_IDLE or RRC_INACTIVE. The non-connected state may include Lightning mode. Further, the connected state is, for example, RRC_CONNECTED. Herein, RRC_IDLE is an idle state in which the terminal device is not connected to any cell (or the base station device), and is also called Idle mode. Further, RRC_INACTIVE is a radio connection state indicating an inactive state newly defined by NR, and is also called an Inactive mode. RRC_CONNECTED is a connected state in which the terminal device 40 establishes a connection with any cell (or the base station device 20) and is also called a CONNECTED mode.

(B5) sidelink transmission is data transmission performed between the terminal devices 40. The data transmission between terminal devices 40 is often performed using shared resources instead of dedicated resources, and there is a possibility of data conflict, and thus the data transmission is included in the contention-based transmission.

Incidentally, in the following description, data transmission which is not contention-based transmission may be referred to as "non-contention-based data transmission" or "non-contention-based transmission". The non-contention-based transmission is, for example, OMA transmission or Grant Based transmission. Herein, the OMA transmission is orthogonal multiple access (OMA) data transmission. That is, the OMA transmission is data transmission which does not use non-orthogonal resources but use orthogonal resources. Further, the Grant Based transmission is data transmission which a communication device (for example, the terminal device 40) performs when receiving a dynamic resource allocation (Grant) from another communication device (for example, the base station device 20).

Incidentally, in the following description, it is assumed that the contention-based transmission is NOMA transmission and non-orthogonal multiple access data transmission, and a non-contention-based transmission is OMA transmission. Of course, the contention-based transmission is not limited to the NOMA transmission, and the non-contention-based transmission is not limited to the OMA transmission.

<5-3. Signal Processing Unit for Contention-Based Transmission>

The communication device of this embodiment has a signal processing unit for contention-based transmission. The signal processing unit for contention-based transmission is, for example, a signal processing unit for non-orthogonal multiple access. In the case of the base station device 20, the signal processing unit 21 corresponds to the "signal processing unit related to non-orthogonal multiple access". Further, in the case of the terminal device 40, the signal processing unit 41 corresponds to the "signal processing unit related to non-orthogonal multiple access".

Figure 24:
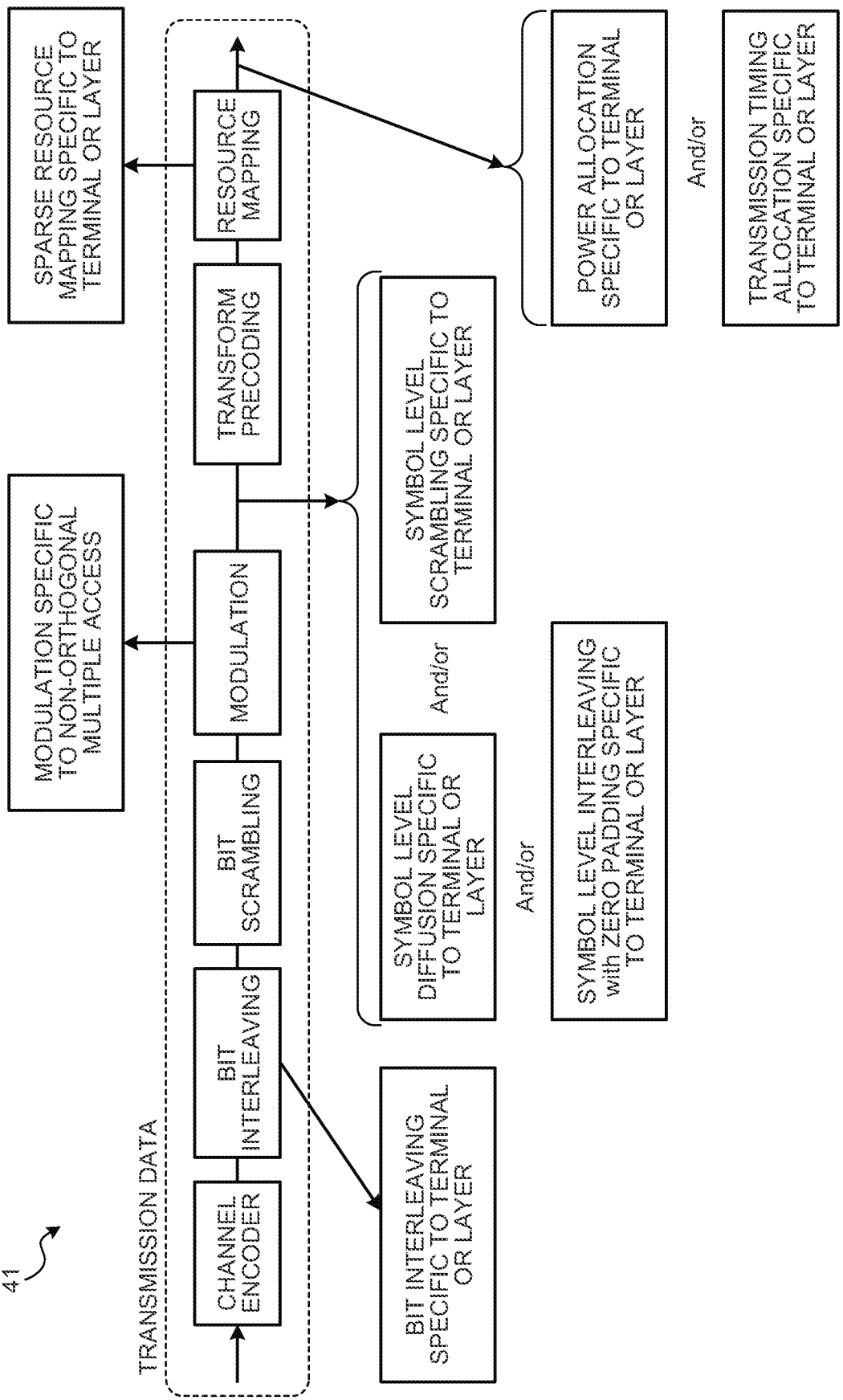
FIG. 24 is a diagram illustrating a difference between a conventional signal processing unit and a signal processing unit relating to non-orthogonal multiple access.

FIG. 24 is a diagram illustrating the difference between the conventional signal processing unit and the signal processing unit related to non-orthogonal multiple access. Specifically, FIG. 24 is a functional block diagram illustrating the functions of the signal processing unit related to data transmission. The part surrounded by a broken line is conventional signal processing units in NR, and functional blocks outside the frame of the broken line are functional blocks newly added (or replaced) to the signal processing units related to non-orthogonal multiple access.

As illustrated in FIG. 24, the signal processing units have functional blocks which perform at least one of the following operations (C1) to (C8). Of course, the signal processing units may have all of (C1) to (C8).

(C1) Bit interleaving specific to terminal or layer
(C2) Modulation specific to non-orthogonal multiple access
(C3) Symbol level diffusion specific to terminal or layer
(C4) Symbol level scrambling specific to terminal or layer
(C5) Symbol level interleaving with zero padding specific to terminal or layer
(C6) Sparse resource mapping specific to terminal or layer
(C7) Power allocation specific to terminal or layer
(C8) Transmission timing specific to terminal or layer <5-4. Reference Signal for Switching Transmission Means>

As described above, the switching unit 457 of the terminal device 40 (or the switching unit 236 of the base station device 20) switches the transmission means of the reference signal to the second transmission means. Here, examples of the reference signal switched by the switching unit 457 include the following (D1) to (D5).

(D1) Demodulation reference signal (DM-RS)
(D2) Phase-tracking reference signal (PT-RS)
(D3) Sounding reference signal (SRS)
(D4) Channel state information reference signal (CSI-RS)
(D5) Preamble The switching unit 457 may switch all the reference signals indicated by (D1) to (D5), or may switch at least one of the reference signals (D1) to (D5). Herein, the preamble in (D5) is a preamble used in the random access procedure. The preamble can also be considered as one of the reference signals.

Incidentally, the information of the reference signal switched by the switching unit 457 may be at least one of the following (E1) to (E7).

(E1) Transmission power
(E2) Transmission resource
(E3) Orthogonal code
(E4) Cyclic shift
(E5) Subcarrier spacing
(E6) Number of symbols
(E7) Number of resource elements (RE)

<5-5. Details of Switching Transmission Means of Reference Signal>

The switching unit 457 of the terminal device 40 (or the switching unit 236 of the base station device 20) switches the transmission means of the reference signal to the second transmission means. The following (F1) to (F8) can be assumed as the switching method.

(F1) Muting
(F2) Mapping pattern (1) of reference signal resource
(F3) Subcarrier spacing
(F4) Resource amount of reference signal resource
(F5) Division of reference signal sequence
(F6) Mapping pattern (2) of reference signal resource
(F7) Multiple position arrangement
(F8) Multiple slot arrangement As described above, in the following description, it is assumed that the switching unit 457 of the terminal device 40 switches the transmission means of the reference signal, but it may be the switching unit 236 of the base station device 20 that switches the transmission means of the reference signal. Of course, the relay device 30 may switch the transmission means of the reference signal. The descriptions of "terminal device 40", "switching unit 457", and "base station device 20" appearing in the following description may be appropriately replaced with "base station device 20", "switching unit 236", and "terminal device 40".

Hereinafter, each of (F1) to (F8) will be described.

(F1) Muting

First, the "muting" of (F1) will be described.

In this method, in a case where the transmission means of the reference signal is used as the second transmission means, the switching unit 236 mutes part or all of the transmission resources which are allocated to the reference signal by the first transmission means (for example, the conventional transmission means in NR). The "conventional transmission means in NR" is, for example, the transmission means described in 6.4.1 Reference signals or 7.4.1 Reference signals of 3GPP TS38.211 V15.4.0 (2018 December).

Herein, muting means that the transmission power of the signal arranged in the transmission resource is set to zero. The muted transmission resource is allocated to the reference signal of another communication device (or another layer) which performs data transmission. Herein, the layer means a layer in spatial multiplexing such as Multiple-Input Multiple-Output (MIMO) multiplexing. Incidentally, in the following description, the transmission resource (for example, the resource element to be muted) to be muted may be referred to as a muted resource.

Figure 25:
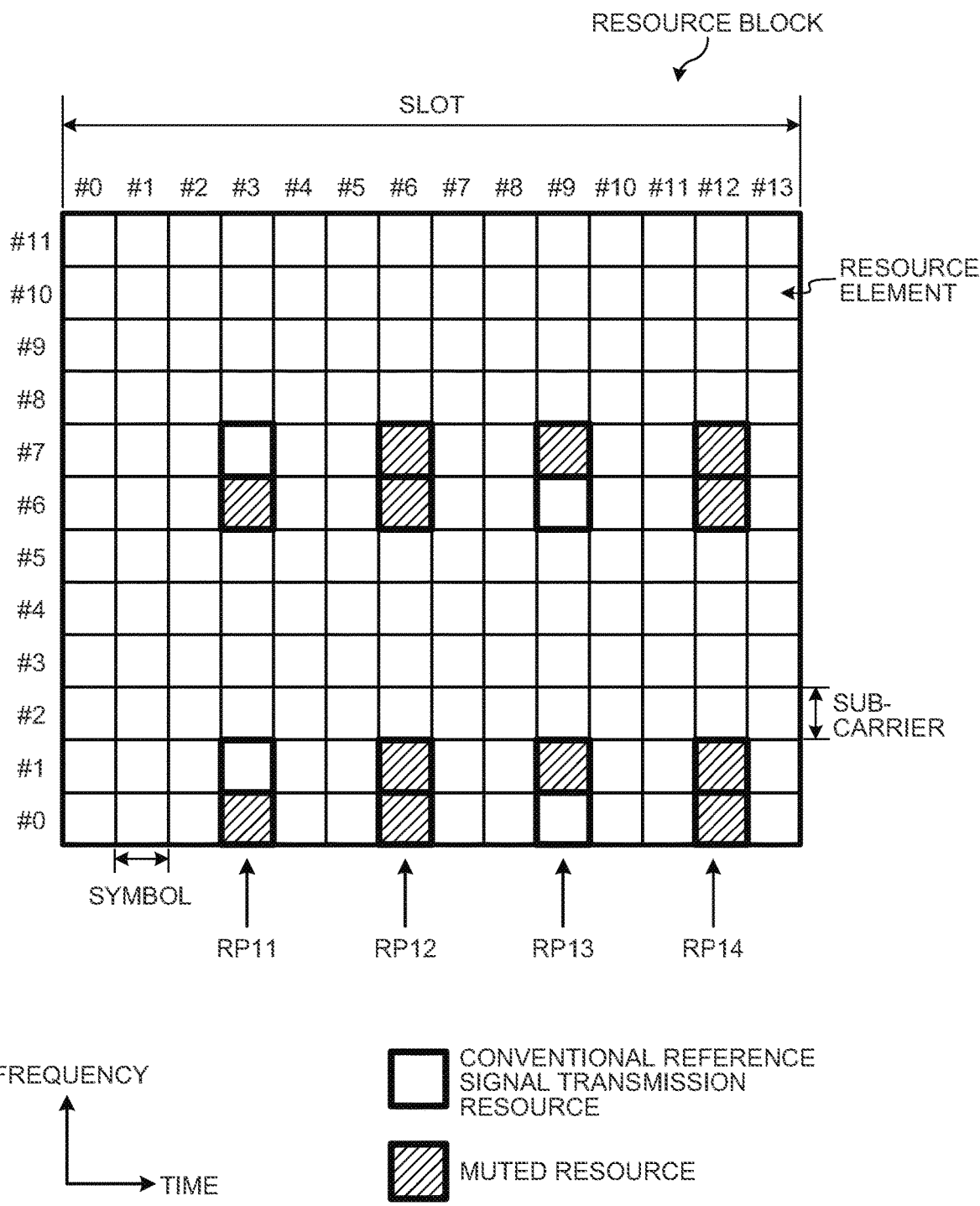
FIG. 25 is a diagram illustrating a state in which part or all of transmission resources allocated to a reference signal in a conventional transmission means are muted.

FIG. 25 is a diagram illustrating a state in which part or all of the transmission resources allocated to the reference signal by the conventional transmission means are muted. FIG. 25 illustrates an aspect in which the reference signals (DM-RS in the example of FIG. 25) are arranged in a resource block in NR. The reference signal illustrated in FIG. 25 is an example of DM-RS of a single symbol. That is, in the example of FIG. 25, one reference signal (for example, an identical sequence of reference signals) is arranged in one symbol. In the following description, the position (symbol) in a time axis direction in which one reference signal is arranged is referred to as a reference signal position. In the example of FIG. 25, four reference signal positions RP11 to RP14 are provided in one resource block (one slot). Different sequences of reference signals are arranged at a plurality of reference signal positions, respectively. Incidentally, in the case of a double symbol, it is important to note that a pair of two symbols which are continuous in the time axis direction is one reference signal position.

In the example of FIG. 25, four resource elements per reference signal position are allocated as the transmission resources (hereinafter referred to as reference signal resources) of the reference signal. In the drawing, the resource element in a thick frame is the reference signal resource in the conventional transmission means in NR. In the second transmission means, the switching unit 236 is a resource element of muting part or all of the resource elements which are the reference signal resources in the first transmission means.

An example will be described in which part of the reference signal resources is muted using the resource position RP11 in FIG. 25. In a case where the first transmission means is used as the transmission means, the switching unit 236 uses four resource elements having subcarrier indexes of #0, #1, #6, and #7 as reference signal resources. On the other hand, in a case where the second transmission means is used as the transmission means, the switching unit 236 uses the two resource elements #0 and #6 in a frequency axis direction as muted resources and uses the two resource elements #1 and #7 as the reference signal resources. The muted resource element is allocated to the reference signal of another communication device or another layer. Incidentally, in the example of the resource position RP11 in FIG. 25, two resource elements are muted, but the number of resource elements to be muted is not limited to two.

Next, an example in which all of the reference signal resources are muted will be described by using the resource position RP12 in FIG. 25. In a case where the first transmission means is used as the transmission means, the switching unit 236 uses the resource elements having subcarrier indexes of #0, #1, #6, and #7 as reference signal resources. On the other hand, in a case where the second transmission means is used as the transmission means, the switching unit 236 uses all four resource elements as muted resources. The muted resource element is allocated to the reference signal of another communication device or another layer. Incidentally, in a case where all of the reference signal resources are muted, the base station device 20 may perform channel estimation by using reference signals arranged at another resource position.

Incidentally, a plurality of symbols may be one reference signal position. That is, one reference signal (for example, an identical sequence of reference signals) may be arranged in a plurality of symbols. For example, in the DM-RS of double symbol, the identical sequence of reference signals are arranged in a pair of two symbols which are continuous in the time axis direction. In a case where one reference signal position is configured by a plurality of symbols, and the first transmission means is used as the transmission means, the switching unit 236 may mute the reference signal resources arranged in some symbol of the plurality of symbols configuring the reference signal position. For example, in the case of the DM-RS of double symbol, the switching unit 236 mutes all the reference signal resources (for example, a plurality of resource elements considered as the reference signal resources) of one of the two symbols.

When part or all of the reference signal resources is muted, it becomes possible to allocate a reference signal of another communication device or another layer to the muted part. As a result, many data transmissions can be multiplexed.

Incidentally, the muting of the reference signal resource is not limited to the above method. For example, the terminal device 40 may be muted by frequency or time hopping.

Further, in the above example, the reference signal resource to be muted in resource element units is selected, but the reference signal resource to be muted in resource block units (or slot units) may be selected. For example, in the second transmission means, the terminal device 40 may perform an operation of muting all the reference signal resources arranged in a predetermined resource block (or a predetermined slot) in the predetermined resource block (or the predetermined slot) and not muting the reference signal resources in other resource blocks (or other slots).

(F2) Mapping Pattern (1) of Reference Signal Resource

Next, the "mapping pattern (1) of the reference signal resource" of (F2) will be described.

In this method, the switching unit 236 makes the mapping pattern of the reference signal resource different between the first transmission means and the second transmission means. For example, in a case where the transmission means of the reference signal is used as the second transmission means, the switching unit 236 switches the algorithm or calculation formula of the transmission resource mapping of the reference signal. The following formula (1) is a formula for explaining a switching example of the calculation formula.

$$\tilde{a}_{k,l}^{(\tilde{p}_j,\mu)} = w_f(k')w_t(l')r(2n+k') \quad (1)$$

$$k = \begin{cases} 4n + 2k' + \Delta & \text{Configuration type 1} \\ 6n + k' + \Delta & \text{Configuration type 2} \\ 6k' + \Delta & \text{Configuration type 3} \end{cases}$$

$$k' = 0, 1$$

$$l = \bar{l} + l'$$

$$n = 0, 1, \ldots$$

$$j = 0, 1, \ldots, \upsilon - 1$$

Here, in formula (1), the calculation formula applied in Configuration type 3 is added to the formula indicated in 6.4.1.1.3 Precoding and mapping to physical resources of 3GPP TS38.211 V15.4.0 (2018 December). In formula (1), "k" indicates the subcarrier index. Further, "l" indicates the OFDM symbol index. Further, "r( )" indicates the sequence of reference signals. The sequence is generated, for example, by the method described in 6.4.1.1.1 Sequence generation of 3GPP T538.211 V15.4.0 (2018 December). For example, the parameters in the table illustrated in FIG. 26 are applied to respective parameters indicated in formula (1).

FIG. 26 is a diagram illustrating parameters in PUSCH DM-RS configuration type 2. "P~" in the leftmost column of the table indicates the index of a DM-RS port. As can be seen in FIG. 26, in the case of a double symbol, at most 12 ports can be multiplexed.

In formula (1), the calculation formula of Configuration type 1 indicates that one reference signal is arranged every other element.

In formula (1), for example, in the case of CDM group=0 (that is, if $\Delta$=0), the calculation formula of Configuration type 2 indicates that one reference signal is arranged in the resource elements having subcarrier indexes of #0, #1, #6, and #7.

In formula (1), for example, in the case of CDM group=0 (that is, if Δ=0), the calculation formula of Configuration type 3 indicates that one reference signal is arranged in the resource elements having subcarrier indexes of #0 and #6.

In this embodiment, in a case where the transmission means of the reference signal is the first transmission means, for example, Configuration type 1 or Configuration type 2 is applied. In the case of the second transmission means, for example, Configuration type 3 is applied. That is, the switching unit 236 dynamically switches whether to apply Configuration type 1 or Configuration type 2, or Configuration type 3 on the basis of the data transmission type specifying information. For example, the switching unit 236 applies the calculation formula of Configuration type 3 when the switching trigger in <5-5. Switching trigger> description given later occurs.

Incidentally, the second transmission means may determine the mapping pattern of the reference signal resource such that the amount (for example, the number of resource elements) of reference signal resources is larger than the amount of reference signal resources allocated when the first transmission means is used.

The number of multiplexable reference signals can be increased by increasing the amount of reference signal resources. As a result, many data transmissions can be multiplexed while maintaining high communication quality.

(F3) Subcarrier Spacing

Next, the "subcarrier spacing" of (F3) will be described.

As described in <2-6. Radio frame configuration> above, it is possible to change the subcarrier spacing (subcarrier interval) in NR. In this regard, the switching unit 236 switches the setting related to subcarrier spacing between the first transmission means and the second transmission means. The number of multiplexable reference signals can be increased by narrowing or widening the subcarrier spacing.

For example, in the case of the first transmission means, the switching unit 236 uses the same subcarrier spacing between data (for example, user data) and the reference signal. On the other hand, in the case of the second transmission means, the switching unit 236 uses different subcarrier spacing between the data and the reference signal. For example, in the case of the second transmission means, the switching unit 236 uses different subcarrier spacing between the data and the reference signal.

Accordingly, many data transmissions can be multiplexed while maintaining high communication quality.

(F4) Resource Amount of Reference Signal Resource

Next, the "resource amount of the reference signal resource" of (F4) will be described.

In the above means, the switching unit 236 switches the mapping pattern of the reference signal resource (above (F2)) or switches the setting of the subcarrier spacing (above (F3)) to change the resource amount of the reference signal resource. However, the switching unit 236 may change the resource amount of the reference signal resource regardless of the above means. That is, regardless of the above means, the switching unit 236 may switch the number of symbols or the number of resource elements of the reference signal resource between the first transmission means and the second transmission means.

For example, the switching unit 236 maintains the number of symbols or the number of resource elements of the reference signal resource as conventional in the first transmission means and increases the number of symbols or the number of resource elements of the reference signal resource from conventional in the first transmission means. The switching unit 236 may not use the last symbol of the slot as the reference signal resource in the first transmission means and may use the last symbol of the slot as the reference signal resource in the second transmission means.

The number of multiplexable reference signals can be increased by increasing the amount of reference signal resources. As a result, many data transmissions can be multiplexed while maintaining high communication quality.

(F5) Division of Reference Signal Sequence

Next, the "division of the reference signal sequence" of (F5) will be described.

The reference signal is a sequence signal generated according to a predetermined rule. This signal is, for example, a signal generated by the method described in 6.4.1.1.1 Sequence generation of 3GPP T538.211 V15.4.0 (2018 December). The switching unit 236 switches between the first transmission means and the second transmission means whether to arrange one sequence in one reference signal position or a combination of divided sequences.

Figure 27:
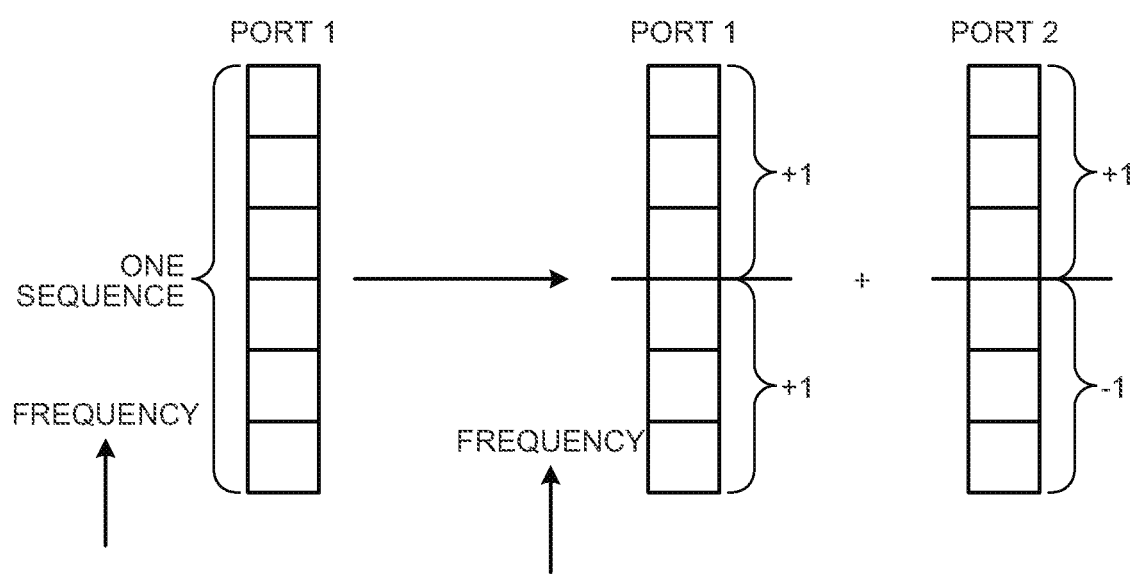
FIG. 27 is a diagram for explaining division of a reference signal sequence.

FIG. 27 is a diagram for explaining the division of the reference signal sequence. For example, in the case of the first transmission means, the switching unit 236 arranges only one sequence signal at one reference signal position. The six blocks on the left side of FIG. 27 indicate one sequence of reference signals arranged in one reference signal position.

On the other hand, in the case of the second transmission means, the switching unit 236 arranges a plurality of identical sequences at one reference signal position. Then, the switching unit 236 multiplies the plurality of identical sequences by the orthogonal code. The six blocks in the center of FIG. 27 indicate that two identical sequences, each of which is configured by three blocks, are arranged in one reference signal position. When the reference signal is configured by a plurality of identical sequences, and an orthogonal code is applied to the combination of the sequences, the number of multiplex reference signals can be increased.

For example, the reference signal is configured by two identical sequences, and the orthogonal code is applied to the pair of the sequences. Accordingly, it is possible to multiplex the reference signals of two ports. In the example of FIG. 27, the sequence pair of the central port 1 is applied with the orthogonal code of [+1, +1], and the sequence pair of the right port 2 is applied with the orthogonal code of [+1, −1]. Accordingly, it is possible to multiplex the reference signal of the port 1 and the reference signal of the port 2.

The number of multiplexable reference signals can be increased by the division of the reference signal sequence, and thus it is possible to multiplex many data transmissions.

(F6) Mapping Pattern (2) of Reference Signal Resource

Next, the "mapping pattern (2) of reference signal resource" of (F6) will be described.

As a method of switching the mapping pattern of the reference signal resource, a method other than the method described in (F2) above can be assumed. For example, in the case of the first transmission means, the switching unit 236 sets the resource mapping of the reference signal as a comb-shaped mapping. For example, in the case of the first transmission means, the switching unit 236 arranges the reference signal resources every other subcarrier. Alternatively, in the case of the first transmission means, the switching unit 236 arranges the reference signal resources in two consecutive arrangements every six subcarriers as illustrated in FIG. 25.

On the other hand, in the case of the second transmission means, the switching unit 236 arranges the reference signal resource in all the subcarriers of the reference signal position.

Accordingly, the amount of reference signal resources of the second transmission means can be made larger than the amount of reference signal resources of the first transmission means. As a result, many data transmissions can be multiplexed while maintaining high communication quality.

(F7) Multiple Position Arrangement

Next, the "multiple position arrangement" of (F7) will be described.

Figure 28:
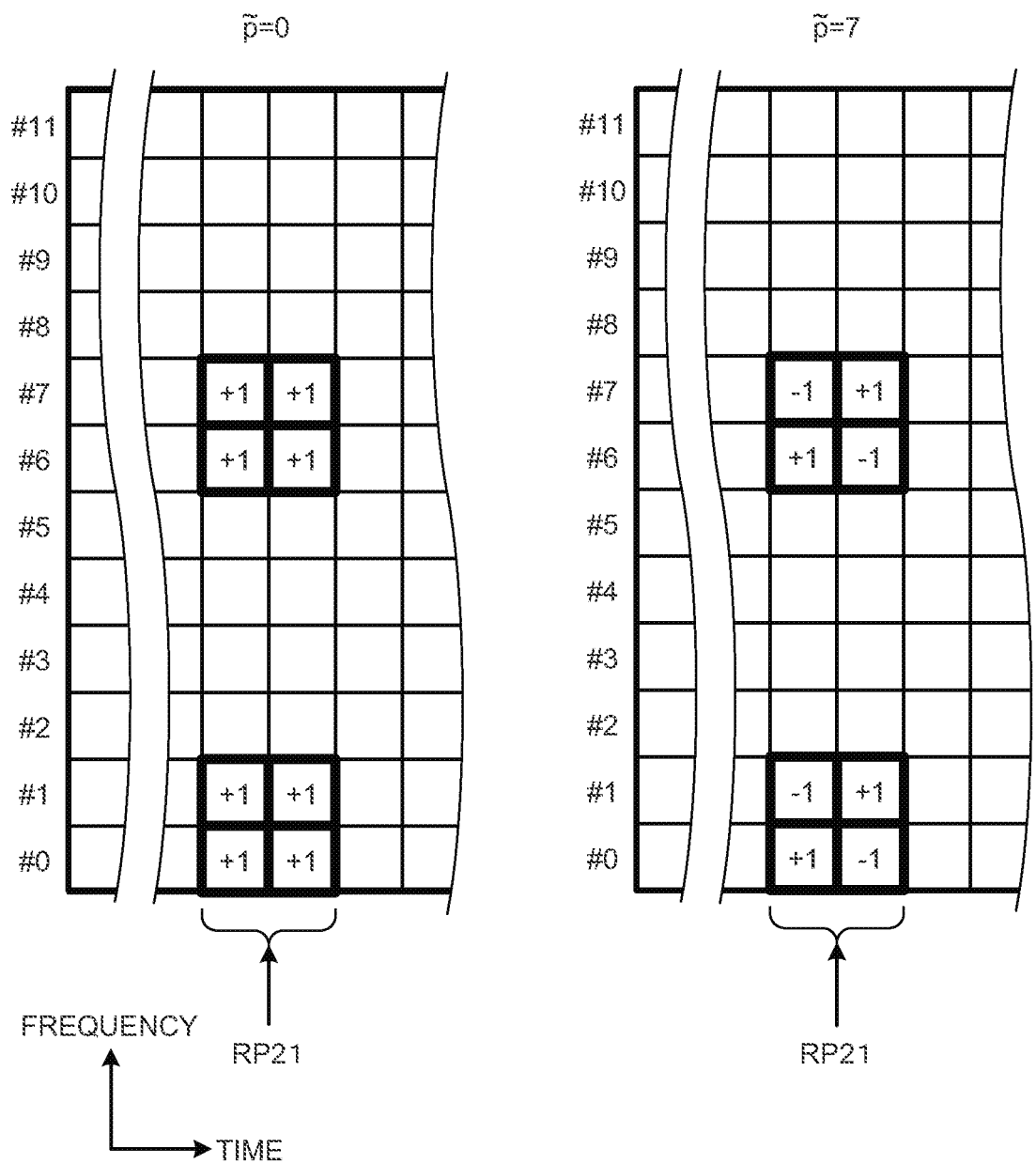
FIG. 28 is a diagram illustrating a relationship between the size of an orthogonal cover code and the multiplex number of DM-RS ports.

The size of the conventional orthogonal cover code is two or four. As can be seen from the table illustrated in FIG. 26, in the example of double symbol, four DM-RS ports per CDM group can be multiplexed. FIG. 28 is a diagram illustrating a relationship between the size of the orthogonal cover code and the multiplexing number of DM-RS ports. FIG. 28 is an example of double symbol of Configuration type 2. The drawings on the left and right side of FIG. 28 indicate the same reference signal position RP21. The drawing on the left side of FIG. 28 is an example of the DM-RS port of #0, and the drawing on the right side of FIG. 28 is an example of the DM-RS port #7. The different orthogonal cover codes (the combination of +1 and −1 in the drawing) having size of four are applied to the reference signals of DM-RS ports #0 and #7.

The switching unit 236 increases the size of the orthogonal cover code when the second transmission means is used to be larger than the size of the orthogonal cover code when the first transmission means is used, so that the number of multiplexable reference signals can be increased. For example, the switching unit 236 sets the size of the orthogonal cover code to two or four in the first transmission means and sets the size of the orthogonal cover code to a size larger than four (for example, eight) in the first transmission means.

For example, in the first transmission means, the switching unit 236 arranges different sequences of reference signals at all the reference signal positions in one resource block. When explaining with reference to the example of FIG. 25, in the first transmission means, the switching unit 236 arranges different sequences of reference signals of at four reference signal positions RP11 to RP14 in one resource block. That is, in the first transmission means, the switching unit 236 arranges different reference signal resources for respective reference signal positions.

On the other hand, in the second transmission means, the switching unit 236 arranges the identical sequences of reference signals at at least two reference signal positions in one resource block. When explaining with reference to the example of FIG. 25, in the second transmission means, the switching unit 236 arranges the identical sequences of reference signals as the reference signal positions RP11 and RP12 among the four reference signal positions RP11 to RP14 in one resource block. Further, in the second transmission means, the switching unit 236 arranges the identical sequences of reference signals as the reference signal positions RP13 and RP14 among the four reference signal positions RP11 to RP14 in one resource block. That is, in the second transmission means, the switching unit 236 arranges the resources of one reference signal at a plurality of reference signal positions. Then, the switching unit 236 makes the size of the orthogonal cover code larger than that of the first transmission means, so that many reference signals can be multiplexed.

In the case of a DM-RS, it is important to note that two symbols which are continuous in the time axis direction form one reference signal position. That is, in a case where one reference signal is arranged in two reference signal positions, in the case of the DM-RS of double symbol, one reference signal is arranged in a total of four symbols.

Accordingly, the number of multiplexable reference signals can be increased, and thus it is possible to multiplex many data transmissions.

(F8) Multiple Slot Arrangement

Next, the "multiple slot arrangement" of (F8) will be described.

In (F7) above, the size of the orthogonal cover code can be increased by arranging the identical sequences of reference signals at a plurality of reference signal positions. However, a method of increasing the size of the orthogonal cover code is not limited to the method described in (F7) above.

For example, the switching unit 236 arranges the reference signal resources such that the resources of one reference signal are not arranged across a plurality of slots in the first transmission means. On the other hand, the switching unit 236 arranges the reference signal resources such that the resources of one reference signal are arranged across a plurality of slots in the second transmission means. Then, the switching unit 236 makes the size of the orthogonal cover code larger than that of the first transmission means, so that many reference signals can be multiplexed.

Figure 29:
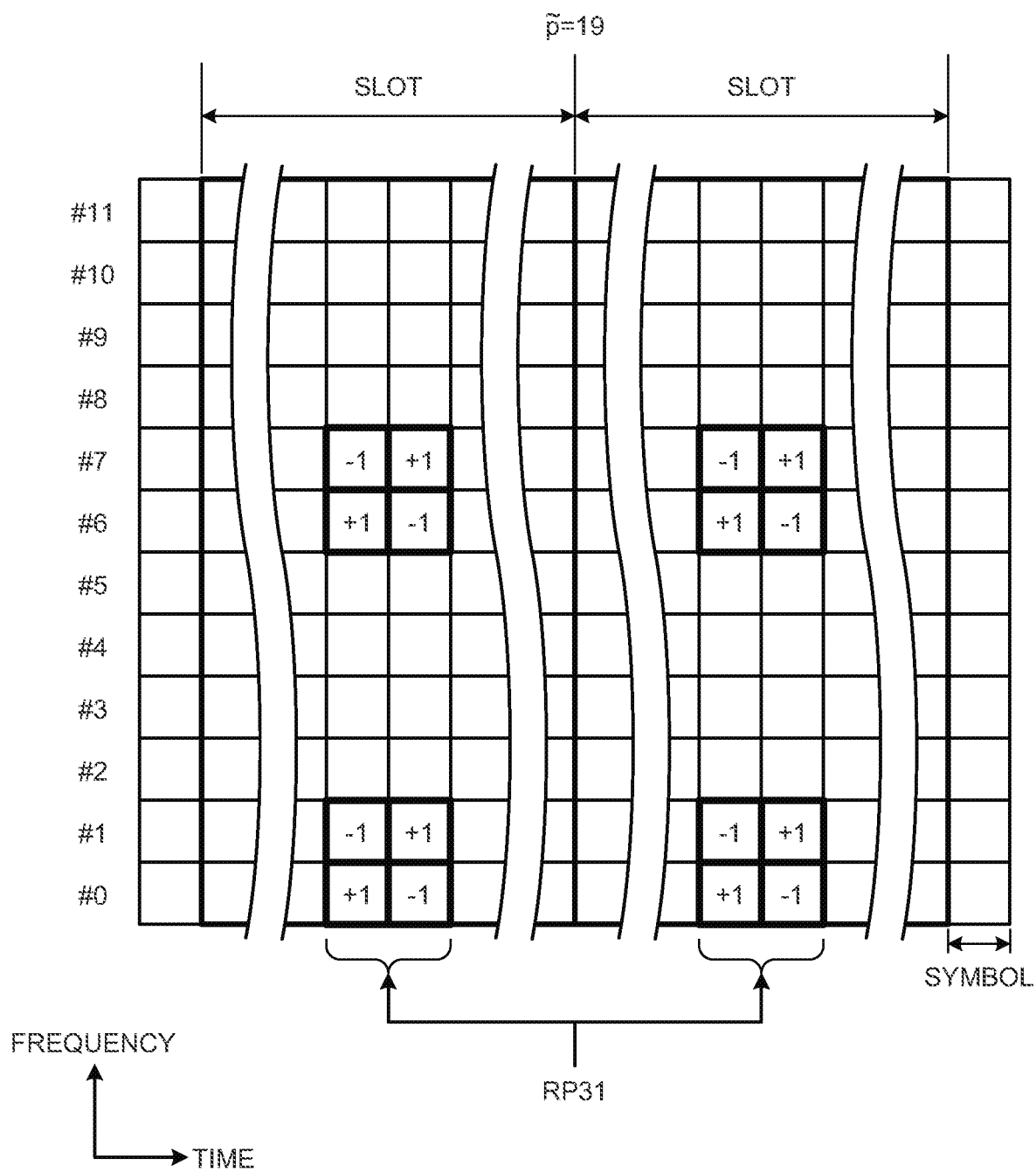
FIG. 29 is a diagram illustrating a state in which resources of one reference signal are arranged across a plurality of slots.

FIG. 29 is a diagram illustrating a state in which the resources of one reference signal are arranged across a plurality of slots. In the example of FIG. 29, the reference signal position RP31 configured by four symbols is arranged across a plurality of slots. FIG. 29 illustrates the arrangement of the reference signal resource of DM-RS port index #19 applied with an orthogonal cover code having a size of eight. In an orthogonal cover code having a size of four, only four DM-RS ports per CDM group can be multiplexed. However, in the example in FIG. 29, the orthogonal cover code having a size of eight can be applied, so eight DM-RS ports per CDM group can be multiplexed. As a result, 24 DM-RS ports can be multiplexed with three CDM groups of 0 to 2.

Accordingly, the number of multiplexable reference signals can be increased, and thus it is possible to multiplex many data transmissions.

<5-6. Switching Trigger>

As described above, the switching unit 236 of the terminal device 40 switches the transmission means of the reference signal on the basis of the data transmission type specifying information. It is information that enables specifying whether or not it is contention-based data transmission. This data transmission type specifying information may be obtained from another communication device such as the base station device 20. That is, the switching unit 236 may switch the transmission means of the reference signal by using the information obtained from another communication device as a switching trigger. Explicit notification and implicit notification can be assumed as the notification method of the switching trigger.

[Explicit Notification]

Explicit notification means that another communication device (for example, the base station device 20) notifies the communication device (for example, the terminal device 40) performing data transmission of a direct instruction to switch the transmission means of the reference signal. The following (G1) to (G3) can be assumed as the explicit notification.

(G1) Switching notification based on system information
(G2) Switching notification based on RRC signaling
(G3) Switching notification based on DCI For example, the base station device 20 uses system information, RRC signaling, or DCI to transmit instruction information for instructing to switch the transmission means of the reference signal to the second transmission means to the terminal device 40. The acquisition unit 451 of the terminal device 40 receives this information (system information, RRC signaling, or DCI) from the base station device 20. In a case where the information includes the instruction information for instructing to switch to the second transmission means, the switching unit 236 of the terminal device 40 switches the transmission means of the reference signal to the second transmission means.

[Implicit Notification]

Implicit notification means that in a case where a communication device (for example, the terminal device 40) which performs data transmission does not receive the notification instructing to switch the transmission means of the reference signal from another communication device (for example, the base station device 20), but predetermined conditions are met, the communication device is considered to receive the notification from another communication device. The following (H1) to (H8) can be assumed as the implicit notification.

(H1) Switching based on signal processing
(H2) Switching based on RNTI scrambling type of DCI
(H3) Switching based on format of DCI
(H4) Switching based on used resources
(H5) Switching based on the number of symbols included in one slot
(H6) Switching based on transmission procedure (1): Configured grant transmission
(H7) Switching based on transmission procedure (2): two-step RACH
(H8) Switching between initial transmission and retransmission Hereinafter, each of (H1) to (H8) will be described.

(H1) Switching Based on Signal Processing

First, "switching based on signal processing" of (H1) will be described.

The terminal device 40 of this embodiment can execute the non-orthogonal multiple access data transmission as contention-based data transmission. In this regard, in a case where the signal processing unit 41 executes non-orthogonal multiple access signal processing (NOMA signal processing), the switching unit 236 switches the transmission means of the reference signal to the second transmission means. On the other hand, in a case where the signal processing executed by the signal processing unit 41 is orthogonal multiple access signal processing (OMA signal processing), the switching unit 236 sets the transmission means of the reference signal as the first transmission means (for example, the conventional transmission means in NR).

More specifically, the acquisition unit 451 of the terminal device 40 receives the parameters of the transmission signal processing from the base station device 20. Then, the acquisition unit 451 extracts the data transmission type specifying information from the parameters of the transmission signal processing. The parameters of the transmission signal processing and the data transmission type specifying information may be the information described in <5-1. Parameters of transmission signal processing> described above.

Then, in a case where it is determined on the basis of the data transmission type specifying information that the data transmission to be executed subsequently is NOMA transmission (the non-orthogonal multiple access data transmission), the switching unit 236 of the terminal device 40 switches the transmission means of the reference signal related to this data transmission to the second transmission means. On the other hand, in a case where the data transmission to be executed subsequently is not NOMA transmission, the switching unit 236 uses the transmission means of the reference signal as the first transmission means.

(H2) Switching Based on RNTI Scrambling Type of DCI

Next, "RNTI scrambling type of DCI" of (H2) will be described.

The terminal device 40 can also determine whether the data transmission to be executed subsequently is contention-based data transmission or non-contention-based data transmission on the basis of the Radio Network Temporary ID (RNTI) scrambling type of DCI. For example, the terminal device 40 can determine whether the data transmission to be executed subsequently is NOMA transmission or OMA transmission on the basis of the RNTI scrambling type of DCI.

In this regard, the acquisition unit 451 of the terminal device 40 acquires the information regarding the RNTI scrambling type of DCI. Then, in a case where it is determined on the basis of the acquired information that the DCI is scrambled by the non-orthogonal RNTI (for example, NOMA-C-RNTI), the switching unit 236 of the terminal device 40 switches the transmission means of the reference signal related to the data transmission to be executed subsequently to the second transmission means. On the other hand, in a case where the DCI is not scrambled by the non-orthogonal RNTI, the switching unit 236 uses the transmission means of the reference signal as the first transmission means.

(H3) Switching Based on Format of DCI

Next, "switching based on format of DCI" of (H3) will be described.

There are a plurality of formats for DCI, and the formats are classified according to usage, the number of bits, and the like. The terminal device 40 may switch the transmission means of the reference signal according to the format of DCI.

For example, the acquisition unit 451 of the terminal device 40 acquires the information regarding the RNTI scrambling type of DCI. Then, in a case where it is determined on the basis of the acquired information that the format of DCI is a first format (for example, DCI format 0_0), the switching unit 236 of the terminal device 40 switches the transmission means of the reference signal related to the data transmission to be executed subsequently to the second transmission means. On the other hand, in a case where it is determined that the format of DCI is the first format (for example, Format_0_1), the switching unit 236 uses the transmission means of the reference signal as the first transmission means.

(H4) Switching Based on Used Resources

Next, "switching based on used resources" of (H4) will be described.

The terminal device 40 may switch the transmission means of the reference signal according to the resource used for data transmission.

For example, the acquisition unit 451 of the terminal device 40 acquires information regarding the resource used for data transmission. Then, in a case where it is determined on the basis of the acquired information that the resource used for data transmission is a predetermined resource (for example, a predetermined frequency resource or a predetermined time resource), the switching unit 236 of the terminal device 40 switches the transmission means of the reference signal related to the data transmission to be executed subsequently to the second transmission means. For example, in a case where a Band Width Part (BWP) is a predetermined BWP, the switching unit 236 uses the transmission means of the reference signal as the second transmission means. Alternatively, in a case where the resource pool used for data transmission is a predetermined resource pool, the switching unit 236 uses the transmission means of the reference signal as the second transmission means. On the other hand, in a case where the resource used for data transmission is not a predetermined resource, the switching unit 236 uses the transmission means of the reference signal as the first transmission means.

(H5) Switching Based on the Number of Symbols Included in One Slot

Next, "the number of symbols included in one slot" of (H5) will be described.

The terminal device 40 may switch the transmission means of the reference signal according to the number of symbols per slot. As described above, in NR, the number of symbols per slot can be changed.

For example, the acquisition unit 451 of the terminal device 40 acquires information regarding the number of symbols per slot of the resource block used for data transmission. Then, the switching unit 236 of the terminal device 40 switches the transmission means of the reference signal according to the number of symbols. For example, in a case where the number of symbols is larger than N symbols, the switching unit 236 increases the number of symbols for arranging reference signals. Further, in a case where the number of symbols is smaller than N symbols, the switching unit 236 mutes part or all of the reference signal resources. Muting also includes zero power transmission. Of course, the switching unit 236 may switch to any means described in <5-5. Details of switching transmission means of reference signal> above depending on the number of symbols.

(H6) Switching Based on Transmission Procedure (1)

Next, "switching based on transmission procedure (1)" of (H6) will be described.

The terminal device 40 may switch the transmission means of the reference signal according to the transmission procedure of data transmission. For example, the terminal device 40 may switch the transmission means of the reference signal depending on whether the data transmission is Grant-based transmission or Configured grant transmission.

For example, the acquisition unit 451 of the terminal device 40 acquires the information that enables specifying whether or not the data transmission is Configured grant transmission. Then, in a case where it is determined on the basis of the acquired information that the data transmission is Configured grant transmission, the switching unit 236 of the terminal device 40 switches the transmission means of the reference signal to the second transmission means. On the other hand, in a case where the data transmission is not Configured grant transmission (in the case of Grant-based transmission), the switching unit 236 uses the transmission means of the reference signal as the first transmission means.

(H7) Switching Based on Transmission Procedure (2)

Next, "switching based on transmission procedure (2)" of (H7) will be described.

The terminal device 40 may switch the transmission means of the reference signal according to the transmission procedure of data transmission. For example, the terminal device 40 may switch the transmission means of the reference signal depending on whether or not the data transmission is the data transmission related to two-step random access procedure (2-Step RACH).

For example, the acquisition unit 451 of the terminal device 40 acquires the information that enables specify whether or not the data transmission is the data transmission related to two-step random access procedure. Then, in a case where it is determined on the basis of the acquired information that the data transmission is the data transmission related to two-step random access procedure, the switching unit 236 of the terminal device 40 switches the transmission means of the reference signal to the second transmission means. On the other hand, in a case where the data transmission is not the data transmission related to two-step random access procedure (for example, a case where the data transmission related to four-step random access procedure (4-step RACH)), the switching unit 236 uses the transmission means of the reference signal as the first transmission means.

(H8) Switching Between Initial Transmission and Retransmission

Next, "switching between initial transmission and retransmission" of (H8) will be described.

The terminal device 40 of this embodiment has an automatic retransmission function of data such as HARQ. In the terminal device 40 of this embodiment, for example, in a case where contention-based transmission (for example, NOMA transmission) is used for the initial transmission of data, non-contention base (for example, OMA transmission) is used for retransmission of the data. Therefore, the terminal device 40 of this embodiment can determine whether the data transmission to be executed subsequently is contention-based data transmission or non-contention-based data transmission on the basis of the information regarding the initial transmission or retransmission. For example, the terminal device 40 can determine whether the data transmission to be executed subsequently is NOMA transmission or OMA transmission on the basis of the information regarding the initial transmission or retransmission.

For example, the acquisition unit 451 of the terminal device 40 acquires the information that enables specifying whether or not the data transmission to be executed subsequently by the terminal device 40 is the initial transmission or the retransmission. The "information that enables specifying whether or not the data transmission to be executed from now on is the initial transmission or the retransmission" may be an NDI or may be a Redundancy version. Then, in a case where it is determined on the basis of the acquired information that the data transmission to be executed subsequently by the terminal device 40 is the retransmission, the switching unit 236 of the terminal device 40 switches the transmission means of the reference signal to the second transmission means. On the other hand, in a case where the data transmission is the initial transmission, the switching unit 236 uses the transmission means of the reference signal as the first transmission means.

[Other]

Incidentally, the explicit notification and the implicit notification may be combined. For example, the base station device 20 may notify the candidate of the implicit notification by the explicit notification.

Hereinbefore, the details of switching the transmission means of the reference signal have been described. However, hereinafter, a specific sequence example of the transmission/reception processing related to this switching will be described. Three sequence examples described in this embodiment are uplink, downlink, and sidelink.

<5-7. Sequence Example (Uplink)>

First, an example of an uplink sequence will be described.

Figure 30:
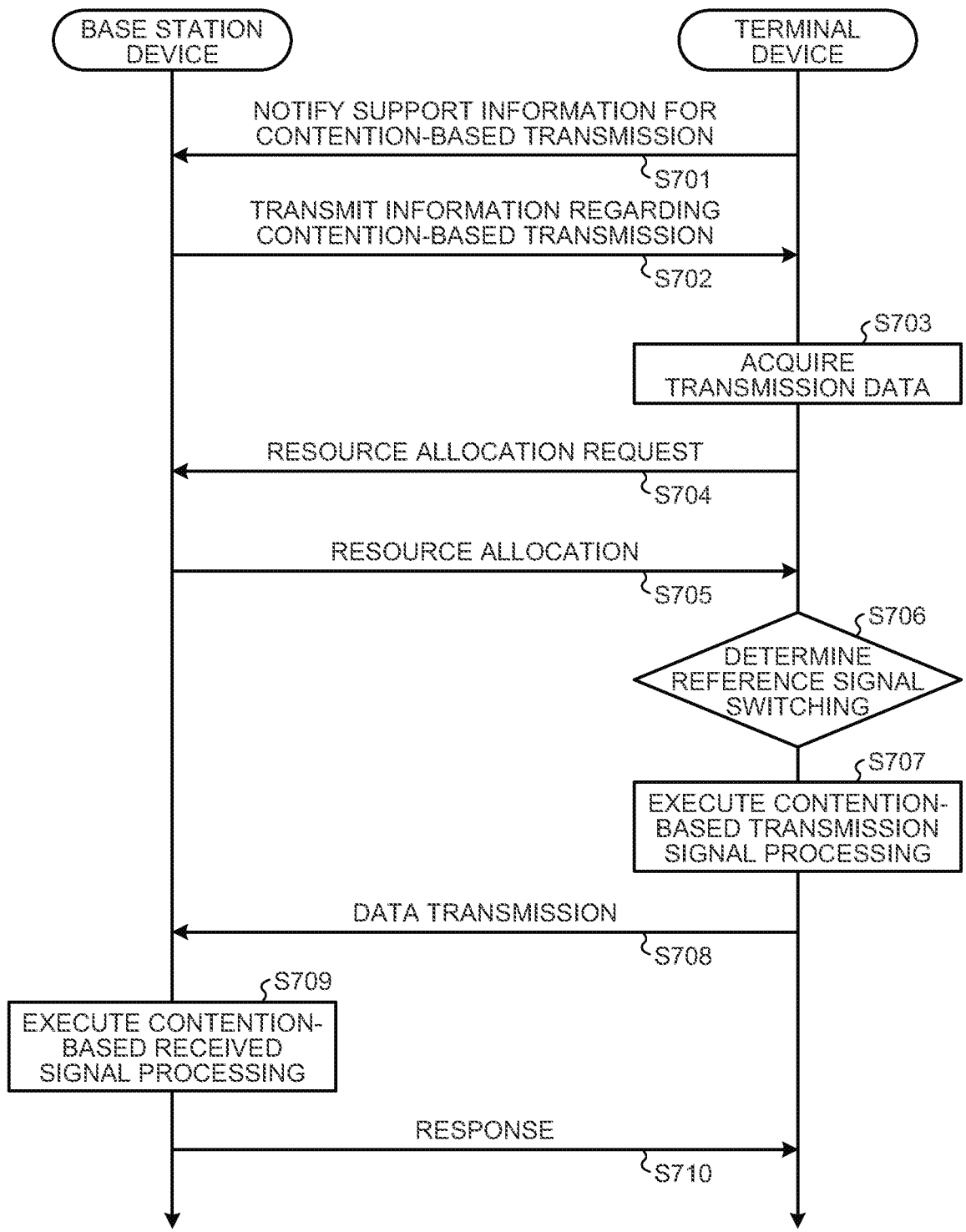
FIG. 30 is a sequence diagram illustrating an example of transmission/reception processing (uplink) according to the embodiment of the present disclosure.

FIG. 30 is a sequence diagram illustrating an example of transmission/reception processing (uplink) according to the embodiment of the present disclosure. FIG. 30 illustrates an example in which the terminal device 40 performs data transmission to the base station device 20. In the example of FIG. 30, the terminal device 40 switches the transmission means of the reference signal. Hereinafter, an example of the uplink sequence will be described with reference to FIG. 30.

First, the transmission unit 455 of the terminal device 40 transmits support information of contention-based transmission to the base station device 20 (Step S701). The support information of contention-based transmission is, for example, Capability information indicating whether or not contention-based transmission is supported. For example, the support information of contention-based transmission is the support information of NOMA. Herein, the support information of NOMA is information indicating whether or not the terminal device 40 supports NOMA (for example, whether or not the NOMA transmission processing can be executed). The support information of NOMA may include information of non-orthogonal resources available to the terminal device 40.

Then, in a case where the terminal device 40 supports a predetermined contention-based transmission (for example, NOMA transmission), the transmission unit 235 of the base station device 20 transmits the information regarding the contention-based transmission to the terminal device 40 (Step S702). This transmission may be performed by using RRC signaling or DCI.

The information regarding contention-based transmission is, for example, information regarding NOMA transmission. The "information regarding contention-based transmission" may be the "parameters of transmission signal processing" described in <5-1. Parameters of transmission signal processing>. At this time, the "information regarding contention-based transmission" may include the "data transmission type specifying information" described in <5-1. Parameters of transmission signal processing>. The "data transmission type specifying information" may be considered as the "information regarding contention-based transmission" itself.

The reception unit 454 of the terminal device 40 receives information regarding contention-based transmission from the base station device 20 and stores the information in the storage unit 22. Then, the acquisition unit 451 of the terminal device 40 acquires the transmission data when transmission data (for example, a transmission packet of user data) is generated (Step S703). For example, the acquisition unit 451 acquires data generated as data to be transmitted by various programs of the terminal device 40 to another communication device (for example, the base station device 20) as transmission data. The transmission data is not limited to user data.

Then, the transmission unit 455 of the terminal device 40 transmits a resource allocation request to the base station device 20 (Step S704). For example, in a case where the data transmission (that is, the data transmission executed in Step S708 described later) to be executed subsequently by the terminal device 40 is Grant-based transmission, the transmission unit 455 transmits a resource allocation request to the base station device 20. Incidentally, this resource allocation request does not necessarily have to be executed. For example, in the transmission unit 455, in a case where the data transmission to be executed subsequently by the terminal device 40 is Configured grant transmission, the resource allocation request does not necessarily have to be executed.

In a case where the terminal device 40 performs a resource allocation request (for example, a case where the data transmission is Grant-based transmission), the processing unit 232 of the base station device 20 determines the transmission resource to be allocated to the terminal device 40. For example, in a case where the data transmission executed by the terminal device 40 is NOMA transmission, the processing unit 232 determines the MA resource to be allocated to the terminal device 40. Then, the transmission unit 235 of the base station device 20 transmits the information (for example, MA resource information) of the transmission resource allocated to the terminal device 40 to the terminal device 40 (Step S705).

The reception unit 454 of the terminal device 40 receives the information of the transmission resource from the base station device 20 and stores the information in the storage unit 42. Then, the switching unit 457 of the terminal device 40 determines whether to switch the reference signal on the basis of the information regarding the contention-based transmission acquired in Step S702 (Step S706). For example, in a case where the data transmission to be executed subsequently by the terminal device 40 is contention-based transmission such as NOMA transmission, the switching unit 457 determines to switch the transmission means of the reference signal to the second transmission means. On the other hand, in a case where the data transmission to be executed subsequently by the terminal device 40 is non-contention-based transmission such as OMA transmission, the switching unit 457 determines that the transmission means of the reference signal remains as the first transmission means.

Then, the signal processing unit 41 of the terminal device 40 performs signal processing on the basis of the information of the transmission resource acquired in Step S705. In a case where the data transmission to be executed subsequently by the terminal device 40 is contention-based transmission, the signal processing unit 41 performs contention-based transmission signal processing (Step S707). At this time, the signal processing unit 41 may execute NOMA transmission processing on the transmission data on the basis of the MA resource information acquired in Step S705. The signal processing unit 41 may have the function described in <5-3. Signal processing unit for contention-based transmission>.

Incidentally, in a case where the data transmission to be executed subsequently by the terminal device 40 is contention-based transmission, the signal processing unit 41 may execute signal processing so that the transmission means of the reference signal becomes the second transmission means. Incidentally, in a case where the data transmission to be executed subsequently by the terminal device 40 is non-contention-based transmission, the signal processing unit 41 may execute signal processing so that the transmission means of the reference signal becomes the above-described first transmission means. At this time, the reference signal may be the reference signal described in <5-4. Reference signal for switching transmission means>. Further, the first transmission means and the second transmission means may be the first transmission means and the second transmission means described in <5-5. Details of switching transmission means of reference signal> described above.

When the signal processing is completed, the transmission unit 455 of the terminal device 40 executes data transmission to the base station device 20 (Step S708).

The reception unit 233 of the base station device 20 receives data from the terminal device 40. Then, the processing unit 232 of the base station device 20 controls the signal processing unit 21 to execute signal processing of the received data. In a case where the data transmission to be executed by the terminal device 40 is contention-based transmission, the processing unit 232 executes contention-based received signal processing (Step S709). In a case where the data transmission is contention-based transmission, the processing unit 232 may extract the reference signal by a method corresponding to the second transmission means. Incidentally, in a case where the data transmission executed by the terminal device 40 is non-contention-based transmission, the processing unit 232 may extract the reference signal by a method corresponding to the first transmission means.

When the signal processing is completed, the transmission unit 235 of the base station device 20 transmits response data (for example, an acknowledgment) to the terminal device 40 (Step S710). When the transmission of the response data is completed, the base station device 20 and the terminal device 40 end the transmission/reception processing (uplink).

<5-8. Sequence Example (Downlink)>

The above-described embodiment can be applied not only to uplinks but also to downlinks. An example of a downlink sequence will be described below.

Figure 31:
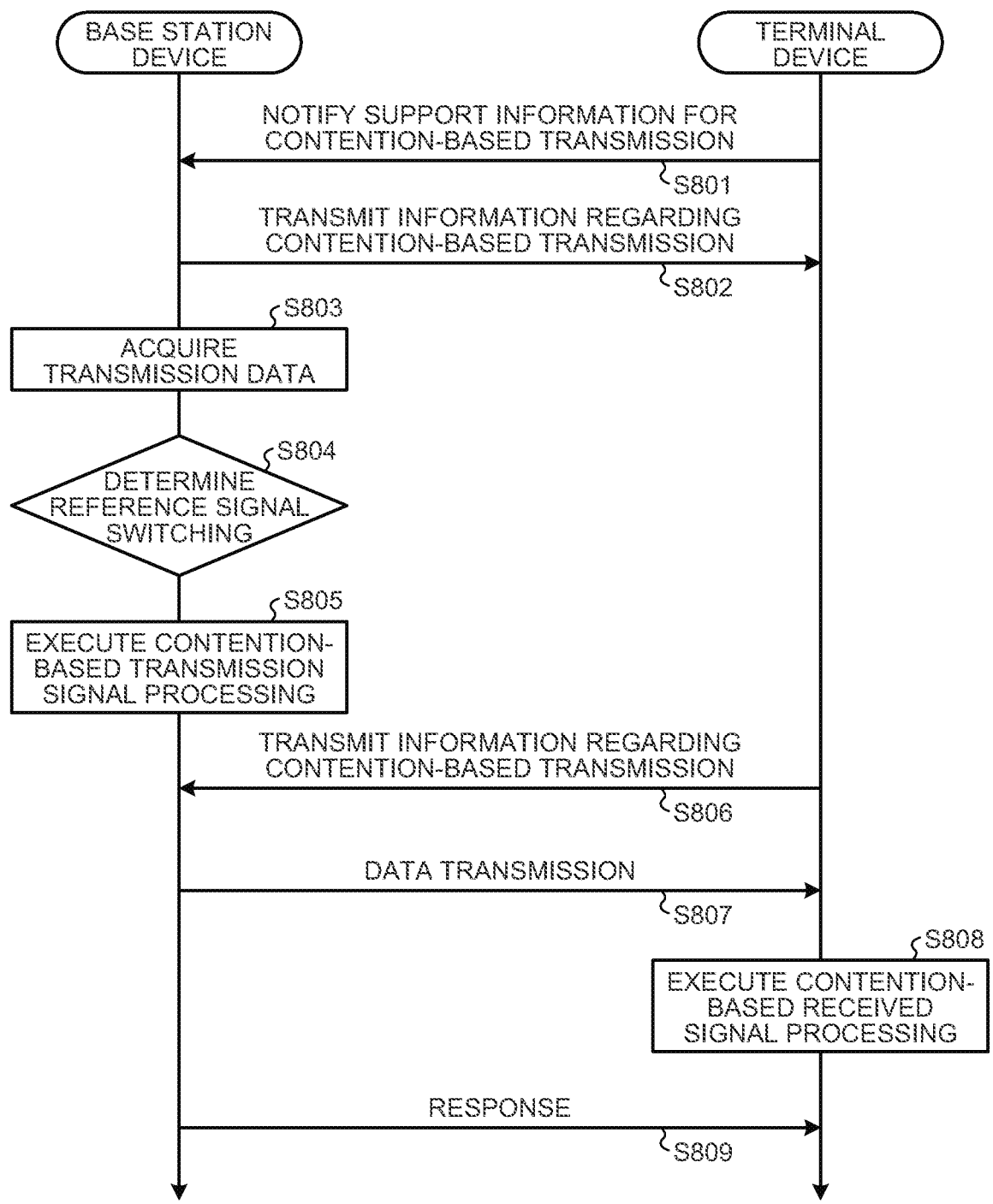
FIG. 31 is a sequence diagram illustrating an example of transmission/reception processing (downlink) according to the embodiment of the present disclosure.

FIG. 31 is a sequence diagram illustrating an example of transmission/reception processing (downlink) according to the embodiment of the present disclosure. FIG. 31 is an example in which the base station device 20 performs data transmission to the terminal device 40. In the example of FIG. 31, the base station device 20 switches the transmission means of the reference signal. Hereinafter, an example of the downlink sequence will be described with reference to FIG. 31.

First, the transmission unit 455 of the terminal device 40 transmits support information of contention-based transmission to the base station device 20 (Step S801). For example, the support information of contention-based transmission is the support information of NOMA.

Then, in a case where the terminal device 40 supports a predetermined contention-based transmission (for example, NOMA transmission), the transmission unit 235 of the base station device 20 transmits the information regarding the contention-based transmission to the terminal device 40 (Step S802). This transmission may be performed by using RRC signaling or DCI. For example, the information regarding contention-based transmission may be the "parameters of transmission signal processing" or the "data transmission type specifying information" described in <5-1. Parameters of transmission signal processing>. The reception unit 454 of the terminal device 40 receives information regarding contention-based transmission from the base station device 20 and stores the information in the storage unit 22.

When the transmission data is generated, the acquisition unit 231 of the base station device 20 acquires the transmission data (Step S803). For example, the acquisition unit 231 acquires data generated as data to be transmitted by various programs of the base station device 20 to another communication device (for example, the terminal device 40) as transmission data. The transmission data is not limited to user data.

Subsequently, the switching unit 236 of the base station device 20 determines whether to switch the reference signal on the basis of the information regarding the contention-based transmission acquired in Step S803 (Step S804). For example, in a case where the data transmission (that is, the data transmission executed in Step S807 described later) to be executed subsequently by the base station device 20 is contention-based transmission such as NOMA transmission, the switching unit 236 determines that the transmission means of the reference signal is switched to the second transmission means. On the other hand, in a case where the data transmission to be executed subsequently by the base station device 20 is non-contention-based transmission such as OMA transmission, the switching unit 236 determines that the transmission means of the reference signal remains as the first transmission means.

Then, the signal processing unit 21 of the base station device 20 performs signal processing. In a case where the data transmission to be executed subsequently by the base station device 20 is contention-based transmission, the signal processing unit 21 performs contention-based transmission signal processing (Step S805). At this time, the signal processing unit 21 may have the function described in <5-3. Signal processing unit for contention-based transmission>.

Incidentally, in a case where the data transmission to be executed subsequently by the base station device 20 is contention-based transmission, the signal processing unit 21 may execute signal processing so that the transmission means of the reference signal becomes the second transmission means. Incidentally, in a case where the data transmission to be executed subsequently by the base station device 20 is non-contention-based transmission, the signal processing unit 21 may execute signal processing so that the transmission means of the reference signal becomes the above-described first transmission means.

At this time, the reference signal may be the reference signal described in <5-4. Reference signal for switching transmission means>. Further, the first transmission means and the second transmission means may be the first transmission means and the second transmission means described in <5-5. Details of switching transmission means of reference signal> described above. At this time, the descriptions of "terminal device 40", "switching unit 457", and "base station device 20" appearing in <5-4. Reference signal for switching transmission means> and <5-5. Details of switching transmission means of reference signal> described above may be appropriately replaced with "base station device 20", "switching unit 236", and "terminal device 40".

When the signal processing is completed, the transmission unit 235 of the base station device 20 transmits DCI to the terminal device 40. At this time, the transmission unit 235 may transmit the information regarding contention-based transmission to the terminal device 40 (Step S806). The transmission of the information regarding contention-based transmission in Step S806 is optional. Then, the transmission unit 235 of the base station device 20 executes data transmission to the terminal device 40 (Step S807).

The reception unit 454 of the terminal device 40 receives data from the base station device 20. Then, the processing unit 452 of the terminal device 40 controls the signal processing unit 41 to execute signal processing of the received data. In a case where the data transmission to be executed by the base station device 20 is contention-based transmission, the processing unit 452 executes contention-based received signal processing (Step S808). In a case where the data transmission is contention-based transmission, the processing unit 452 may extract the reference signal by a method corresponding to the second transmission means. Incidentally, in a case where the data transmission executed by the base station device 20 is non-contention-based transmission, the processing unit 452 may extract the reference signal by a method corresponding to the first transmission means.

When the signal processing is completed, the transmission unit 455 of the terminal device 40 transmits response data (for example, an acknowledgment) to the base station device 20 (Step S809). When the transmission of the response data is completed, the base station device 20 and the terminal device 40 end the transmission/reception processing (downlink).

<5-9. Sequence Example (Sidelink)>

The above-described embodiment can be applied not only to uplinks and downlinks, but also to sidelinks such as Device to Device (D2D). An example of a sidelink sequence will be described below.

Figure 32:
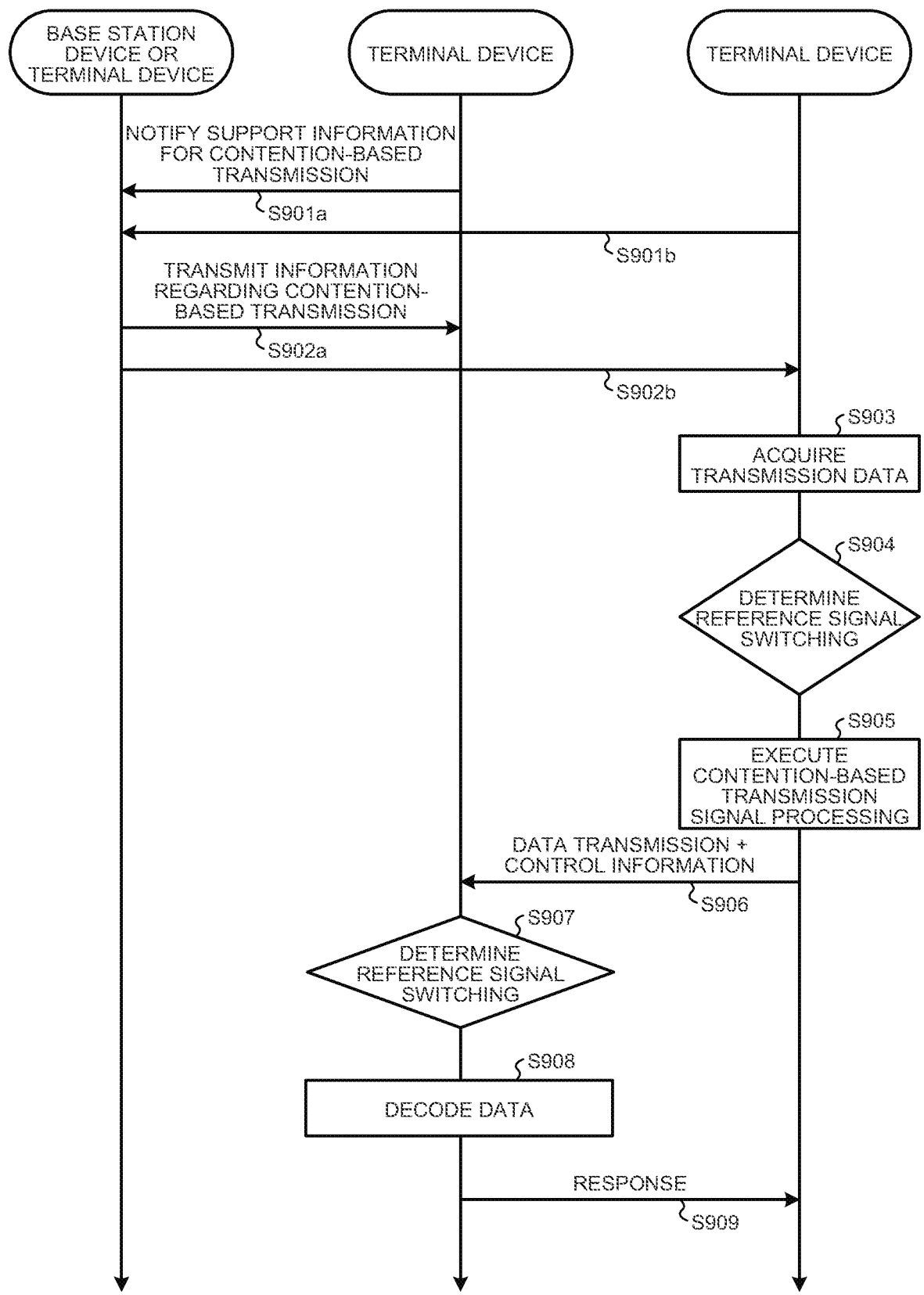
FIG. 32 is a sequence diagram illustrating an example of transmission/reception processing (sidelink) according to the embodiment of the present disclosure.

FIG. 32 is a sequence diagram illustrating an example of transmission/reception processing (sidelink) according to the embodiment of the present disclosure. In the example of FIG. 32, it is assumed that the terminal device $40_1$, the terminal device $40_2$, and the terminal device $40_3$ exist as the terminal device 40. The three "terminal devices" illustrated in FIG. 32 are the terminal device $40_1$, the terminal device $40_2$, and the terminal device $40_3$ from the left.

In the example of FIG. 32, it is assumed that the terminal device $40_1$ is a terminal device which is the leader of the group to which the terminal device $40_2$ and the terminal device $40_3$ belong. That is, in the example of FIG. 32, it is assumed that the terminal device $40_1$ is a master communication device in the sidelink communication, and the terminal device $40_2$ and the terminal device $40_3$ are slave communication devices in the side link communication. Incidentally, the communication device serving as the master communication device does not necessarily have to be the terminal device 40. The base station device 20 may be considered as the master communication device. Further, the master communication device does not necessarily have to exist. In this case, the sidelink communication may be completed between the terminal device $40_2$ and the terminal device $40_3$ without the presence of the master communication device.

In the example of FIG. 32, the terminal device $40_3$ transmits data to the terminal device $40_2$. That is, in the example of FIG. 32, the terminal device $40_3$ switches the transmission means of the reference signal. Hereinafter, a sidelink sequence example will be described with reference to FIG. 32.

First, the transmission units 455 of the terminal device $40_2$ and the terminal device $40_3$ transmit support information of contention-based transmission to the base station device 20 (Steps S901a and S901b). For example, the support information of contention-based transmission is the support information of NOMA. As described above, the terminal device $40_1$ is the master communication device of the terminal device $40_3$ and the terminal device $40_2$. In a case where the terminal device $40_3$ and the terminal device $40_2$ cannot communicate with the base station device 20, the terminal device $40_1$ acts as a substitute for the base station device 20. That is, in a case where the terminal device $40_3$ and the terminal device $40_2$ cannot communicate with the base station device 20, the transmission units 455 of the terminal device $40_2$ and the terminal device $40_3$ transmit support information of contention-based transmission to the terminal device $40_1$.

Then, in a case where both the terminal device $40_2$ and the terminal device $40_3$ support a predetermined contention-based transmission (for example, NOMA transmission), the transmission unit 235 of the base station device 20 or the transmission unit 455 of the terminal device $40_1$ transmits the information regarding the contention-based transmission to each of the terminal device $40_2$ and the terminal device $40_3$ (Steps S902a and S902b). This transmission may be performed by using RRC signaling or DCI. For example, the information regarding contention-based transmission may be the "parameters of transmission signal processing" or the "data transmission type specifying information" described in <5-1. Parameters of transmission signal processing>.

The reception units 454 of the terminal device $40_2$ and the terminal device $40_3$ receive the information regarding the contention-based transmission from the base station device 20 or the terminal device $40_1$ and stores the information in the storage unit 22. Then, the acquisition unit 451 of the terminal device $40_3$ acquires the transmission data when the transmission data (for example, a transmission packet of user data) is generated (Step S903). For example, the acquisition unit 451 acquires data generated as data to be transmitted by various programs of the terminal device $40_3$ to another communication device (for example, the terminal device $40_2$) as transmission data. The transmission data is not limited to user data.

The switching unit 457 of the terminal device $40_3$ determines whether to switch the reference signal on the basis of the information regarding the contention-based transmission acquired in Step S902b (Step S904). For example, in a case where the data transmission (that is, the data transmission executed in Step S906 described later) to be executed subsequently by the terminal device $40_3$ is contention-based transmission such as NOMA transmission, the switching unit 457 determines that the transmission means of the reference signal is switched to the second transmission means. On the other hand, in a case where the data transmission to be executed subsequently by the terminal device $40_3$ is non-contention-based transmission such as OMA transmission, the switching unit 457 determines that the transmission means of the reference signal remains as the first transmission means.

Then, the signal processing unit 41 of the terminal device $40_3$ performs signal processing. In a case where the data transmission to be executed subsequently by the terminal device $40_3$ is contention-based transmission, the signal processing unit 41 performs contention-based transmission signal processing (Step S905). At this time, the signal processing unit 41 may have the function described in <5-3. Signal processing unit for contention-based transmission>.

Incidentally, in a case where the data transmission to be executed subsequently by the terminal device $40_3$ is contention-based transmission, the signal processing unit 41 of the terminal device $40_3$ may execute signal processing so that the transmission means of the reference signal becomes the second transmission means. Incidentally, in a case where the data transmission to be executed subsequently by the terminal device $40_3$ is non-contention-based transmission, the signal processing unit 41 of the terminal device $40_3$ may execute signal processing so that the transmission means of the reference signal becomes the above-described first transmission means.

At this time, the reference signal may be the reference signal described in <5-4. Reference signal for switching transmission means>. Further, the first transmission means and the second transmission means may be the first transmission means and the second transmission means described in <5-5. Details of switching transmission means of reference signal> described above. At this time, the descriptions of "terminal device 40" and "base station device 20" appearing in <5-4. Reference signal for switching transmission means> and <5-5. Details of switching transmission means of reference signal> described above may be appropriately replaced with "terminal device $40_3$" and "terminal device $40_2$".

When the signal processing is completed, the transmission unit 455 of the terminal device $40_3$ executes data transmission to the terminal device $40_2$ (Step S906). At this time, the transmission unit 455 of the terminal device $40_3$ may also transmit the control information to the terminal device $40_2$ together. At this time, the transmission unit 455 of the terminal device $40_3$ may transmit the information regarding contention-based transmission to the terminal device $40_2$. The transmission of the information regarding contention-based transmission in Step S906 is optional.

The reception unit 454 of the terminal device $40_2$ receives data from the terminal device $40_3$. Then, the terminal device $40_2$ executes signal processing of the received data. In a case where the data transmission to be executed by the terminal device $40_3$ is contention-based transmission, the signal processing unit 41 executes contention-based received signal processing.

For example, the switching unit 457 of the terminal device $40_2$ determines whether to switch the reference signal on the basis of the information regarding the contention-based transmission acquired in Step S902a (Step S907). Then, the processing unit 452 of the terminal device $40_2$ controls the signal processing unit 41 to extract the reference signal on the basis of the determination result. For example, in a case where it is determined that the data transmission executed by the terminal device $40_3$ is contention-based transmission, the processing unit 452 extracts the reference signal by a method corresponding to the second transmission means. On the other hand, in a case where it is determined that the data transmission executed by the terminal device $40_3$ is non-contention-based transmission, the processing unit 452 extracts the reference signal by a method corresponding to the first transmission means.

Then, the processing unit 452 of the terminal device $40_2$ performs channel estimation and the like by using the extracted reference signal and decodes the received data (Step S908).

When the decoding of the received data is completed, the transmission unit 455 of the terminal device $40_2$ transmits response data (for example, an acknowledgment) to the terminal device $40_3$ (Step S909). When the transmission of the response data is completed, the base station device 20 and the terminal devices $40_1$ to $40_3$ end the transmission/reception processing (sidelink).

6. MODIFICATION

The above-described embodiment describes examples, and various modifications and applications are possible.

<6-1. Modification Related to Transmission/Reception Processing>

For example, the above-described embodiment is also applicable to the communication between a base station and a relay terminal, and the communication between a relay terminal and a user terminal.

The transmission/reception processing (uplink, downlink) described in the above-described embodiment is processing in the communication between the base station device 20 and the terminal device 40. However, the above-described transmission/reception processing (uplink, downlink) can also be applied to the communication between the relay device 30 and the terminal device 40. In this case, the base station device 20 appearing in the above-described transmission/reception processing and transmission processing is appropriately replaced with the relay device 30.

The above-described transmission/reception processing (uplink, downlink) can also be applied to the communication between the base station device 20 and the relay device 30. In this case, the terminal device 40 appearing in the above-described transmission/reception processing (uplink, downlink) is appropriately replaced with the relay device 30.

Further, the above-described transmission/reception processing (sidelink) is processing in the communication between the terminal device 40 and another terminal device 40. However, the above-described transmission/reception processing (sidelink) can also be applied to the communication between the base station device 20 and another base station device 20. In this case, the terminal device 40 appearing in the above-described transmission/reception processing (sidelink) is appropriately replaced with the base station device 20.

The above-described transmission/reception processing (sidelink) can also be applied to the communication between the relay device 30 and another relay device 30. In this case, the terminal device 40 appearing in the above-described transmission/reception processing (sidelink) is appropriately replaced with the relay device 30.

In <5-2. Example of contention-based transmission> described above, examples of contention-based transmission include five transmissions of (B1) NOMA transmission, (B2) Configured grant transmission, (B3) two-step/four-step random access transmission, (B4) data transmission from unconnected state, and (B5) sidelink transmission. However, the contention-based transmission is not limited to these. For example, the contention-based transmission may be data transmission using Layered Division Multiplexing (LDM). The data transmission using LDM can also be considered as contention-based data transmission since the transmission contends with other data transmission superimposed on the power axis on the orthogonal axis.

Incidentally, the application of this embodiment is not limited to communication such as cellular communication. For example, this embodiment can also be applied to broadcasting such as digital television broadcasting. At this time, the communication system 1 of this embodiment may be a data transmission system compliant with broadcasting standards such as Advanced Television Systems Committee (ATSC) 3.0, Digital Video Broadcasting (DVB), or Integrated Services Digital Broadcasting (ISDB). In this case, the communication system of this embodiment can be referred to as a "broadcasting system" or a "transmission system". Further, the base station device of this embodiment may be a broadcasting station (a broadcasting station as a facility) such as a broadcasting relay station. The base station device can be referred to as a "transmission device" or the like. Incidentally, broadcasting may be considered as a type of communication.

<6-2. Another Modification>

The control device for controlling the management device 10, the base station device 20, the relay device 30, or the terminal device 40 of this embodiment may be realized by a dedicated computer system or a general-purpose computer system.

For example, a communication program for executing the above-described operations (for example, transmission/reception processing) is stored and distributed in a computer-readable recording medium such as an optical disk, a semiconductor memory, a magnetic tape, and a flexible disk. Then, for example, the control device is configured by installing the program in a computer and executing the above-described processing. At this time, the control device may be an external device (for example, a personal computer) of the base station device 20, the relay device 30, or the terminal device 40. Further, the control device may be an internal device (for example, the control unit 23, the control unit 34, or the control unit 45) of the base station device 20, the relay device 30, or the terminal device 40.

The communication program may be stored in a disk device included in a server device on a network such as the Internet so as to be downloaded to a computer. Further, the above-described functions may be realized by cooperation between an Operating System (OS) and application software. In this case, the part other than the OS may be stored and distributed in a medium, and the part other than the OS may be stored in the server device, so as to be downloaded to a computer.

Among the processing described in the above embodiment, all or part of the processing described as being automatically performed may be manually performed, or all or part of the processing described as being manually performed may be automatically performed by a known method. In addition, the processing procedures, specific names, information including various data and parameters described in the above-described specification and drawings may be arbitrarily changed unless otherwise specified. For example, the various information illustrated in each drawing is not limited to the illustrated information.

Each constituent element of each device illustrated in the drawings is functionally conceptual, and does not necessarily have to be physically configured as illustrated. That is, the specific form of distribution/integration of each device is not limited to the illustrated one, and all or part of the device may be configured to be functionally or physically distributed/integrated in arbitrary units according to various loads, usage conditions, and the like.

Further, the above-described embodiments may be appropriately combined in an area in which the processing contents do not contradict each other. Further, the order of each step described in the flowchart and the sequence diagram of the above-described embodiment may be changed as appropriate.

7. CONCLUSION

As described above, according to one embodiment of the present disclosure, the communication device (for example, the terminal device 40 and the base station device 20) of this embodiment acquires information regarding signal processing of predetermined data transmission, and a transmission means of the reference signal related to the predetermined data transmission is switched on the basis of the acquired information. For example, the communication device switches the transmission means of the reference signal related to the predetermined data transmission depending on whether the predetermined data transmission is contention-based transmission or non-contention-based transmission. That is, the communication device of this embodiment dynamically switches the transmission means of the reference signal in accordance with the data transmission.

Accordingly, it is possible to increase the number of terminals which can be multiplexed by contention-based transmission such as NOMA transmission. Further, it becomes possible to apply a more suitable reference signal for contention-based transmission such as NOMA transmission and non-contention-based transmission such as OMA transmission. As a result, even in a communication environment (for example, an environment where communication using NR is possible) where many data transmissions may be multiplexed, the communication device can realize high communication performance (for example, low delay, high quality, and low occurrence rate of communication errors).

Although the embodiments of the present disclosure have been described above, the technical scope of the present disclosure is not limited to the above-described embodiments as they are, and various modifications may be made without departing from the gist of the present disclosure. Further, the component may be combined suitably over different embodiment and the modification.

The effects in each embodiment described in this specification are merely examples and are not limited, and other effects may be present.

Incidentally, this technology may also be configured as below.

(1)
A communication device comprising:
an acquisition unit that acquires information regarding signal processing of predetermined data transmission; and
a switching unit that switches a transmission means of a reference signal related to the predetermined data transmission on the basis of the information regarding the signal processing of the predetermined data transmission.

(2)
The communication device according to (1), wherein
the communication device is capable of executing contention-based data transmission,
the information regarding the signal processing of the predetermined data transmission includes predetermined information that enables specifying whether or not the predetermined data transmission is the contention-based data transmission, and
the switching unit switches the transmission means of the reference signal related to the predetermined data transmission on the basis of the predetermined information.

(3)
The communication device according to (2), wherein
in a case where it is determined on the basis of the predetermined information that the predetermined data transmission is the contention-based data transmission, the switching unit switches the transmission means of the reference signal related to the predetermined data transmission to a second transmission means which is capable of multiplexing more reference signals compared to a first transmission means used for non-contention-based data transmission.

(4)
The communication device according to (3), wherein
the second transmission means is a transmission means which mutes part or all of transmission resources of the reference signal allocated in a case where the first transmission means is used.

(5)
The communication device according to (3), wherein
the second transmission means is a transmission means in which an amount of transmission resources of the reference signal is larger than an amount of transmission resources of the reference signal allocated in a case where the first transmission means is used.

(6)
The communication device according to (3), wherein the second transmission means is a transmission means in which a mapping pattern of transmission resources of the reference signal is different from a mapping pattern in a case where the first transmission means is used.

(7)
The communication device according to (3), wherein the reference signal is a sequence signal generated according to a predetermined rule,
the first transmission means is a transmission means which arranges only one sequence signal at one reference signal position, and
the second transmission means is a transmission means which arranges a plurality of identical sequences to which an orthogonal code is applied at one reference signal position.

(8)
The communication device according to (3), wherein the second transmission means is a transmission means in which a size of an orthogonal cover code applied to the reference signal is larger than a size of an orthogonal cover code in a case where the first transmission means is used.

(9)
The communication device according to (8), wherein the first transmission means is a transmission means which arranges different sequences of the reference signals at all respective reference signal positions in one resource block, and
the second transmission means is a transmission means which arranges identical sequences of the reference signals at at least two reference signal positions in one resource block.

(10)
The communication device according to (8), wherein the first transmission means is a transmission means in which transmission resources of one of the reference signals are not arranged across a plurality of slots, and
the second transmission means is a transmission means in which transmission resources of one of the reference signal are arranged across a plurality of slots.

(11)
The communication device according to any one of (3) to (10), wherein
the communication device is capable of executing non-orthogonal multiple access data transmission as the contention-based data transmission,
the information regarding the signal processing includes, as the predetermined information, information that enables specifying whether or not the predetermined data transmission is non-orthogonal multiple access data transmission, and
in a case where it is determined on the basis of the predetermined information that the predetermined data transmission is non-orthogonal multiple access data transmission, the switching unit switches the transmission means of the reference signal related to the predetermined data transmission to the second transmission means.

(12)
The communication device according to (11), wherein the predetermined information is information regarding Radio Network Temporary ID (RNTI) scrambling of Downlink Control Information (DCI), and
in a case where it is determined on the basis of the predetermined information that the DCI is scrambled by non-orthogonal RNTI, the switching unit switches the transmission means of the reference signal related to the predetermined data transmission to the second transmission means.

(13)
The communication device according to (11), wherein the predetermined information is information regarding a format of DCI, and
in a case where it is determined on the basis of the predetermined information that the format of DCI is a predetermined format, the switching unit switches the transmission means of the reference signal related to the predetermined data transmission to the second transmission means.

(14)
The communication device according to any one of (3) to (10), wherein
the communication device is capable of executing Configured grant transmission as the contention-based data transmission,
the information regarding the signal processing includes, as the predetermined information, information that enables specifying whether or not data transmission executed by the communication device is Configured grant transmission, and
in a case where it is determined on the basis of the predetermined information that the data transmission of the communication device is Configured grant transmission, the switching unit switches the transmission means of the reference signal to the second transmission means.

(15)
The communication device according to any one of (3) to (13), wherein
the contention-based data transmission is non-orthogonal multiple access data transmission, and
the non-contention-based data transmission is orthogonal multiple access data transmission.

(16)
The communication device according to (15), wherein the communication device has an automatic retransmission function of data, and
in the automatic retransmission function, in a case where non-orthogonal multiple access is used for initial transmission of data, orthogonal multiple access is used for retransmission of the data.

(17)
The communication device according to (16), wherein the predetermined information is information that enables specifying whether data transmission executed by the communication device is initial transmission or retransmission, and
in a case where it is determined on the basis of the predetermined information that the data transmission executed by the communication device is initial transmission, the switching unit switches the transmission means of the reference signal to a second transmission means which is capable of multiplexing more reference signals compared to a first transmission means used in a case where the data transmission executed by the communication device is retransmission.

(18)
A base station device comprising:
a transmission unit that transmits, to a communication device having a plurality of transmission means of a reference signal, predetermined information for switching the transmission means of the reference signal to a predetermined transmission means;
a reception unit that receives a received signal including the reference signal from the communication device; and
a processing unit that extracts the reference signal transmitted by the communication device from the received signal by using a means corresponding to the predetermined transmission means.

(19)
A communication method comprising:
acquiring information regarding signal processing of predetermined data transmission; and
switching a transmission means of a reference signal related to the predetermined data transmission on the basis of the information regarding the signal processing of the predetermined data transmission.

(20)
A communication program for causing a computer to function as:
an acquisition unit that acquires information regarding signal processing of predetermined data transmission; and
a switching unit that switches a transmission means of a reference signal related to the predetermined data transmission on the basis of the information regarding the signal processing of the predetermined data transmission.

REFERENCE SIGNS LIST

1 COMMUNICATION SYSTEM
10 MANAGEMENT DEVICE
20 BASE STATION DEVICE
30 RELAY DEVICE
40 TERMINAL DEVICE
11 COMMUNICATION UNIT
21, 31, 41 SIGNAL PROCESSING UNIT
12, 22, 32, 42 STORAGE UNIT
13, 23, 34, 45 CONTROL UNIT
33, 43 NETWORK COMMUNICATION UNIT
44 INPUT/OUTPUT UNIT
211, 311, 411 RECEPTION PROCESSING UNIT
211a, 411a RADIO RECEPTION UNIT
211b, 411b MULTIPLEX SEPARATION UNIT
211c, 411c DEMODULATION UNIT
211d, 411d DECODING UNIT
212, 312, 412 TRANSMISSION PROCESSING UNIT
212a, 412a CODING UNIT
212b, 412b MODULATION UNIT
212c, 412c MULTIPLEXING UNIT
212d, 412d RADIO TRANSMISSION UNIT
213, 313, 413 ANTENNA
231, 451 ACQUISITION UNIT
232, 452 PROCESSING UNIT
453 CONNECTION UNIT
233, 454 RECEPTION UNIT
235, 455 TRANSMISSION UNIT
234, 456 SEPARATION UNIT
236, 457 SWITCHING UNIT

The invention claimed is:
1. A communication device, comprising:
circuitry configured to:
execute data transmission;
acquire first information regarding a signal processing operation of the data transmission; and
switch a transmission means of a reference signal related to the data transmission based on the first information regarding the signal processing operation of the data transmission, wherein
the first information includes second information that enables specifying whether the data transmission is contention-based data transmission, and
the second information comprises enable/disable information of non-orthogonal multiple access data transmission.

2. The communication device according to claim 1, wherein
the communication device is configured to execute the contention-based data transmission and non-contention-based data transmission,
the circuitry is further configured to switch the transmission means of the reference signal related to the data transmission based on second information.

3. The communication device according to claim 2, wherein
the circuitry is further configured to switch, based on the second information that indicates the data transmission is the contention-based data transmission, the transmission means of the reference signal related to the data transmission to a second transmission means,
the second transmission means is capable of multiplexing more reference signals compared to a first transmission means,
the first transmission means is for the non-contention-based data transmission.

4. The communication device according to claim 1, wherein
transmission resources of the reference signal are allocated in a first transmission means; and
a second transmission means is a transmission means which mutes one of a part or all of the transmission resources of the reference signal.

5. The communication device according to claim 1, wherein
first transmission resources of the reference signal are allocated in a first transmission means;
second transmission resources of the reference signal are allocated in a second transmission means; and
the second transmission means is a transmission means in which an amount of the second transmission resources of the reference signal is larger than an amount of the first transmission resources of the reference signal.

6. The communication device according to claim 1, wherein
first transmission resources of the reference signal are allocated in a first transmission means;
second transmission resources of the reference signal are allocated in a second transmission means; and
the second transmission means is a transmission means in which a mapping pattern of the second transmission resources of the reference signal is different from a mapping pattern of the first transmission resources of the reference signal.

7. The communication device according to claim 1, wherein
the reference signal is a sequence signal generated based on a specific rule,
a first transmission means is a transmission means which arranges only one sequence signal at one reference signal position, and a second transmission means is a transmission means which arranges a plurality of identical sequences to which an orthogonal code is applied at one reference signal position.

8. The communication device according to claim 1, wherein
a first orthogonal cover code is applied to the reference signal in a first transmission means;
a second orthogonal cover code is applied to the reference signal in a second transmission means; and
the second transmission means is a transmission means in which a size of the second orthogonal cover code applied to the reference signal is larger than a size of the first orthogonal cover code applied to the reference signal.

9. The communication device according to claim 8, wherein
the first transmission means is a transmission means which arranges different sequences of reference signals at all respective reference signal positions in one resource block, and
the second transmission means is a transmission means which arranges identical sequences of the reference signals at at least two reference signal positions in one resource block.

10. The communication device according to claim 8, wherein
the first transmission means is a transmission means in which transmission resources of one of reference signals are not arranged across a plurality of slots, and
the second transmission means is a transmission means in which transmission resources of one of the reference signals are arranged across the plurality of slots.

11. The communication device according to claim 1, wherein
the communication device is configured to execute the non-orthogonal multiple access data transmission as the contention-based data transmission,
the circuitry is further configured to switch, based on the second information that indicates the data transmission is the non-orthogonal multiple access data transmission, the transmission means of the reference signal related to the data transmission to a second transmission means.

12. The communication device according to claim 11, wherein
the second information further comprises information regarding Radio Network Temporary ID (RNTI) scrambling of Downlink Control Information (DCI), and
the circuitry is further configured to switch, based on the second information that indicates the DCI is scrambled by non-orthogonal RNTI, the transmission means of the reference signal related to the data transmission to the second transmission means.

13. The communication device according to claim 11, wherein
the second information further comprises information regarding a format of DCI, and
the circuitry is further configured to switch, based on the second information that indicates the format of the DCI is a specific format, the transmission means of the reference signal related to the data transmission to the second transmission means.

14. The communication device according to claim 1, wherein
the communication device is configured to execute Configured grant transmission as the contention-based data transmission,
the first information regarding the signal processing operation includes, as the second information, information that enables specifying whether the data transmission executed by the communication device is the Configured grant transmission, and
the circuitry is further configured to switch, based on the second information that indicates the data transmission of the communication device is the Configured grant transmission, the transmission means of the reference signal to a second transmission means.

15. The communication device according to claim 1, wherein
the contention-based data transmission is the non-orthogonal multiple access data transmission, and
non-contention-based data transmission is orthogonal multiple access data transmission.

16. The communication device according to claim 15, wherein
the communication device has an automatic retransmission function of data, and
in the automatic retransmission function, in a case where non-orthogonal multiple access is used for initial transmission of data, orthogonal multiple access is used for retransmission of the data.

17. The communication device according to claim 16, wherein
the second information is information that enables specifying whether the executed data transmission is the initial transmission or the retransmission, and
the circuitry is further configured to switch, based on the second information that indicates the data transmission is the initial transmission, the transmission means of the reference signal to a second transmission means,
the second transmission means is capable of multiplexing more reference signals compared to a first transmission means,
the first transmission means is a case where the executed data transmission is retransmission.

18. A base station device, comprising:
circuitry configured to:
transmit, to a communication device having a plurality of transmission means of a reference signal, first information for switch of a first transmission means of the reference signal to a second transmission means of the reference signal;
receive a signal including the reference signal from the communication device; and
extract the reference signal transmitted by the communication device from the received signal, based on the second transmission means, wherein
the first information includes second information that enables specifying whether data transmission by the communication device is contention-based data transmission, and
the second information comprises enable/disable information of non-orthogonal multiple access data transmission.

19. A communication method, comprising:
executing data transmission;
acquiring first information regarding a signal processing operation of the data transmission; and
switching a transmission means of a reference signal related to the data transmission based on the first information regarding the signal processing operation of the data transmission, wherein the first information includes second information that enables specifying whether the data transmission is contention-based data transmission, and the second information comprises enable/disable information of non-orthogonal multiple access data transmission.

20. A non-transitory computer-readable medium having stored thereon, computer-executable instructions which, when executed by a processor of a computer, cause the computer to execute operations, the operations:

executing data transmission;

acquiring first information regarding a signal processing operation of the data transmission; and switching a transmission means of a reference signal related to the data transmission based on the first information regarding the signal processing operation of the data transmission, wherein the first information includes second information that enables specifying whether the data transmission is contention-based data transmission, and the second information comprises enable/disable information of non-orthogonal multiple access data transmission.

* * * * *